(12) United States Patent
Kaburagi et al.

(10) Patent No.: US 7,444,354 B2
(45) Date of Patent: Oct. 28, 2008

(54) METHOD AND APPARATUS FOR STORING IMAGES, METHOD AND APPARATUS FOR INSTRUCTING IMAGE FILING, IMAGE STORING SYSTEM, METHOD AND APPARATUS FOR IMAGE EVALUATION, AND PROGRAMS THEREFOR

(75) Inventors: Yuko Kaburagi, Kaisei-machi (JP); Kazuo Shiota, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 321 days.

(21) Appl. No.: 10/242,770

(22) Filed: Sep. 13, 2002

(65) Prior Publication Data

US 2003/0074373 A1 Apr. 17, 2003

(30) Foreign Application Priority Data

Sep. 14, 2001 (JP) .............................. 2001-279251
Sep. 19, 2001 (JP) .............................. 2001-285297

(51) Int. Cl.
*G06F 17/30* (2006.01)
(52) U.S. Cl. ............................ 707/104.1; 707/1; 707/10
(58) Field of Classification Search .................. 707/10, 707/1, 104.1, 104.13; 345/619, 625; 709/203
See application file for complete search history.

(56) References Cited

U.S. PATENT DOCUMENTS

| | | | |
|---|---|---|---|
| 6,185,000 B1 * | 2/2001 | Shiota et al. | 358/1.18 |
| 6,564,225 B1 * | 5/2003 | Brogliatti et al. | 707/104.1 |
| 6,636,837 B1 * | 10/2003 | Nardozzi et al. | 705/27 |
| 6,784,925 B1 * | 8/2004 | Tomat et al. | 348/207.11 |
| 6,873,336 B1 * | 3/2005 | Sailus et al. | 345/581 |
| 6,876,461 B2 * | 4/2005 | Usami | 358/1.15 |
| 7,079,158 B2 * | 7/2006 | Lambertsen | 345/630 |
| 7,171,113 B2 * | 1/2007 | Parulski et al. | 396/287 |
| 2001/0028736 A1 * | 10/2001 | Pettigrew et al. | 382/162 |
| 2002/0057454 A1 * | 5/2002 | Ueda et al. | 358/1.15 |

* cited by examiner

*Primary Examiner*—Cheryl Lewis
(74) *Attorney, Agent, or Firm*—Birch, Stewart, Kolasch & Birch, LLP

(57) ABSTRACT

Image data sets are filed efficiently in an image storing server. An image generation apparatus reads images from a film, and image data sets representing the images are sent to and registered with the image storing server. The image data sets are stored in a folder generated for each user. The user accesses the image storing server from a communication terminal and carries out filing on the image data sets in the folder, such as sorting according to the date and time of photography. In this manner, the image data sets can be stored in the image storing server in a well-organized manner.

54 Claims, 36 Drawing Sheets

FIG.6
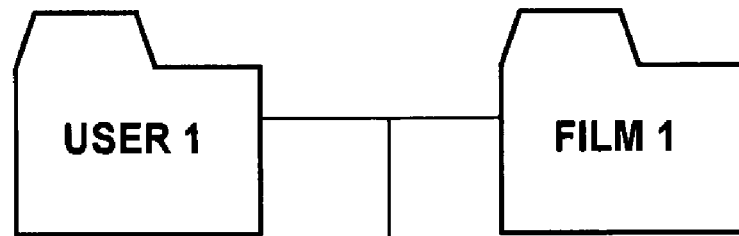
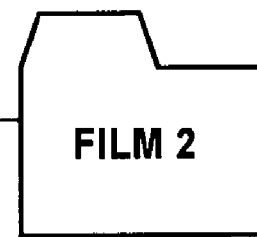
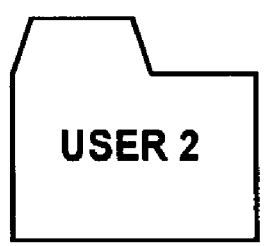
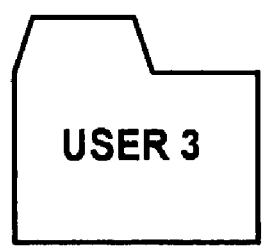

FIG.7

| SERIAL NUMBER | USER ID | IMAGE ID | SIZE | DATE AND TIME OF UPDATE |
|---|---|---|---|---|
| 1 | XXXX | | | |
| 2 | YYYY | | | |
| 3 | ZZZZ | | | |

FIG.10

| SERIAL NUMBER | USER ID | IMAGE ID | SIZE | DATE AND TIME OF UPDATE | IMAGE PROPERTY INFORMATION | USER INFORMATION | MISCELLANEOUS |
|---|---|---|---|---|---|---|---|
| 1 | xxxx | aaaa | | | | | |
| 2 | | aaab | | | | | |
| 3 | yyyy | pppp | | | | | |
| 4 | · · · · · · | | | | | | |
| 5 · · · · · · | | | | | | | |

FIG.20

CHARGES  L SIZE ¥50   HV SIZE ¥50
         P SIZE ¥80   2L SIZE ¥150 + BASIC CHARGE ¥500
         A5 SIZE ¥1000 A4 SIZE ¥1600

| No. | IMAGE | PRINT SIZE FILE NAME | PRINT TYPE DATE OF PHOTOGRAPHY | QUANTITY |
|---|---|---|---|---|
| | ○人 | L ▷ 20010811_1.jpg | WITHOUT MARGIN ▷ 2001/08/11 | 1 |
| | ○人 | L ▷ 20010811_2.jpg | WITHOUT MARGIN ▷ 2001/08/11 | 1 |
| | ○人 | L ▷ 20010811_3.jpg | WITH MARGIN ▷ 2001/08/11 | 1 |

CONFIRM ORDER    CANCEL 76M, 79G, 79H, 79I, 79J, 79F, 79E, 79K, 79L

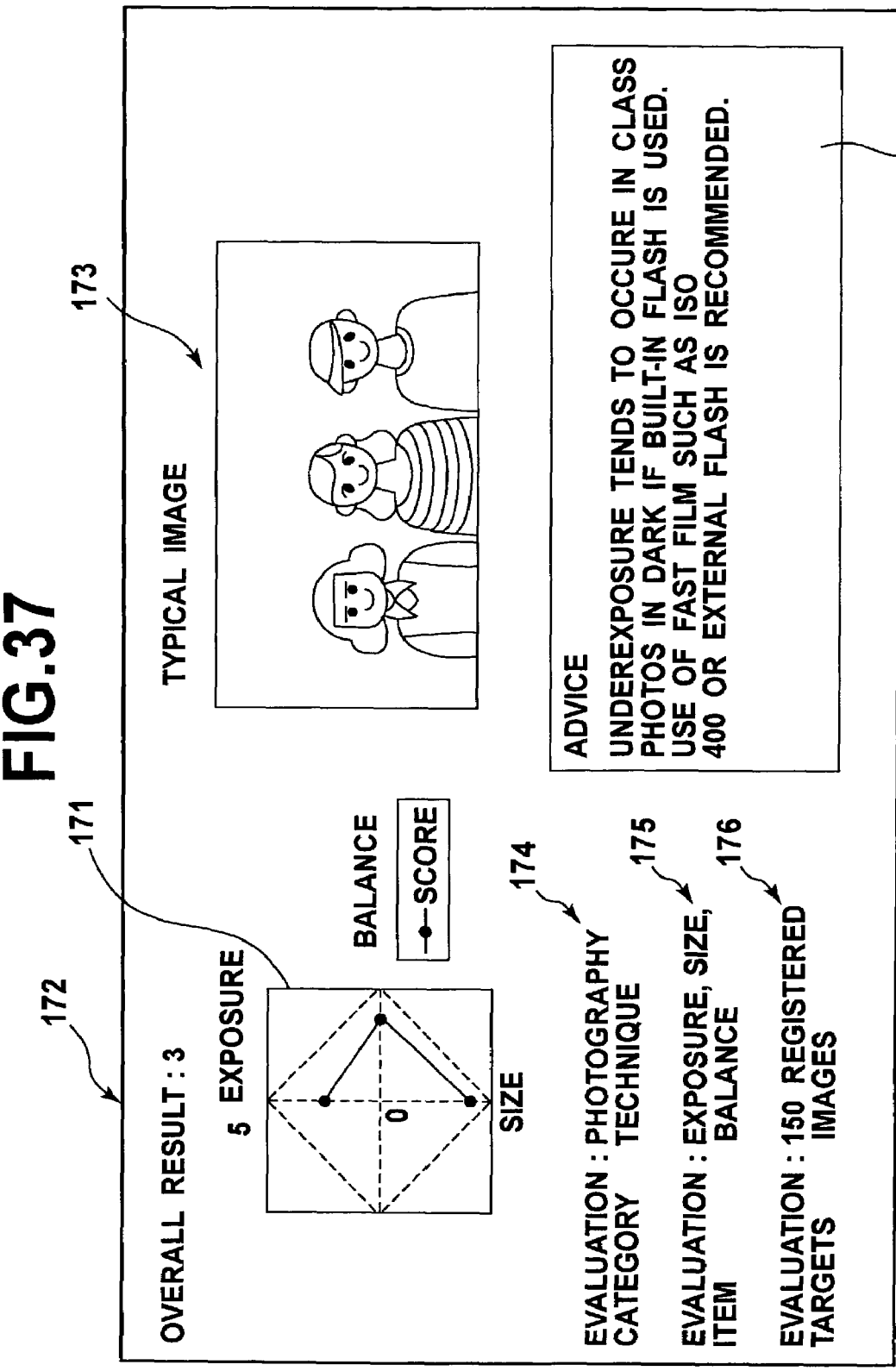

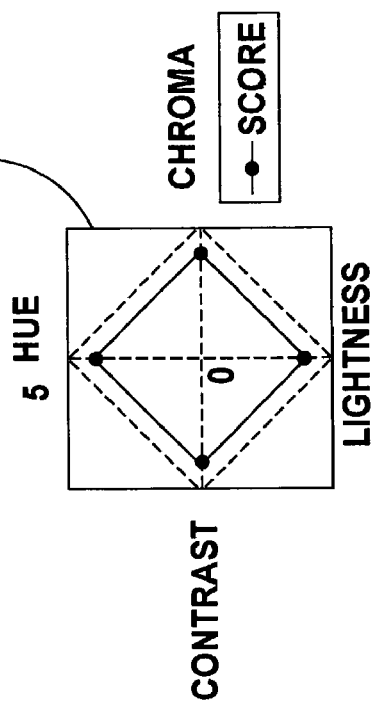

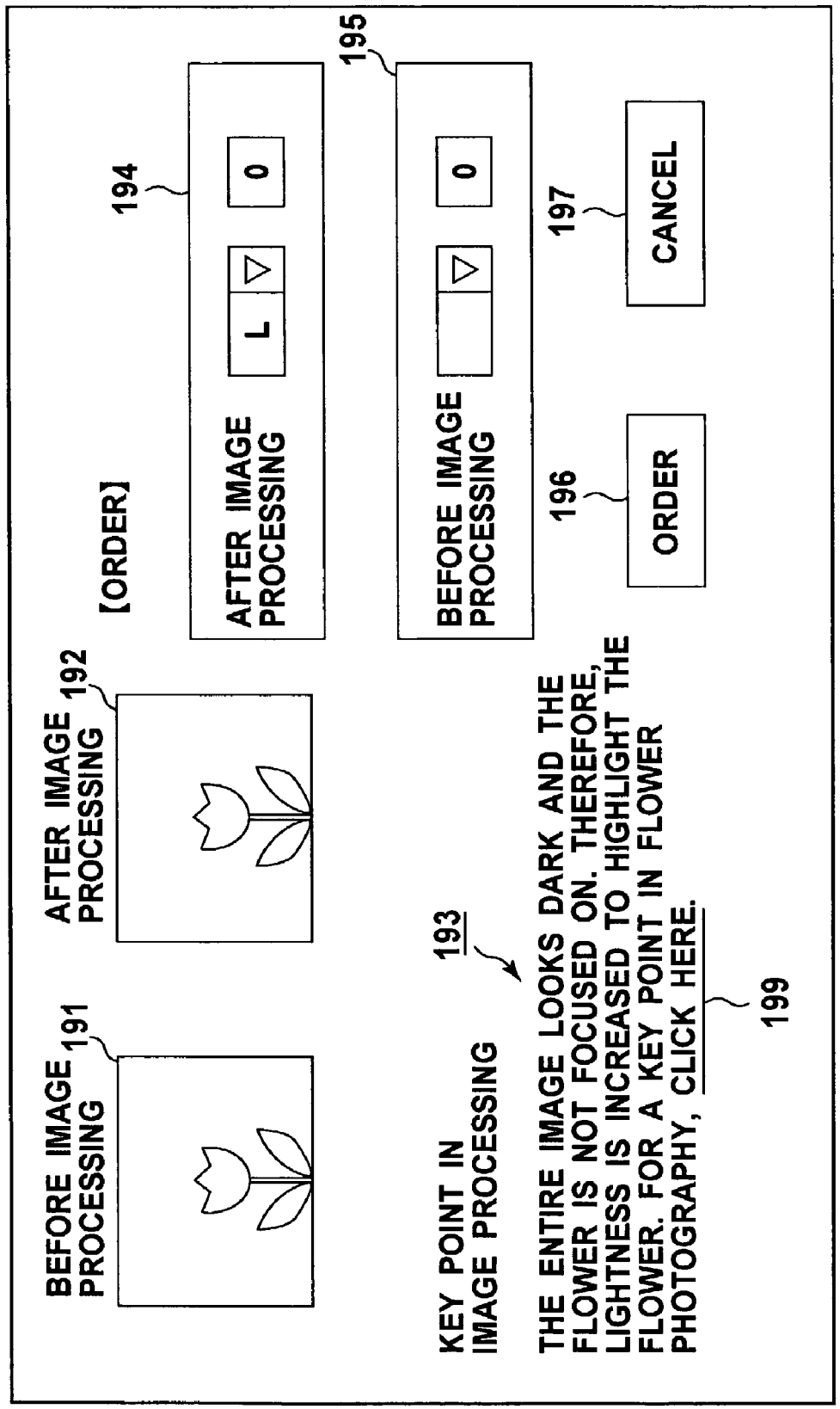

METHOD AND APPARATUS FOR STORING IMAGES, METHOD AND APPARATUS FOR INSTRUCTING IMAGE FILING, IMAGE STORING SYSTEM, METHOD AND APPARATUS FOR IMAGE EVALUATION, AND PROGRAMS THEREFOR

BACKGROUND OF THE INVENTION

1. Field of the Invention

The present invention relates to an image storing method, an image storing apparatus, an image filing instruction method, an image filing instruction apparatus, an image storing system and programs that cause a computer to execute the image storing method and the image filing instruction method, all of which are appropriate for providing digital photograph services on a network.

The present invention also relates to an image evaluation method and an image evaluation apparatus for carrying out image quality evaluation regarding exposure, composition, or the like on an image obtained by photography, and to a program that causes a computer to execute the image evaluation method.

2. Description of the Related Art

Prints generated from silver salt photographic films have been used in various manners. For example, a user can use prints for checking how images he/she photographed look, or for communication with friends by sharing the prints or by sending additional prints to friends. The user can also enlarge the prints for display, and paste the prints in photograph albums. However, prints generated from silver salt photographic films only increase in number if not filed properly. Furthermore, filing prints is difficult when some of the prints or negatives therefor are lost. If prints and negatives are filed often, they can be prevented from being lost. However, it is time-consuming to classify prints and negatives according to chronological order or themes. Furthermore, even if prints and negatives are filed properly, the prints and the negatives are easily disorganized once some of them are taken out and not returned.

For this reason, photograph images have been stored in the form of image data that can be obtained by reading the images recorded on negative films or obtained by digital cameras. However, digital image data of this kind are often stored in a hard disc of a personal computer. Therefore, when the personal computer is replaced with another personal computer, moving the image data to the new computer is troublesome. In some cases, image data are recorded in a recording medium such as a CD-R. However, since the recording medium itself degrades, the image data may face a risk of being lost when stored therein for a long time. Moreover, a reproduction apparatus for a specific recording medium may not be produced any more due to technology therefor becoming obsolete. In such a case, reproduction itself of the image data is no longer possible.

Therefore, an image storing system for storing image data in an image storing server by sending the image data to the image storing server via a network such as the Internet has also been proposed.

When image data are stored in such an image storing system, image processing is carried out on the image data for an optimal quality thereof. Therefore, by downloading the image data stored in the image storing server in the image storing system to a personal computer, a user can view a high-quality image on the personal computer.

However, in the image storing system described above, image data are assumed to be stored collectively according to each roll of photographic film. Therefore, relating each roll of film with a user who requested image data storage is troublesome. Furthermore, if a function of filing the image data is not available, the user cannot organize the image data as he/she wishes. Consequently, when the image data are stored in the image storing server in a large amount, the image data cannot be easily organized, similar to the case of a large number of prints.

Meanwhile, image data obtained by photography carried out by a user reflect his/her photography technique. In the case where a plurality of image data sets of a user is stored as in the case of the image storing system described above, a characteristic of photography technique of the user can be known from the quality of photograph images represented by the image data sets. Therefore, it is preferable for the user to be notified of the quality of the photograph images so that the user can improve his/her photography technique.

SUMMARY OF THE INVENTION

The present invention has been conceived based on consideration of the above circumstances. An object of the present invention is therefore to efficiently file image data.

Another object of the present invention is to enable notification to a user of a quality of an image photographed by the user.

An image storing method of the present invention comprises the steps of:

importing a plurality of image data sets together with user information;

storing the image data sets in a classification according to a user, based on the user information;

receiving an instruction for filing the image data sets stored in the classification by the user;

filing the image data sets based on the instruction; and storing the image data sets that have been filed.

The user information is information used for classifying and searching for the user. More specifically, the user information refers to an ID number specific to the user, the name, the phone number, the E-mail address, the address, the age, and family composition thereof, for example.

The image data sets are stored by being classified in a folder for the user corresponding to the user information.

In the image storing method of the present invention, in the case where the plurality of image data sets have been obtained by reading developed photographic films, the image data sets may be stored in a classification according to each roll of the photographic films, in addition to the classification by the user. In this case, an instruction for filing the image data sets stored in the classification by each roll of the films is received so that the image data sets are filed based on the instruction, and the image data sets that have been filed are then stored.

For storing the image data sets classified according to each roll of film, a folder corresponding thereto is generated in the folder for the user, and the image data sets read from the corresponding roll of film are stored therein.

In an image storing method of the present invention, the image data sets and/or the filed image data sets may be stored by being related to image property information representing an image property.

The image property information is information used for classifying and searching for the image data sets. Information input directly by the user and information added to the image data sets at the time of recording of the image data sets in a recording medium can be used as the image property information. For example, in the latter case, information such as a date and time of photography added to each of the image data sets at the time of photography with a digital camera can be used as the image property information.

It is preferable for the image property information to include the information on the date and time of photography regarding each of the image data sets. In this case, it is preferable for the image data sets to be filed according to the information representing the date and time of photography.

As the information representing the date and time of photography, information input directly by the user or information added to the image data sets at the time of photography with a digital camera can be used. In the case where the image data sets have been obtained by reading images recorded on a negative film or prints, information obtained by recognizing a date of photography included in each of the images may be used as the information representing the date and time of photography, according to a method described in Japanese Unexamined Patent Publication No. 7(1995)-141488.

The image property information may include information representing a use record of the image data sets.

The information representing use record of the image data sets refers to information representing how each of the image data sets has been used, such as for viewing, an additional-print order, electronic photograph album generation, printed photograph album generation, attachment to an E-mail message, and recording in a CD-R, for example.

In the image storing method of the present invention, an instruction for using the filed image data sets may be received so that predetermined processing can be carried out according to the instruction.

Each of the filed image data sets may be used for browsing, an additional-print order, electronic photograph album generation, printed photograph album generation, attachment to an E-mail message, or recording in a CD-R, for example.

The predetermined processing is processing that is carried out according to the instruction for using the filed image data sets, and the predetermined processing includes image viewing processing, processing for ordering an additional print, electronic photograph album generation processing, printed photograph album generation processing, processing for attachment to an E-mail message, and processing for recording in a CD-R, for example.

In the image storing method of the present invention, today's date may be monitored. In this case, an event regarding the user may be analyzed based on the user information so that the analyzed event can be notified to the user when the event comes in a predetermined number of days.

Furthermore, in the image storing method of the present invention, use history information representing how each of the filed image data sets has been used may be stored.

Moreover, in the image storing method of the present invention, the image data sets may have been obtained by an image reading apparatus installed in a laboratory for reading images from a roll of developed photographic film.

In this case, laboratory information regarding the laboratory may also be stored by being related to the image data sets.

In the image storing method of the present invention, the user information may be obtained by reading a user ID from a user ID card recorded with the user ID.

An image storing apparatus of the present invention comprises:

image import means for importing a plurality of image data sets together with user information;

image storing means for storing the image data sets in a classification by a user, based on the user information;

reception means for receiving an instruction for filing the image data sets in the classification by the user; and filing means for filing the image data sets based on the instruction, wherein the image storing means stores the image data sets that have been filed.

In the image storing apparatus of the present invention, in the case where the image data sets have been obtained by reading rolls of developed photographic films, the image storing means may store the image data sets in a classification by each roll of the films in addition to the classification by the user, and the reception means may receive the instruction for filing the image data sets stored in the classification by each roll of the films.

Furthermore, in the image storing apparatus of the present invention, the image storing means may store the image data sets and/or the filed image data sets in relation to image property information representing an image property.

In the image storing apparatus of the present invention, in the case where the image property information includes the date and time of photography regarding each of the image data sets, the filing means may file the image data sets based on the information representing the date and time of photography.

Moreover, in the image storing apparatus of the present invention, the image property information may include information representing how each of the image data sets has been used.

In the case where the image data sets have been obtained by reading rolls of developed photographic films, the image storing means in the image storing apparatus of the present invention may store the image data sets by further classifying the image data sets by each roll of the films.

The reception means of the image storing apparatus of the present invention may receive an instruction for using the filed image data sets stored in the image storing means. In this case, the image storing apparatus of the present invention may further comprise processing means for carrying out predetermined processing based on the instruction for using the filed image data sets.

Moreover, the image storing apparatus of the present invention may further comprise date monitoring means for monitoring today's date;

analysis means for analyzing an event regarding the user based on the user information; and notification means for notifying the user of the analyzed event when the event comes in a predetermined number of days.

The image storing apparatus of the present invention may further comprise use history storing means for storing use history information representing how each of the filed image data sets has been used.

The image data sets stored in the image storing apparatus of the present invention may have been obtained by an image reading apparatus installed in a laboratory for reading images from a roll of developed photographic film.

In this case, the image storing means preferably stores the image data sets in relation to information regarding the laboratory.

The user information used in the image storing apparatus of the present invention may have been obtained by reading a user ID from a user ID card recorded with the user ID.

An image filing instruction method of the present invention comprises the steps of:

accessing an image storing server comprising the image storing apparatus of the present invention; and instructing the image storing server to file the image data sets.

In the image filing instruction method of the present invention, the image storing server may be instructed to use the filed image data sets.

An image filing instruction apparatus of the present invention comprises:

access means for accessing an image storing server comprising the image storing apparatus of the present invention; and instruction means for instructing the image storing server to file the image data sets.

In the image filing instruction apparatus of the present invention, the instruction means may instruct the image storing server to use the filed image data sets.

An image storing system of the present invention comprises:

an image storing server comprising the image storing apparatus of the present invention; and a terminal having the image filing instruction apparatus of the present invention and communicable with the image storing server via a network.

The network is a communication network such as the Internet using a telephone line or ISDN, for example. The network can also be a network using a power line, a cable TV line, or an LAN, for example.

The image storing method and the image filing instruction method of the present invention may be provided as programs that cause a computer to execute the methods.

An image evaluation method of the present invention comprises the steps of:

evaluating a quality of a photograph image obtained by photography, based on an image data set representing the photograph image; and outputting an evaluation result.

The image quality is evaluated by exposure of the photograph image, a color impression, composition, a degree of blur caused by focus and camera shake, and how a night view looks in the case of a night view photograph, for example. By displaying the result of evaluation for each of the items described above, the user easily knows which item to pay attention to when carrying out photography. In this manner, the user can improve his/her photography technique with certainty.

The result of evaluation may be output in any manner, such as a numerical value or a graph. The result may be displayed on a monitor or output from a printer.

In the image evaluation method of the present invention, the image quality evaluation may be carried out based on a plurality of image data sets representing photograph images obtained by photography.

In this case, the image data sets may be stored in image storing means on a network.

The image storing means comprises a large-capacity hard disc and can store a large amount of image data sets for a long time.

In the image evaluation method of the present invention, the image quality evaluation may be carried out based on more than one of the image data sets selected from the image data sets for representing the photograph images of a specific type.

As the photograph images of a specific type, portraits, photographs of people, class photos, scenic photographs such as a mountain, the sea, and a town, flower photographs, pet photographs, astronomical photographs, and night view photographs can be used, for example.

In the case where the image quality evaluation is carried out on the image data sets representing the photographs of a specific type, the evaluation may not be carried out accurately in some cases because the number of the image data sets is small due to the image data sets belonging to only one user. On the other hand, the image quality tends to be the same, regarding the photographs of a specific type. Therefore, in the case where the image quality evaluation is not carried out appropriately by using the image data sets of only the user, the evaluation may be carried out by using image data sets of another user in addition to the image data sets of the user.

In the image evaluation method of the present invention, the image quality evaluation may be carried out based on more than one of the image data sets selected from the image data sets for representing the image data sets obtained by a digital camera of a specific model.

The digital camera refers to a digital still camera and a digital camcorder that can photograph a still image.

In the image evaluation method of the present invention, in the case where image processing is carried out on any one of the image data sets, the image data set before and after the image processing and the content of the image processing may also be output.

An image evaluation apparatus of the present invention comprises:

evaluation means for carrying out evaluation of an image quality on a photograph image obtained by photography, based on an image data set representing the photograph image; and output means for outputting a result of the evaluation.

In the image evaluation apparatus of the present invention, the evaluation means may carry out the evaluation of the image quality, based on a plurality of image data sets representing photograph images obtained by photography.

In this case, the image data sets may be stored in image storing means on a network.

In the image evaluation apparatus of the present invention, the evaluation means may evaluate the image quality, based on more than one of the image data sets selected from the image data sets for representing the photograph images of a specific type.

Furthermore, in the image evaluation apparatus of the present invention, the evaluation means may evaluate the image quality, based on more than one of the image data sets selected from the image data sets for representing the image data sets obtained by a digital camera of a specific model.

In the case where image processing is carried out on one of the image data sets, the output means of the image evaluation apparatus of the present invention may output the image data set before and after the image processing and the content of the image processing.

The image evaluation method of the present invention may be provided as a program that causes a computer to execute the method.

According to the image storing method, the image storing apparatus, the image filing instruction method, the image filing instruction apparatus, and the image storing system of the present invention, the image data sets are imported together with the user information and stored in the classification by the user based on the user information. The image filing instruction is received for the image data sets, and the image data sets are filed according to the instruction and stored. Therefore, the image data sets can be stored in a well-organized manner, which leads to efficient use of the image data sets.

Furthermore, according to the image evaluation method and the image evaluation apparatus of the present invention, the image quality is evaluated based on the image data representing a photograph image, and the evaluation result is output. Therefore, a user knows the image quality of the photograph image he/she has photographed, based on the evaluation result. The user also knows a level of his/her photography technique based on the image quality. Consequently, the user can attempt to improve his/her photography technique by trying to obtain a better evaluation result as much as possible, based on the image quality that has been evaluated.

By evaluating the image quality for a plurality of image data sets, accuracy of the image quality evaluation can be improved.

Since the image quality evaluation can be carried out on more of image data sets by storing the image data sets in image storing means on a network, accuracy of the image quality evaluation can be improved. Since the image storing means stores the image data sets for a long time, a change in the user's photography technique can be understood if an evaluation result for the image data set obtained recently is compared with an evaluation result for the image data sets obtained in the past.

Moreover, by carrying out the image quality evaluation based on a portion of the image data sets selected from the image data sets for representing photograph images of a predetermined kind, the evaluation result on the image quality for only the image data sets representing the images of the predetermined kind can be obtained. Therefore, the user knows to what point he/she needs to pay attention upon photography of photograph images of the predetermined kind, and can improve his/her technique for photography of images of the predetermined kind.

By carrying out the image quality evaluation for a portion of the image data set selected from the image data sets for representing a specific digital camera model, the image quality evaluation result for the photograph images obtained by the specific digital camera can be obtained. Therefore, image processing for compensating for a drawback of photograph images obtained by the specific digital camera can be carried out based on the evaluation result. Consequently, image data sets enabling reproduction of higher-quality images can be obtained.

In the case where the processed image data sets are obtained by carrying out image processing on the image data sets, the user can understand what kind of image processing has been carried out and how the images have been corrected, by display of the image data sets before and after the image processing and the content of the image processing, together with the evaluation result.

BRIEF DESCRIPTION OF THE DRAWINGS

FIG. 6 shows a folder structure in the image storing database;

FIG. 7 shows a structure of basic image information in the image storing database;

FIG. 10 shows a structure of the image information storing database;

FIG. 20 shows an example of an order confirmation screen;

FIG. 37 shows the evaluation result display screen (part 3);

FIG. 38 shows the evaluation result display screen (part 4); and

FIG. 39 shows an order screen.

DESCRIPTION OF THE PREFERRED EMBODIMENTS

Figure 1:
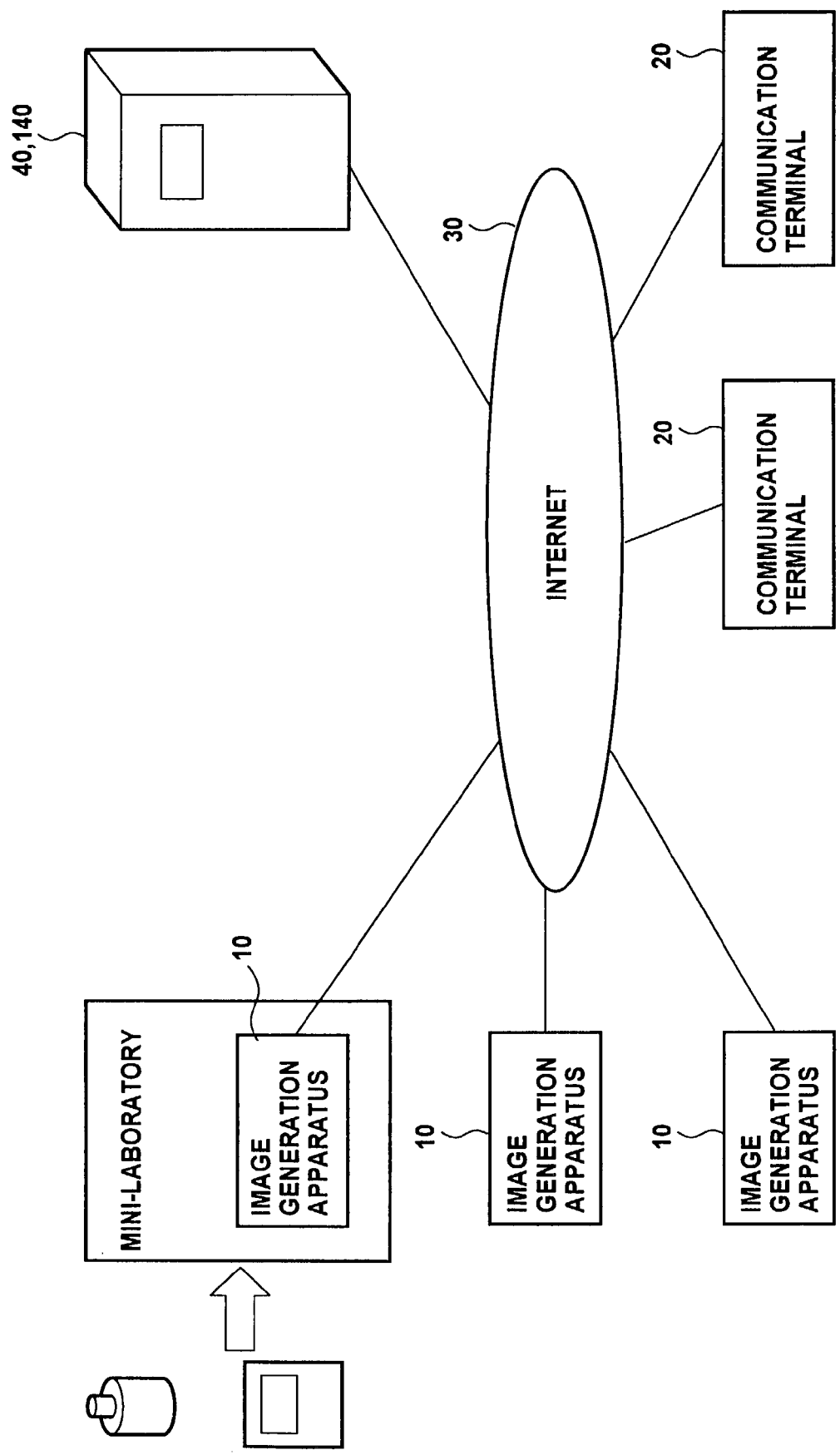
FIG. 1 is a diagram showing a configuration of an image storing system of a first embodiment of the present invention.

Hereinafter, embodiments of the present invention will be explained with reference to the accompanying drawings. FIG. 1 is a schematic diagram showing a configuration of an image storing system of a first embodiment of the present invention. As shown in FIG. 1, an image storing system 1 of the first embodiment comprises image generation apparatuses 10 installed respectively in so-called mini-laboratories, communication terminals 20 used by users, and an image storing server 40 for storing and managing image data sets sent thereto via the Internet 30. The communication terminals 20 and the image generation apparatuses 10 are connected to the image storing server 40 via the Internet 30, and can send and receive information to and from the image storing server 40.

In this embodiment, a centralized system in which the image storing server 40 collectively manages the image generation apparatuses 10 and the communication terminals 20 will be explained. However, the explanations below can be applied to a decentralized system comprising a plurality of servers.

The image generation apparatuses 10 are respectively installed in the mini-laboratories. Each of the image generation apparatuses 10 obtains image data sets by reading images recorded on a photographic film, generates prints from the image data sets, records the image data sets in a CD-R, and registers the image data sets with the image storing server 40. Each of the image generation apparatuses 10 can also carry out printing, recording in a CD-R, and registration with the image storing server 40, of image data sets obtained by a digital camera and recorded in a recording medium such as a memory card.

Figure 2:
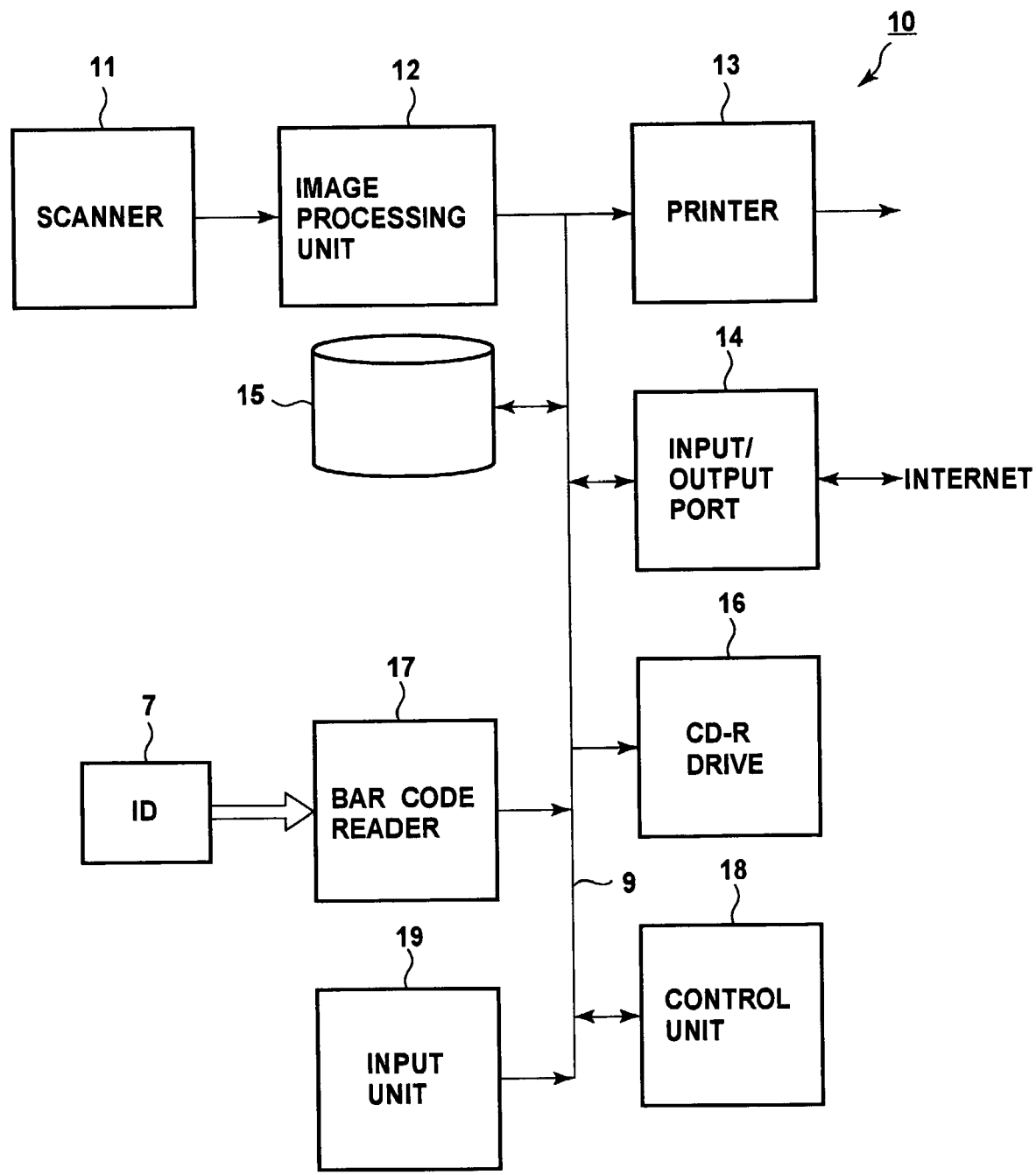
FIG. 2 is a block diagram showing a configuration of an image generation apparatus.

More specifically, as shown in FIG. 2, each of the image generation apparatuses 10 comprises a scanner 11 for obtaining the image data sets by reading images recorded on a photographic film, an image processing unit 12 for carrying out image processing such as tone processing, brightness correction processing, and color correction processing on the image data sets obtained by the scanner 11, a printer 13 for printing the image data sets processed by the image processing unit 12, an input/output port 14 for outputting the image data sets processed by the image processing unit 12 to the Internet 30 and used for various kinds of data input/output, a hard disc 15 for storing the image data sets processed by the image processing unit 12, a CD-R drive 16 for recording the image data in a CD-R, a bar code reader 17 for reading a bar code as a user ID from a user ID card 7, a control unit 18 for controlling operation of the corresponding image generation apparatus 10, an input unit 19 comprising a mouse and a keyboard, and a bus 9 to which the elements described above are connected.

The control unit 18 carries out various kinds of control of the elements of the image generation apparatus 10, such as image reading from a developed negative film by the scanner 11, image processing by the image processing unit 12, printing from the printer 13, transfer of the image data sets from the input/output port 14, storage of the image data sets in the hard disc 15, reading of the user ID from the user ID card 7 by the bar code reader 17, and recording of the image data sets in a CD-R by the CD-R drive 16, based on an instruction input from the input means 19 by an operator at the corresponding mini-laboratory.

Each of the communication terminals 20 comprises a personal computer connectable to the Internet 30, for example. Each of the users uses the corresponding communication terminal 20 for storing the image data sets obtained by his/her digital camera in the image storing server 40, for registering user information with the image storing server 40, for viewing the image data sets stored in the image storing server 40, and for placing an order for a print or prints or generating an electronic photograph album (hereinafter simply referred to as an album) from the image data sets stored in the image storing server 40. The communication terminals 20 maybe dedicated terminals connectable to the image storing server 40 via dedicated lines. Alternatively, the communication terminals 20 may be portable terminals such as a mobile phone and a PDA.

Figure 3:
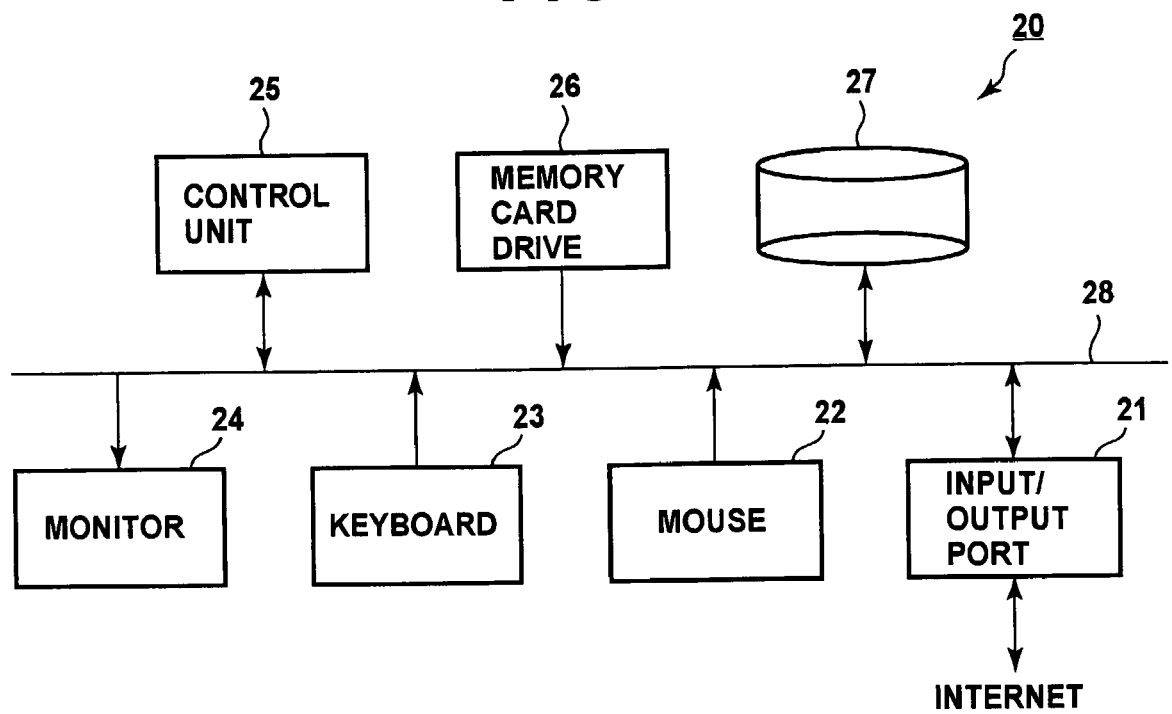
FIG. 3 is a block diagram showing a configuration of a communication terminal.

More specifically, as shown in FIG. 3, each of the communication terminals 20 comprises an input/output port 21 for data input/output via the Internet 30, a mouse 22 as a pointing device, a keyboard 23 for number/character input, a monitor 24 for various kinds of display, a control unit 25 for controlling operation of the corresponding communication terminal 20, a memory card drive 26 for reading the image data sets stored in a memory card, a hard disc 27 for data/program storage, and a bus 28 to which the elements described above are connected.

The mouse 22 is used for selection of an image displayed in a web site, and for specifying a position of character input, for example. The keyboard 23 is used for inputting the user information and image property information, for example. A dedicated input device having a function as a pointing device and a function of character input may be used, instead of the mouse 22 and the keyboard 23.

As the monitor 24, a liquid crystal display monitor, a CRT monitor, an EL display, a plasma display panel, and a television may be used. Furthermore, a so-called touch panel having the functions of the mouse 22, the keyboard 23, and the monitor 24 may also be used.

The control unit 25 sends the user information, the image property information, and the image data sets read by the memory card drive 26 to the image storing server 40 via the input/output port 21, based on an input from the mouse 22 and the keyboard 23. The control unit 25 also displays the image data sets sent from the image storing server 40 on the monitor 24. The control unit 25 also displays a screen used for placing an additional print order or the like, as will be explained later. The image data sets and the screen may be displayed according to dedicated software installed in the corresponding communication terminal 20, or general-purpose web browser software.

The image storing server 40 stores the image data sets sent from the image generation apparatuses 10 and the communication terminals 20 in a classification by each user. Thereafter, the image storing server 40 stores the image data sets by classifying the image data sets according to an instruction input from any of the communication terminals 20. In addition to the classification by each user, the image storing server 40 stores the image data sets in a classification by each roll of photographic film from which the image data sets were obtained or by each recording medium in which the image data sets were recorded, since the image data sets are sent from the image generation apparatuses 10 to the image storing server 40 by these classifications. The image storing server 40 can arrange in the form of a Web screen the image data sets stored therein, and can send the Web screen to the corresponding communication terminal 20 that sent the image data sets in the Web screen thereto, based on an instruction from the communication terminal 20. The image storing server can also place a print order by sending the image data sets to a predetermined one of the mini-laboratories, based on an instruction from the communication terminal 20.

Figure 4:
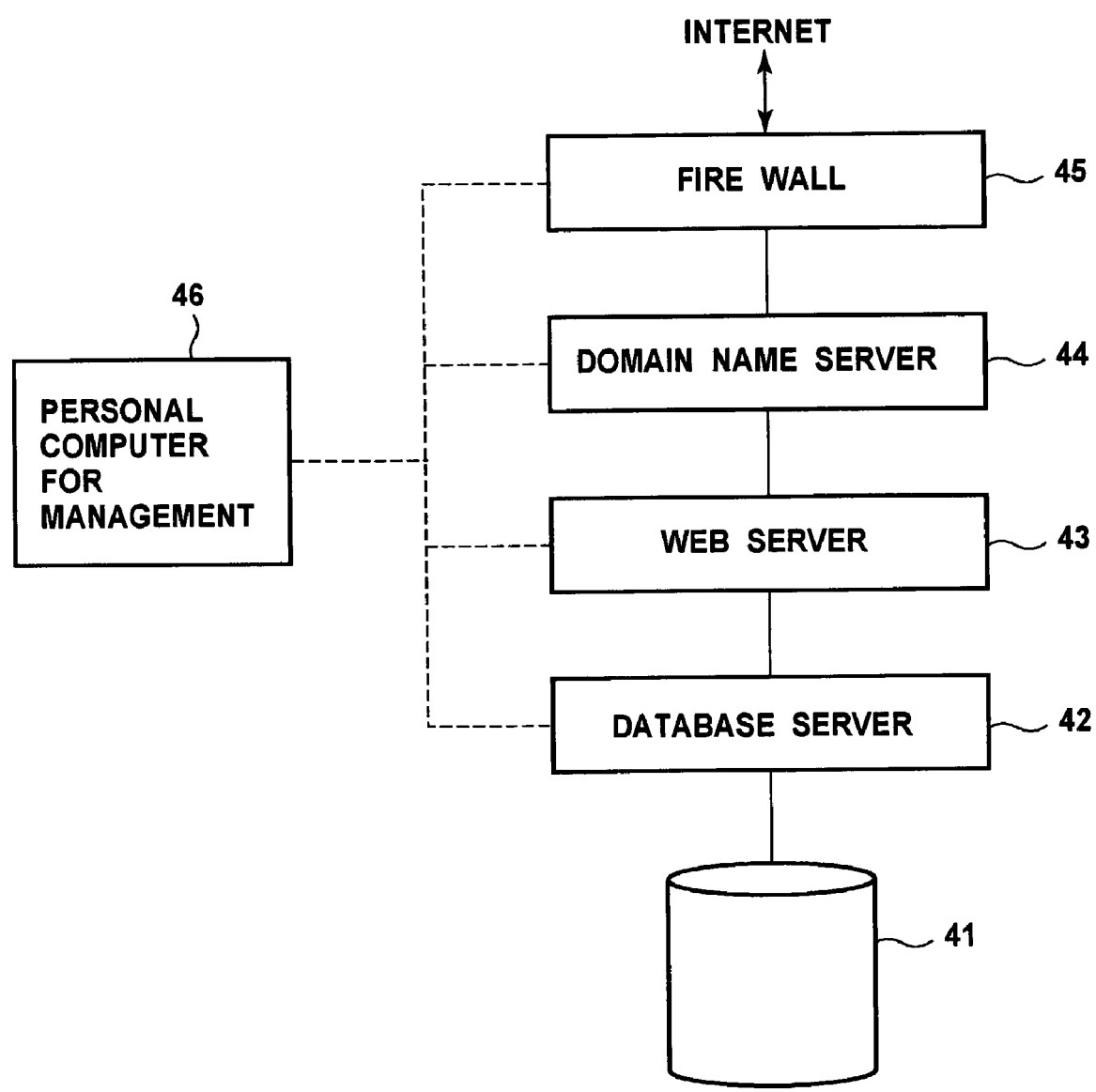
FIG. 4 is a block diagram showing a configuration of an image storing server.

More specifically, as shown in FIG. 4, the image storing server 40 comprises a storage unit 41, a database server 42 for controlling databases in the storage unit 41, a Web server 43 for generating a screen to be displayed on any one of the communication terminals 20 at the time of access to the image storing server 40 from the communication terminal 20, a domain name server 44 for managing the domain name of the image storing server 40, a fire wall 45 connected to the Internet 30 and protecting the image storing server 40 from unauthorized access, and a personal computer 46 for managing the database server 42, the Web server 43, the domain name server 44, and the fire wall 45.

The personal computer 46 issues the user ID and a password at the time the personal computer 46 receives the user information for the first time, relates the image data sets stored in the storage unit 41 with the various kinds of information, and classifies and files the image data sets. The personal computer 46 has a clocking function for monitoring the date and time.

The storage unit 41 comprises a large-capacity hard disc so that the image data sets sent from the image generation apparatuses 10 and the communication terminals 20 can be stored in a large amount.

Figure 5:
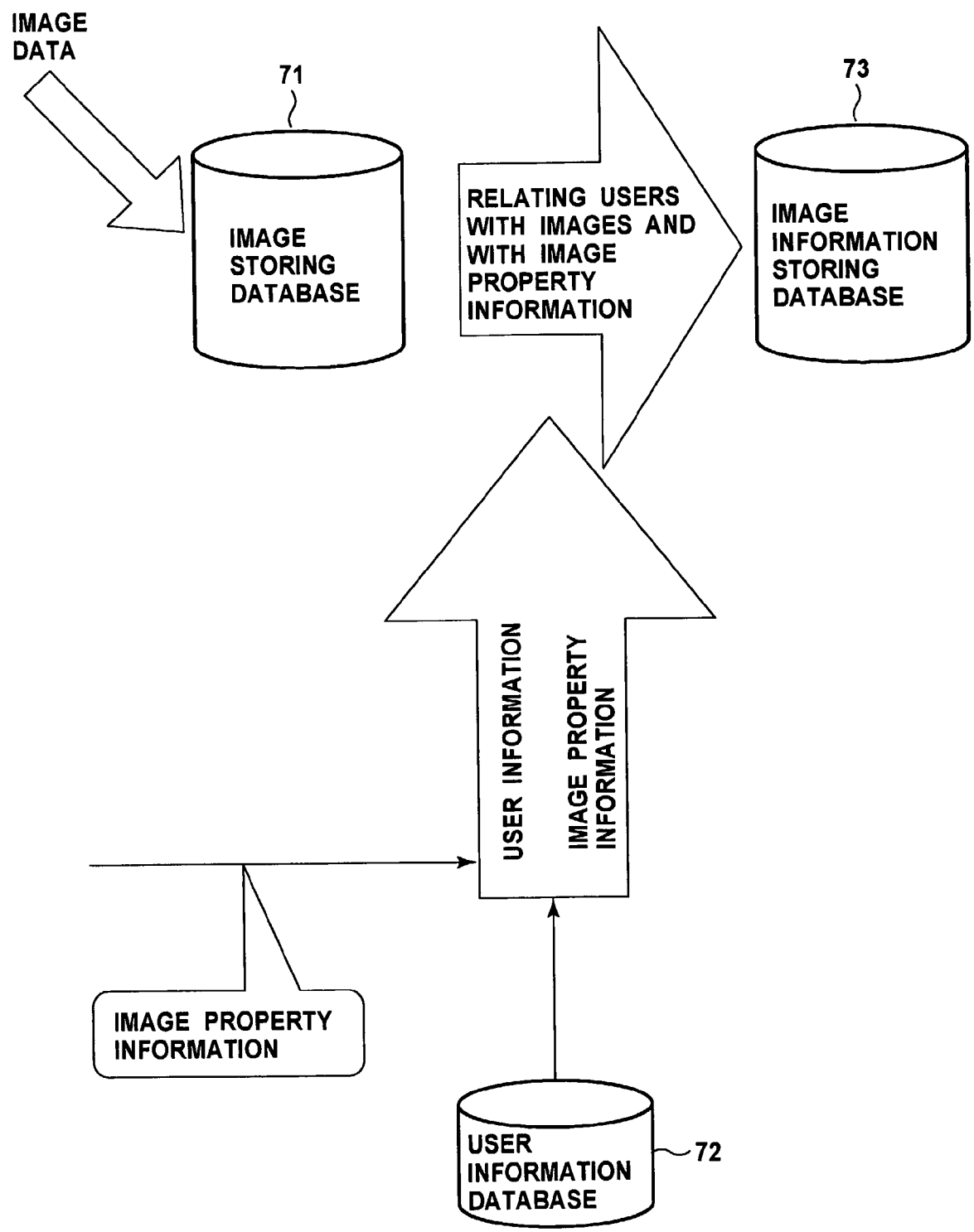
FIG. 5 shows relationships between an image storing database, a user information database, and an image information storing database.

As shown in FIG. 5, the storage unit 41 comprises an image storing database 71 for storing the image data sets sent from the image generation apparatuses 10 and the communication terminals 20, a user information database 72 having the user information on the users, and an image information storing database 73 related to the image storing database 71 and to the user information database 72. The database server 42 manages the image storing database 71, the user information database 72, and the image information storing database 73.

The image storing database 71 stores the image data sets sent from the image generation apparatuses 10 and the communication terminals 20, and basic image information that represents basic information such as a size regarding the image data sets. Therefore, when any one of the image generation apparatuses 10 or the communication terminals 20 sends new image data sets, the image storing database 71 is updated. The image storing database 71 has a folder for each of the users such as user 1 and user 2, for temporarily storing the image data sets sent from the image generation apparatuses 10 and the communication terminals 20 (see FIG. 6). The image storing database 71 also has another folder for each of the users, for storing the image data sets which have been filed as will be explained later.

As shown in FIG. 7, the basic image information comprises the user ID, an image ID (that is, the file name), the size, and the date and time of update. The user ID is used for identifying each of the users who sent the image data sets. The image ID is determined uniquely for each of the image data sets and used for image identification. The size refers to a data size of each of the image data sets. The date and time of update represents the date and time of latest update of each of the image data sets.

Figure 8:
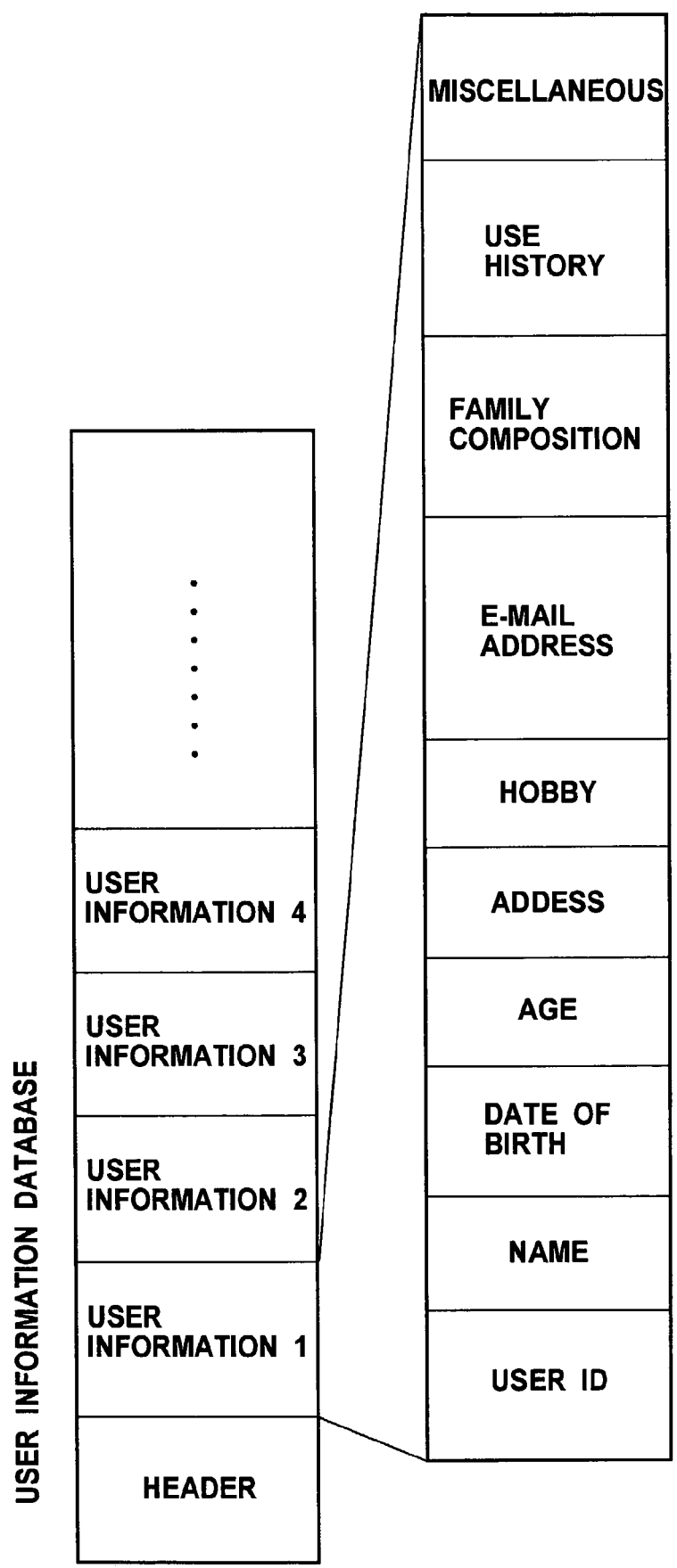
FIG. 8 shows a structure of the user information database.

As shown in FIG. 8, the user information database 72 comprises the user information sent from the image generation apparatuses 10 and the communication terminals 20, and header information for managing the user information. Therefore, when a new user is registered, the user information database 72 is updated. More specifically, the user information on the user comprises the user ID, the name, the date of birth, the age, the address, a hobby, an E-mail address, family composition, and use history representing how the image data sets have been used, for example.

The image information storing database 73 stores image storing information that relates the image property information to information that relates the image storing database 71 to the user information database 72, in addition to information that relates the image storing database 71 to the user information database 72.

Figure 9:
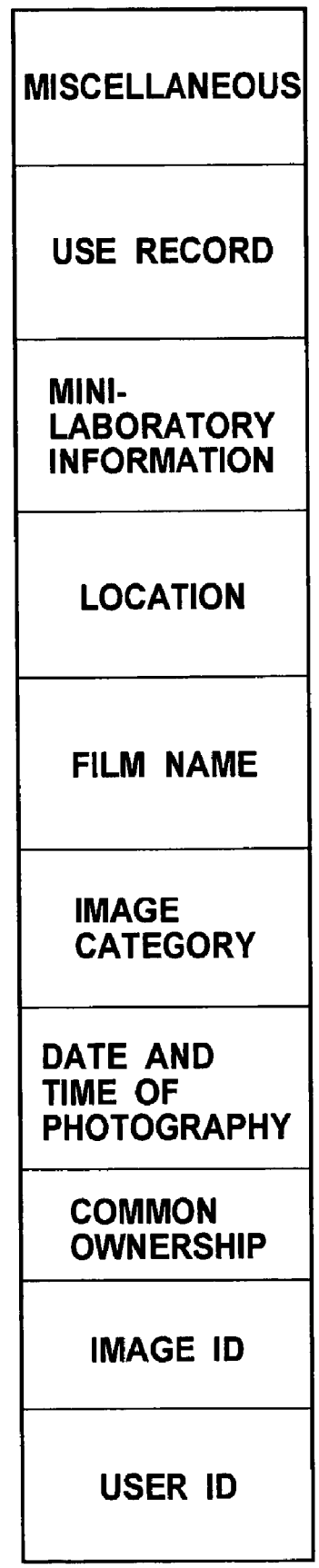
FIG. 9 shows a structure of image property information.

The image property information refers to detailed information regarding each of the image data sets. For example, as shown in FIG. 9, the image property information regarding each of the image data sets comprises the user ID, the image ID, common ownership information, the date and time of photography, information representing which of image categories the image belongs to, the name of the corresponding photographic film, a location of photography, information regarding the mini-laboratory which developed the photographic film, and the use record representing how the image data sets have been used in the image storing server 40. "Common ownership" refers to information whether or not each of the image data sets can be shared with a third person, that is, whether or not each of the image data sets can be read by the third person.

Information recorded in the memory card by the digital camera together with the image data sets may be used as the image property information. The digital camera can also record the location information in the attribute information if the digital camera has a GPS receiver. Therefore, the image property information may be input from not only the keyboard 23 but also the memory card as recorded by the digital camera, and sent to the image storing server 40 from the corresponding communication terminal 20. In the case where the image data sets have been obtained by reading the photographic film with one of the image generation apparatuses 10, the date of photography included in each of the images is preferably recognized. In this case, information representing the recognized photography date is added to the image data sets, and read as the information of the date and time of photography to be included in the image property information.

As shown in FIG. 10, the image information storing database 73 comprises the user ID, the image ID, the size, the date and time of update, the image property information, and the user information, for example.

When any one of the users accesses the image storing server 40 from the corresponding communication terminal 20, the image storing server 40 reads the image data sets of the user from the image information storing database 73, and sends the image data sets to the communication terminal 20. The image storing server 40 then carries out filing of the image data sets, generation of an album, and an additional print order, based on an instruction from the user, for example.

The procedure carried out in the image storing system 1 having the above configuration will be explained next. A case wherein a user requests film development and printing of images recorded on the negative film, and registration of the image data sets with the image storing server 40 from one of the mini-laboratories will be described. Alternatively, the user may request registration of the image data sets with the image storing server 40 by providing a recording medium storing the image data sets obtained by his/her digital camera to the mini-laboratory.

The user ID card is issued to the user in advance by the mini-laboratory. The user ID card is issued when the user requests film development and printing of the images or when the user purchases a product such as a digital camera at the mini-laboratory. The user ID card may be issued to the user when the user carries out his/her member registration by accessing the mini-laboratory from the corresponding communication terminal 20. The user ID, the phone number and the address of the user is described on the user ID card, and the bar code is printed thereon as the user ID that is uniquely assigned to the user. The user ID is related to the user information database 72 stored in the image storing server 40. By sending the user ID to the image storing server 40 as will be explained later, the image storing server can obtain the various kinds of information regarding the user by referring to the user information database 72.

The user brings the negative film on which the images have been photographed to the mini-laboratory, and requests film development and printing of the images, in addition to registration of the image data sets with the image storing server 40. At this time, the user turns in the user ID card together with the film. An operator in the mini-laboratory writes down the name and the phone number of the user described on the user ID card on a DP bag used to contain the prints and the developed negative film. The operator also writes down the expected time of finish of the prints on the DP bag. The operator also writes down on the DP bag the fact that the image data sets are to be registered with the image storing server 40. The operator provides the user with a copy of the description on the DP bag.

The operator develops the film. Check tapes each having thereon a number used in a checking procedure are pasted on the negative film that has been developed and on the DP bag, respectively. In the case where printing and registration of the image data sets recorded in a recording medium have been requested, the type of the recording medium, the capacity thereof, and a characteristic thereof are described on the DP bag.

The image generation apparatus 10 in the mini-laboratory carries out the following processing. Firstly, the image generation apparatus 10 instructs the scanner 11, the printer 13, and the image storing server 40 to read the images from the developed negative film, to print the image data sets that have been read, and to register the image data sets, respectively. In this manner, the order is confirmed and an order number is issued and transcribed on the DP bag by the operator. The bar code reader 17 reads the user ID from the user ID card, and the scanner 11 reads the images from the developed film to obtain the image data sets. The image data sets are stored in the hard disc 15. The image data sets are checked and the order is finally confirmed.

In the case where the user requested printing and registration of the image data sets with the image storing server 40 regarding a plurality of films, each of the films is subjected to development, and an order number is assigned thereto. The user ID is read, and the respective films are scanned. Thereafter, the image data sets are stored in the hard disc 15. The information representing the date and time of photography needs to be added to the image data sets. Therefore, the image generation apparatus 10 recognizes the date of photography included in the images represented by the image data sets, and adds the date of photography as the information representing the date and time of photography (see Japanese Unexamined Patent Publication No. 7(1995)-141488). In the case where the date of photography cannot be recognized for one of the images, the date of photography is inferred based on the date of photography of the images photographed before and after photography of the image, and the information of the inferred date and time of photography is added to the corresponding image data set obtained by reading the image.

In the case where the negative film is an APS film enabling magnetic recording of various kinds of information such as the date and time of photography, the information of date and time of photography recorded in a magnetic recording area of the film is added to the image data sets.

On the other hand, the information of date and time of photography cannot be obtained at all in some cases. In such a case, the date and time of reading the images from the corresponding film is used as the date and time of photography. Alternatively, the time of production of the film maybe inferred based on a film type, a manufacturing lot number, or the like recorded on a periphery of the film so that the inferred time can be used as substitute information for the date and time of photography and added to the image data sets. In this case, it is preferable for the information of the date and time of photography added to the image data sets so as to enable distinction between the substitute information and the actual information of the date and time of photography.

When the operator instructs image data registration to the image generation apparatus 10, the image data sets and the user ID are sent from the input/output port 14 to the image storing server 40 via the Internet 30. In the case where the image data sets have been obtained by reading the images from a plurality of films, the image data sets are sent collectively in the classification by each roll of film.

Figure 11:
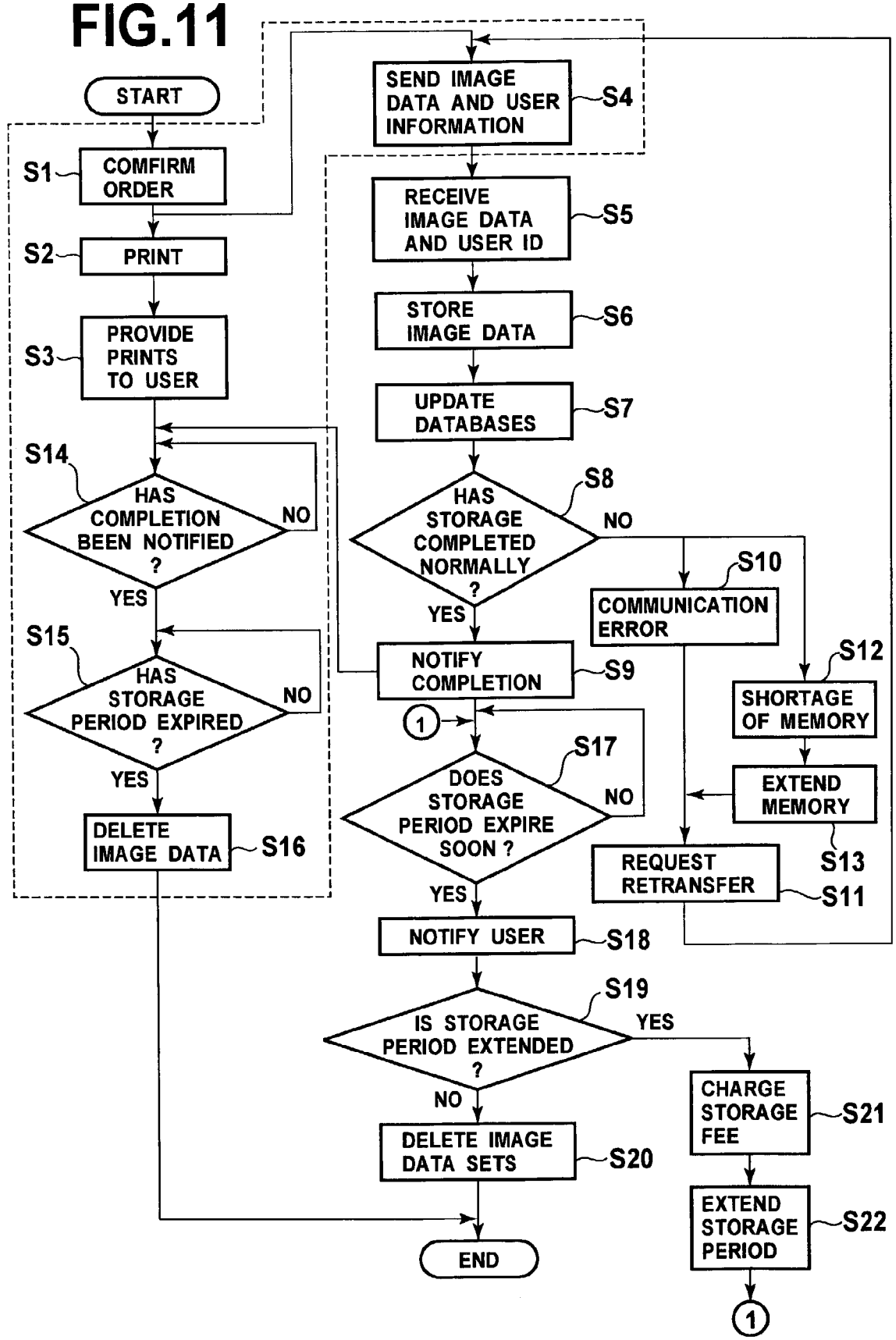
FIG. 11 is a flow chart showing an image data registration procedure and a procedure carried out in the image storing server.

Hereinafter, an image data registration procedure and a basic procedure carried out in the image storing server 40 will be explained. FIG. 11 is a flow chart showing the image data registration procedure and the basic procedure carried out in the image storing server 40. In FIG. 11, the procedure surrounded by broken lines is the procedure carried out in the image generation apparatus 10. First, the order is confirmed in the image generation apparatus 10 (Step S1), and the printer 13 prints the image data sets (Step S2). In the case where another request such as recording of the image data sets in a CD-R has also been made, the processing therefor is also carried out. The prints are then provided to the user (Step S3).

Meanwhile, the image data sets and the user ID are sent to the image storing server 40 (Step S4). The image storing server 40 carries out the image data registration procedure. More specifically, the image storing server 40 receives the image data sets and the user ID (Step S5), and stores the image data sets in the folder of the user corresponding to the user ID (Step S6). In the case where the user folder corresponding to the user ID does not exit, the user folder is generated. In the case where the image data sets are sent collectively in classification by each roll of film, the folders for the respective film rolls, such as folder 1, folder 2, ... are generated as subfolders within the user folder. The image data sets are stored in the folders by being classified according to the film rolls. In the case where the user requested image data registration by bringing a plurality of recording media used by his/her digital camera to the mini-laboratory, the folders are generated for the respective recording media, and the image data sets are stored in the corresponding folders.

The image data sets are related to the image storing database 71, to the image property information, and to the user information database 72, and the image information storing database 73 is updated (Step S7). In this manner, the image data sets are registered. Whether or not the image registration has been carried out normally is then judged (Step S8). If a result at Step S8 is affirmative, E-mail messages notifying completion of the registration of the image data sets are sent respectively to the image generation apparatus 10 and to the E-mail address of the user obtained from the user information database 72 (Step S9).

In the case where the registration has not been completed normally, the failure has been caused by either a communication error or shortage of memory. Therefore, if the result at Step S8 is negative due to a communication error (Step S10), a retransfer request is sent to the image generation apparatus 10 (Step S11), and the procedure returns to Step S4. If the result is negative due to memory shortage (Step S12), the memory area is expanded (Step S13), and the procedure goes to Step S11.

If the image generation apparatus 10 receives the E-mail message notifying the completion of image registration (Step S14 YES), whether or not a storage period for the image data sets stored in the hard disc has expired is then judged (Step S15). In the case where the storage period has expired, the image data sets stored in the hard disc are deleted (Step S16). The storage period for the image data sets in the hard disc may be extended, upon request of the user.

The image storing server 40 judges whether or not a storage period for the image data sets that were registered will expire soon (Step S17). If a result at Step S17 is affirmative, the coming expiration is notified to the user (Step S18). This notification maybe carried out by an E-mail message or by phone or a direct mail. If the user wishes to extend the storage period, the user notifies the image storing server 40 of the extension. If the user does not wish to extend the storage period, the user may notify the image storing server. However, this notification is not necessary for the storage period to lapse.

Whether or not the user has instructed the extension of the storage period is then judged (Step S19). If a result at Step S19 is negative, the image data sets are deleted from the image storing server 40 (Step S20) to end the procedure. If the result at Step S19 is affirmative, the user is billed to pay for extended storage of the image data sets (Step S21). A charge therefor is notified to the user by an E-mail message or the like, and the user pays the charge within a predetermined period from the notification. In the case where the user does not pay the charge, the user is banned from accessing the image storing server 40. After the user pays the charge, the storage period is extended (Step S22), and the procedure returns to Step S17.

A procedure from printing to provision of the prints to the user will be explained next. The prints are examined and checked to match with the DP bag and the negative film. The prints are then put in the DP bag, and provided to the user together with the user ID card in exchange for charge payment by the user at the time the user visits the mini-laboratory. The charge includes a registration charge for the image data sets with the image storing server 40. Hereinafter, the checking procedure for examining the prints, the DP bag, and the negative film will be explained. The DP bag and the negative film are checked after the prints have been inspected.

Figure 12:
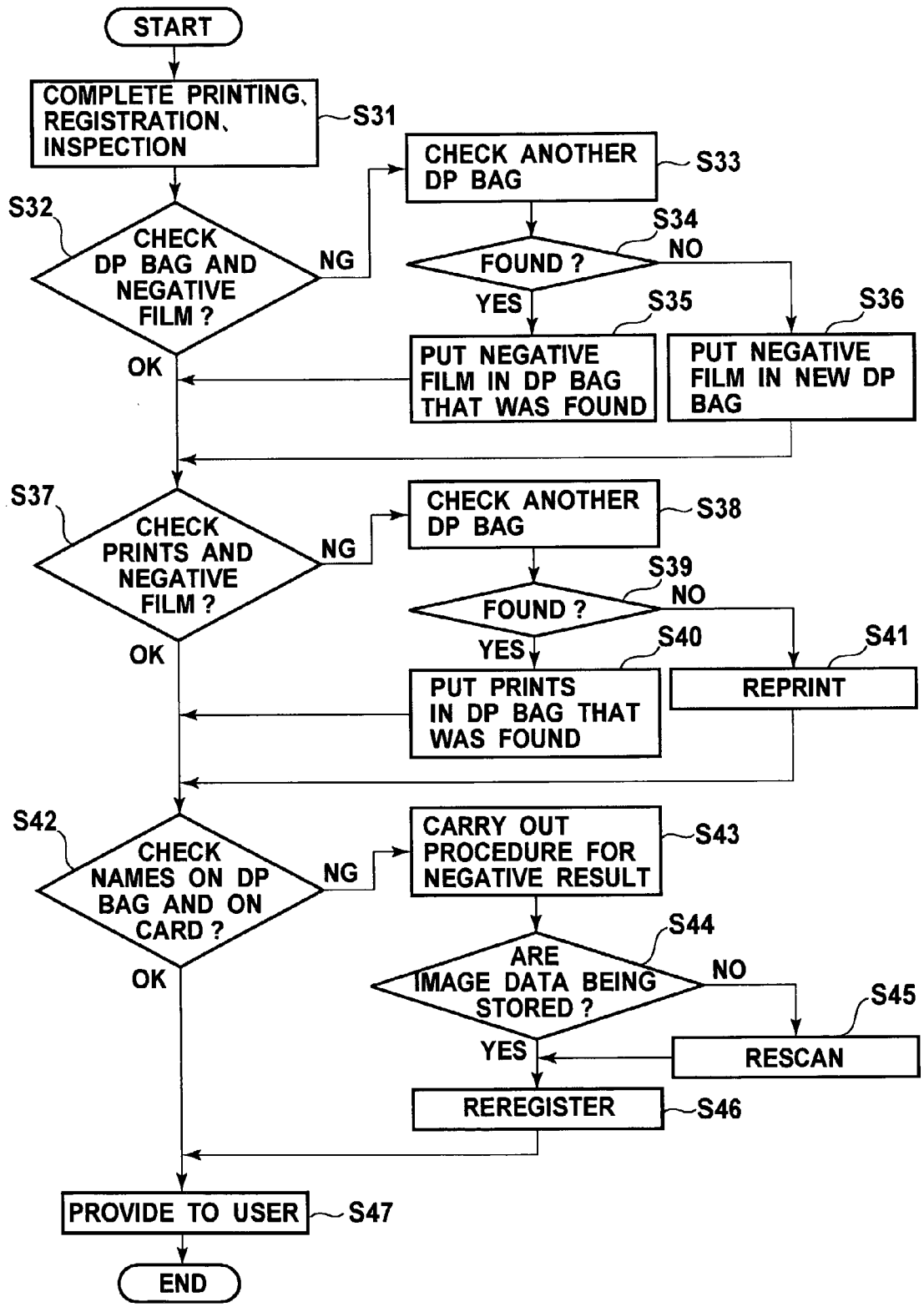
FIG. 12 is a flow chart showing a checking procedure.

FIG. 12 is a flow chart showing the checking procedure. The operator at the mini-laboratory carries out the procedure shown by the flow chart in FIG. 12. After printing and registration of the image data sets with the image storing server 40 and inspection of the prints (Step S31), the DP bag is checked to match with the negative film (Step S32). For this purpose, the operator judges whether or not the number of the check tape pasted on the negative film agrees with the number of the check tape pasted on the DP bag. If a result is negative, a DP bag pasted with the check tape having the number that agrees with the number of the check tape on the negative film is searched for (Step S33), since the negative film needs to be put in the corresponding DP bag. In the case where the DP bag having the check tape of the same number has been found (Step S34 YES), the negative film is put in the DP bag that has been found (Step S35). If a result at Step S34 is negative, a new DP bag is used and the negative film is put in the new DP bag (Step S36).

If the result at Step S32 is affirmative, or after the procedure at Step S35 or 36, the prints are checked to match with the negative film (Step S37). For this purpose, the operator judges whether or not the images recorded on the negative film agree with the images on the prints. In the case where the DP bag has not been found, a DP bag having the negative film recorded with the images of the prints is searched for (Step S38), since the prints need to be put in the corresponding DP bag. If a result is affirmative (Step S39 YES), the prints are put in the DP bag that has been found (Step S40). If the result at Step S39 is negative, reprinting is carried out and the newly generated prints are put in the DP bag containing the corresponding negative film (Step S41).

If the result at Step S37 is affirmative or after the procedure at Step S40 or 41, the name of the user described on the DP bag is compared with the name of the user described on the user ID card (Step S42). If a result is negative, a procedure for the negative result is carried out (Step S43). The procedure for the negative result comprises the steps of checking the user ID card contained in another DP bag, requesting deletion from the image server 40 of the image data sets registered in the image storing server 40, and requesting deletion from the image storing server 40 of image data sets of another user in the case where the user ID cards thereof have been swapped with each other.

Whether or not the image data sets are still stored in the hard disc 15 is then judged (Step S44). If a result at Step S44 is negative, the image data sets are obtained by reading the negative film again (rescan, Step S45). If the result at Step S44 is affirmative or the procedure after Step S45, the image data sets are re-registered with the image storing server 40 (Step S46). If the result at Step S42 is affirmative or after the procedure at Step S46, the DP bag containing the prints, the negative film, and the user ID card is provided to the user (Step S47) to end the procedure.

In the case where the image data sets recorded in the recording medium are printed, the DP bag is checked to match with the recording medium, based on the type, the size and the characteristic of recording medium described on the DP bag. In this case, the order number is printed on the backside of each of the prints. Therefore, the prints are checked to match with the recording medium by comparing the order number printed on each of the prints with the order number described on the DP bag.

In some cases, the user may request recording of the image data sets in a CD-R, together with printing and registration thereof with the image storing server 40. In such a case, the image data sets read from the negative film are recorded in a CD-R by the CD-R drive 16 of the image generation apparatus 10, and the prints are put in the DP bag to be provided to the user together with the negative film. In this case, when the image data sets are recorded in the CD-R, an order number is marked on a bag for the CD-R. Whether or not the order number marked on the DP bag agrees with the order number marked on the bag for the CD-R is then judged. In this manner, the DP bag is checked to match with the CD-R. In the case where the image data sets recorded in the recording medium are recorded in a CD-R, the DP bag is checked to match with the CD-R by judging whether or not an order number marked on the DP bag agrees with an order number marked on a bag for the CD-R.

After the image data sets have been registered with the image storing server 40, the user files the image data sets. Hereinafter how the user files the image data sets will be explained.

Figure 13:
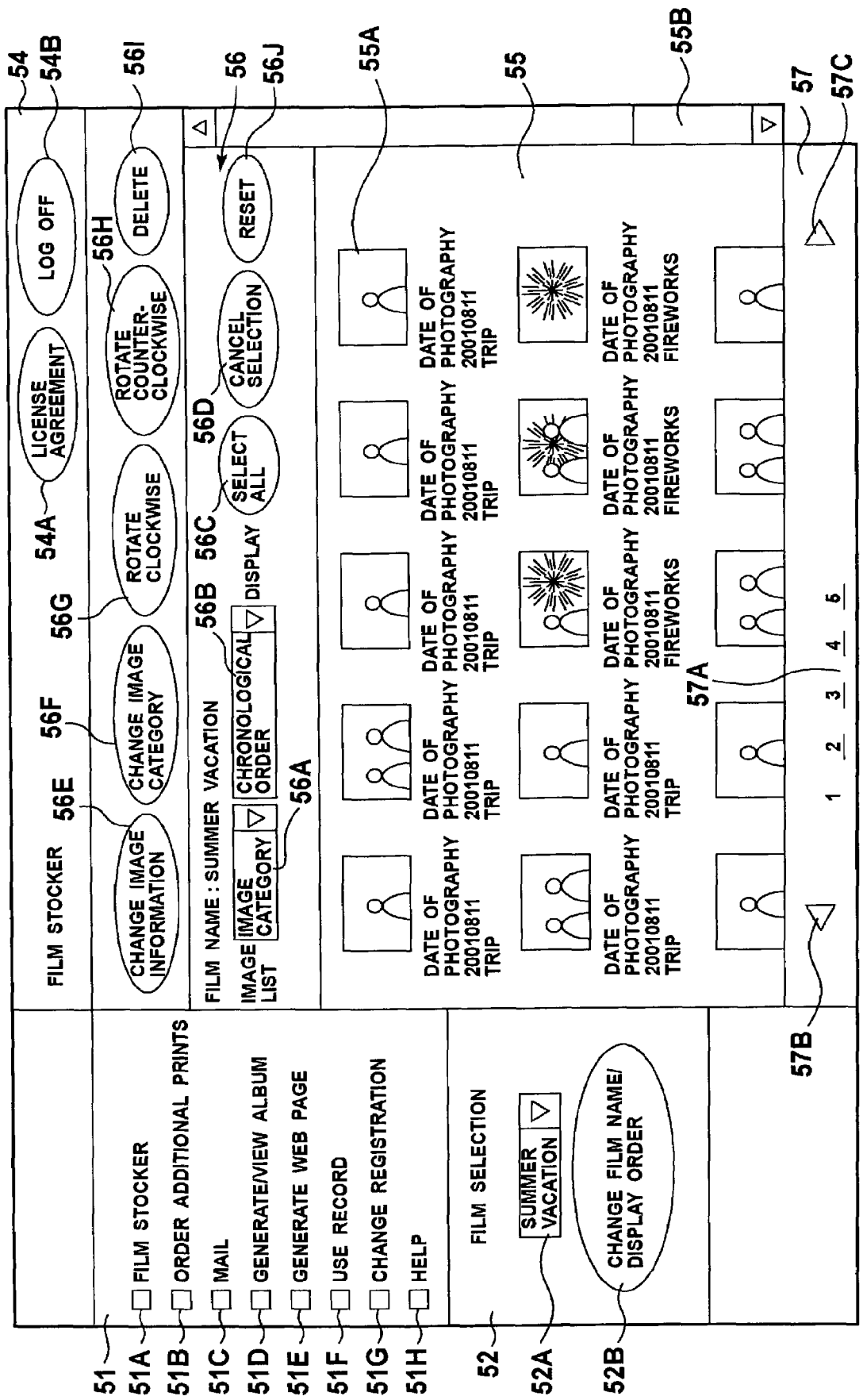
FIG. 13 shows an example of a film stocker display screen.

When the user receives the E-mail message notifying the completion of image data registration, the user accesses the Web server 43 of the image storing server 40, by using the communication terminal 20. At this time, the user logs on to the Web server 43 by using the password and the user ID. In response, a film stocker display screen is displayed on the communication terminal 20, for displaying the image data sets registered with the image storing server 40 in the classification by each roll of film. FIG. 13 shows an example of how the film stocker screen looks. As shown in FIG. 13, the film stocker screen comprises a function display field 51, a display selection field 52, a title display field 54, an image display field 55, a filing function display field 56, and a page selection field 57.

The function display field 51 comprises a Film Stocker button 51A for displaying the film stocker screen as an initial screen, an Order Additional Prints button 51B for displaying a screen for placing an additional-print order, a Mail button 51C for displaying a mail screen for sending the image data sets as attachment to an E-mail massage, a Generate/view Album button 51D for displaying a screen for generating/viewing an album using the image data sets, a Generate Web Page button 51E for displaying a screen for generating a Web page using the image data sets, a Use Record button 51F for confirming how the image data sets have been used, a Change Registration button 51G for changing the user information registered with the image storing server 40, and a Help button 51H for displaying how functions displayed in the function display field 51 are used.

In the display selection field 52 are shown a film selection list 52A for selecting one of the film rolls for image display in the case where the image data sets have been obtained from the film rolls, and a Change Film Name/Display Order button 52B for changing the name of the film roll being used for display or for changing the order of display of the film rolls. The film selection list comprises a pull-down menu, and the name given to each of the film rolls as will be explained later are registered with the list.

The title display field 54 displays the title of the screen currently displayed. The title display field 54 also comprises a License Agreement button 54A for displaying a license agreement regarding the image data sets registered with the image storing server 40, and a Log OFF button 54B for logging off the image storing server 40.

In the image display field 55 are displayed thumbnail images 55A of the images represented by the image data sets registered with the folder of the film roll that has been selected and a scroll bar 55B for scrolling the screen. The date of photography based on information on the date and time of photography and the image category are shown under each of the thumbnail images 55A.

The filing function display filed 56 displays the name of the film roll being displayed. In the filing function display field 56 are also shown a category selection list 56A for selecting one of the categories of the images to be displayed, a sorting order selection list 56B for selecting image sorting order (chronological order or reverse order), a Select All button 56C for selecting all the images being displayed, a Cancel Selection button 56D for canceling selection of the images being displayed, a Change Image Information button 56E for changing the information (the image ID, the date and time of photography, and the like) on any of the thumbnail images selected from the thumbnail images 55A displayed in the image display field 55, a Change Image Category button 56F for setting and changing one of the image categories, a Rotate Clockwise button 56G for rotating a selected one of the images clockwise, a Rotate Counter-Clockwise button 56H for rotating the selected one of the images in the counter-clockwise direction, a Delete button 56I for deleting a selected one of the images, and a Reset button 56J for canceling image selection in all pages.

The page selection field 57 comprises Page buttons 57A for changing a page to be displayed, a Previous button 57B for going back to the previous page, and a Next button 57C for going to the next page.

The user can organize the images in the film stocker display screen. More specifically, by selecting one of the image categories displayed in the category selection list 56A, the user can display in the image display field 55 the thumbnail images 55A represented by the image data sets belonging to the selected category. The categories are predefined, such as trip, fireworks, athletic contest, coming-of-age ceremony, and celebration for children of 3, 5, and 7 years old, for example. The user can set the selected category as the image property information for the image data sets, or can change the selected category as will be explained later, by clicking the Change Image Category button 56F. Since the category selection list 56A comprises a pull-down menu, the user can easily select a desired one of the categories for image display.

When the user clicks the Delete button 56I after selecting one of the thumbnail images 55A displayed in the image display field 55, the user can delete the image data set corresponding to the selected thumbnail image from the image storing server 40. In the case where the image data set is deleted, a confirmation screen for asking the user to confirm the deletion is displayed, in order to prevent erroneous image data deletion.

The image storing server 40 displays the thumbnail images 55A in the image display field 55 in the landscape orientation as a default. However, some of the images need to be viewed in the portrait orientation. Therefore, by selecting any one of the thumbnail images 55A to be viewed in the portrait orientation and then by clicking the Rotate Clockwise button 56G or the Rotate Counter-Clockwise button 56H, the image data set representing the selected thumbnail image 55A is subjected to rotation by 90 degrees in the clockwise or counter-clockwise direction. As a result, the selected thumbnail image 55A can be displayed in the image display field 55 in the portrait orientation.

The thumbnail image 55A can be selected by clicking the desired thumbnail image with the mouse 22. The user can select multiple thumbnail images collectively by firstly clicking with the mouse 22 and then by clicking with the mouse 22 while pressing the control button or the shift button of the keyboard 23. The thumbnail image that has been selected is changed to have a frame color different from that of the other thumbnail images. By clicking the Select All button 56C, all the thumbnail images 55A displayed in the image display field 55 can be selected. In the case where the images are displayed over a plurality of pages, the user can change the page to be displayed by clicking one of the Page buttons 57A, or the Previous button 57B, or the Next button 57C in the page selection field 57. In this manner, the thumbnail images 55A represented by the image data sets other than the image data sets being displayed can be shown in the image display field 55.

The selection of the thumbnail image or images is not canceled by changing the page. By clicking the Cancel Selection button 56D, selection of the thumbnail image or images 55A only in the page being displayed can be canceled. By clicking the Reset button 56J, the selection of the thumbnail images 55A in all the pages can be canceled. In the case where the Delete button 56I, the Rotate Clockwise button 56G, or the Rotate Counter-Clockwise button 56H is clicked after any number of the thumbnail images 55A have been selected, the deletion or the rotation can be carried out on the image data sets representing all the thumbnail images that have been selected.

Figure 14:
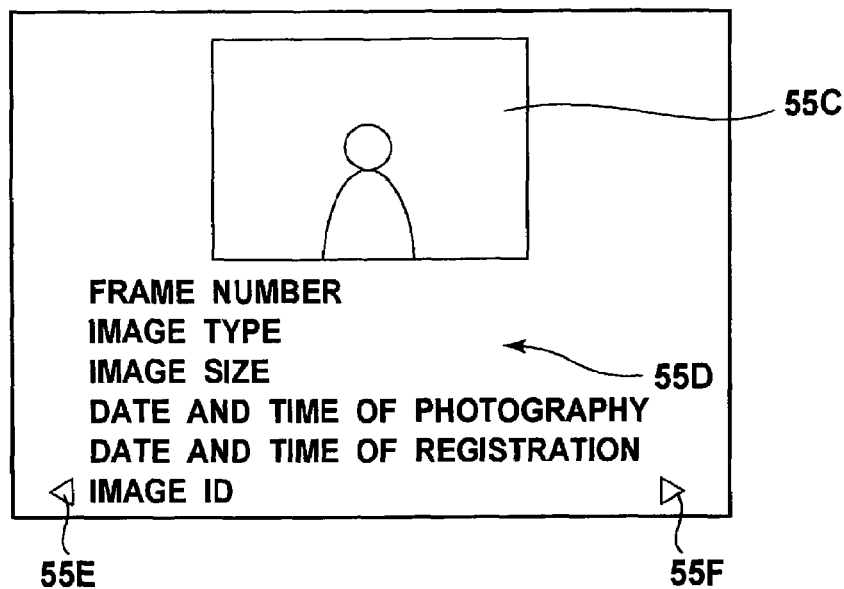
FIG. 14 shows an enlargement display screen.

By double-clicking any one of the thumbnail images 55A displayed in the image display field 55, an enlargement 55C of the selected thumbnail image 55A is displayed together with image information 55D thereof, as shown in FIG. 14. A Previous button 55E and a Next button 55F for respectively displaying enlargements of the images arranged immediately before and after the image being enlarged are displayed in the screen of the enlargement 55C, as shown in FIG. 14. The image information displayed in the enlargement screen includes the frame number of the image in the negative film, a type of image, an image size, the date and time of photography, the date and time of registration, and the image ID. The user can confirm the image and the image information thereof in detail, in the enlargement screen. By clicking the Previous button 55E or the Next button 55F, the image information of the image arranged before or after the current image can also be confirmed.

Figure 15:
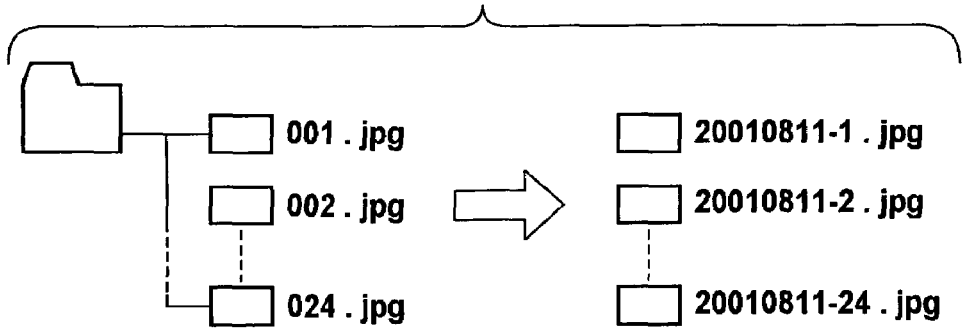
FIG. 15 is a diagram for explaining how the file names of image data sets are changed.

By clicking the Change Image Information button 56E after selecting one of the thumbnail images 55A, an image information change dialog box for changing the image ID (the file name) and the date and time of photography is displayed. The user can change the file name and the date and time of photography, by using the dialog box. In the case of changing the date and time of photography, if more than one of the thumbnail images 55A are selected and the Change Image Information button 56E is clicked thereafter, the date and time of photography and the file names can be changed for all the thumbnail images that have been selected. In this case, the file names may reflect the date and time of photography. For example, if the thumbnail images of the image data sets whose date of photography is the same are selected, the file names having consecutive numbers in order of photography are added to the image data sets by specifying the date of photography in the image information change dialog box. More specifically, as shown in FIG. 15, if the file names of the image data sets in the folder corresponding to the roll of film are 001.jpg, 002.jpg, and so on and if the user inputs Aug. 11, 2001 for the date of photography, the file names are changed to 20010811-1.jpg, 20010811-2.jpg and so on.

When the user selects the order of image sorting in the sorting order selection list 56B, the display order of the thumbnail images 55A in the display field 55, that is, the order of the image data sets in the folder corresponding to the roll of film being displayed, is changed.

Meanwhile, some cameras start recording photographs on a film from an initial position where the film is set therein and wind the film after completion of photography (hereinafter referred to as an ascending method), while other cameras wind a film first and rewind the film after each time of photography (hereinafter referred to as a descending method). In the case of a camera adopting the ascending method, the image generation apparatus 10 has read the images in order of photography. Therefore, the image data sets are arranged in order of photography in the folder corresponding to the roll of film. Consequently, the thumbnail images 55A are shown in order of photography, in the image display field 55. On the other hand, in the case of a camera adopting the descending method, the image generation apparatus 10 has read the images in reverse order. Therefore, in the folder corresponding to this roll of film, the image data sets are arranged in order that is opposite of the order of photography. Consequently, the thumbnail images 55A are displayed in the image display field 55 in the reverse order.

For this reason, in the case where the thumbnail images 55A are shown in the image display field 55 in the reverse order, the thumbnail images 55A (that is, the image data sets) can be sorted in order of photography, by selecting the chronological order from the sorting order selection list 56B. In the case where the reverse order is desired, the reverse order can be selected from the sorting order selection list.

By selecting another one of the film rolls in the film selection list 52A in the display selection field 52, the thumbnail images 55A being displayed in the image display field 55 can be changed to the thumbnail images represented by the image data sets in the folder corresponding to the selected roll of film. Since the film selection list 52A comprises the pull-down menu, the roll of film for display of the thumbnail images can be selected easily. By selecting another one of the film rolls and then selecting the image sorting order in the sorting order selection list 56B as has been described above, the image data sets read from the selected roll of film can be sorted in the selected order.

Figure 16:
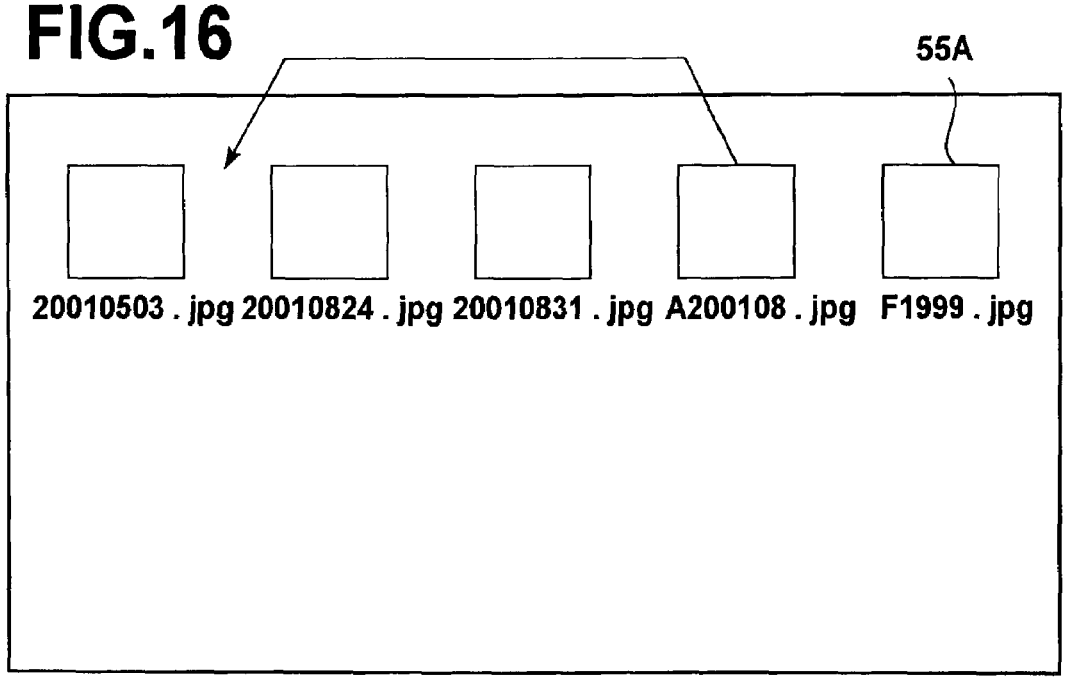
FIG. 16 shows an example of a manual sorting screen.

The image data sets may be sorted by a manual operation. This is because some of the image data sets may not be added with the information representing the date and time of photography or added with the substitute information representing inferred date and time of photography used instead of the actual date and time of photography. In this case, the image data sets can be sorted more appropriately in actual order of photography if the user carries out the sorting while viewing the images. For this purpose, a Manual Sorting button may be displayed in the filing function display field 56, for example. By clicking the Manual Sorting button, a manual sorting screen may be displayed as shown in FIG. 16 so that the user can sort the images by a manual operation.

The thumbnail images 55A selected in the film stocker display screen are shown in the manual sorting screen. The file name reflecting the date of photography is displayed under each of the thumbnail images 55A. If the file name is prefixed with "A" or "F", the file name is based on the inferred date and time of photography used for the actual date and time of photography. In particular, the prefix "F" refers to the inferred date and time of photography estimated from the manufacturing lot number of the film.

In the manual sorting screen, the user selects one of the thumbnail images 55A to change the order, drags the thumbnail image to a desired position and drops the thumbnail image thereat. In this manner, the order is changed. For example, if the thumbnail image whose file name is A200108.jpg is dragged and dropped between the thumbnail images whose file names are 20010503.jpg and 20010825.jpg, the image data set having the file name A200108 comes between the image data sets whose file names are 20010503.jpg and 20010825.jpg. At this time, the file name of the image data set is preferably changed automatically or manually so that the order of the image data sets can later be changed automatically. For example, the file name A200108.jpg is changed to 200107.jpg so that the image data set whose file name is A200108.jpg comes between the image data sets whose file names are 20010503.jpg and 20010825.jpg.

Meanwhile, image data sets obtained by a digital camera are automatically added with the information representing the date and time of photography. Image data sets read from an APS film are also added with the information of the date and time of photography recorded in a magnetic recording area of the APS film. However, in the case where the user has forgotten correction of a clock in a camera for a time difference on an overseas trip, the date and time of photography does not agree with the images, and information representing nighttime may be added to image data sets obtained in the daytime. The same problem occurs in the case where the user has forgotten correction of the time after battery change or in the case where the user has not corrected the time for a long time. In such a case, a function of collectively correcting the time difference after selecting the thumbnail images for time correction may be used. In this manner, the images are in accordance with the information representing the date and time of photography added to the image data sets.

Figure 17:
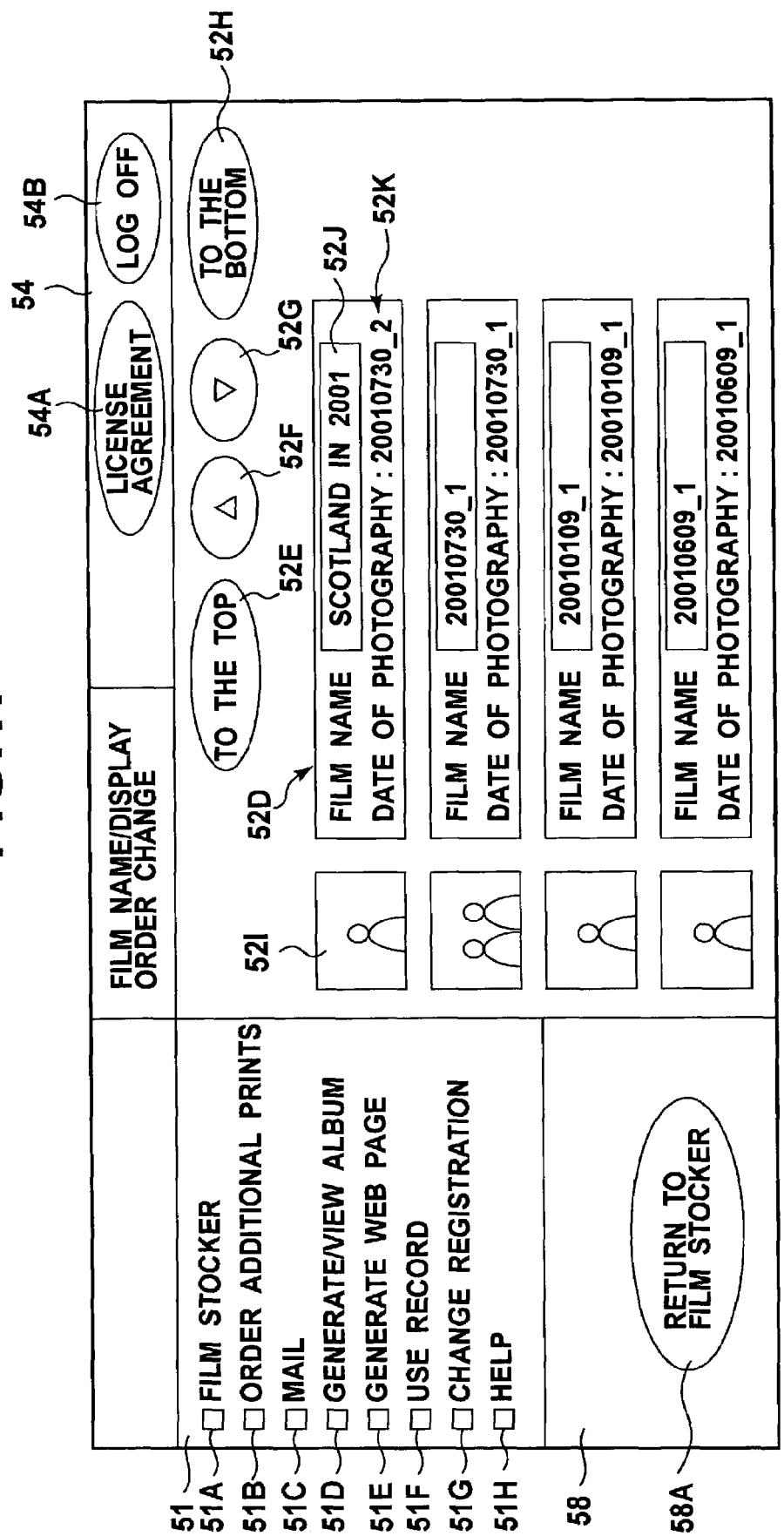
FIG. 17 shows an example of a film name/display order change screen.

By clicking the Change Film Name/Display Order button 52B in the display selection field 52, a film name/display order change screen is displayed. FIG. 17 shows an example of the film name/display order change screen. As shown in FIG. 17, film display fields 52D for identifying the film rolls, and buttons 52E~52H for moving one of the rolls of films selected from the film rolls displayed in the film display fields 52D to the top, upward by one position, downward by one position, and to the bottom are shown. The function display field 51 and the title display field 54 are also shown. Furthermore, instead of the display selection field 52 in the film stocker display screen, a button display field 58 including a Return to Film Stocker button 58A for returning to the film stocker display screen is shown. The title in the title display field 54 has been changed to "Film Name/Display Order Change".

In the film display fields 52D are shown thumbnail images 52I represented by the image data sets in the head of the respective film rolls, film name input fields 52J for inputting the names of the respective films, and photography date display fields 52K for displaying the dates of photography regarding the respective film rolls. More specifically, the photography date is the date of photography when the image data set corresponding to each of the thumbnail images 52I was obtained. The user selects a desired one of the thumbnail images 52I in the film display fields 52D in the film name/display order change screen, and then clicks any one of the buttons 52E~52H. In this manner, the order of display can be changed regarding the film roll corresponding to the selected film display fields 52D. The thumbnail image 52I that has been selected is changed to have a frame color different from that of the other thumbnail images 52I in the film display fields 52D. When the user inputs the name of the film roll as desired in the corresponding film name input filed 52J, the name is given to the film roll. The date of photography of the images included in the film or the date of reading the images from the film in the mini-laboratory is used as the name of the film as a default. The film name is also used as the name of the folder for storing the image data sets obtained from the film.

By clicking the Return to Film Stocker button 58A after the film name and/or the display order have been changed, the film stocker display screen shown in FIG. 13 is displayed again.

Figure 18:
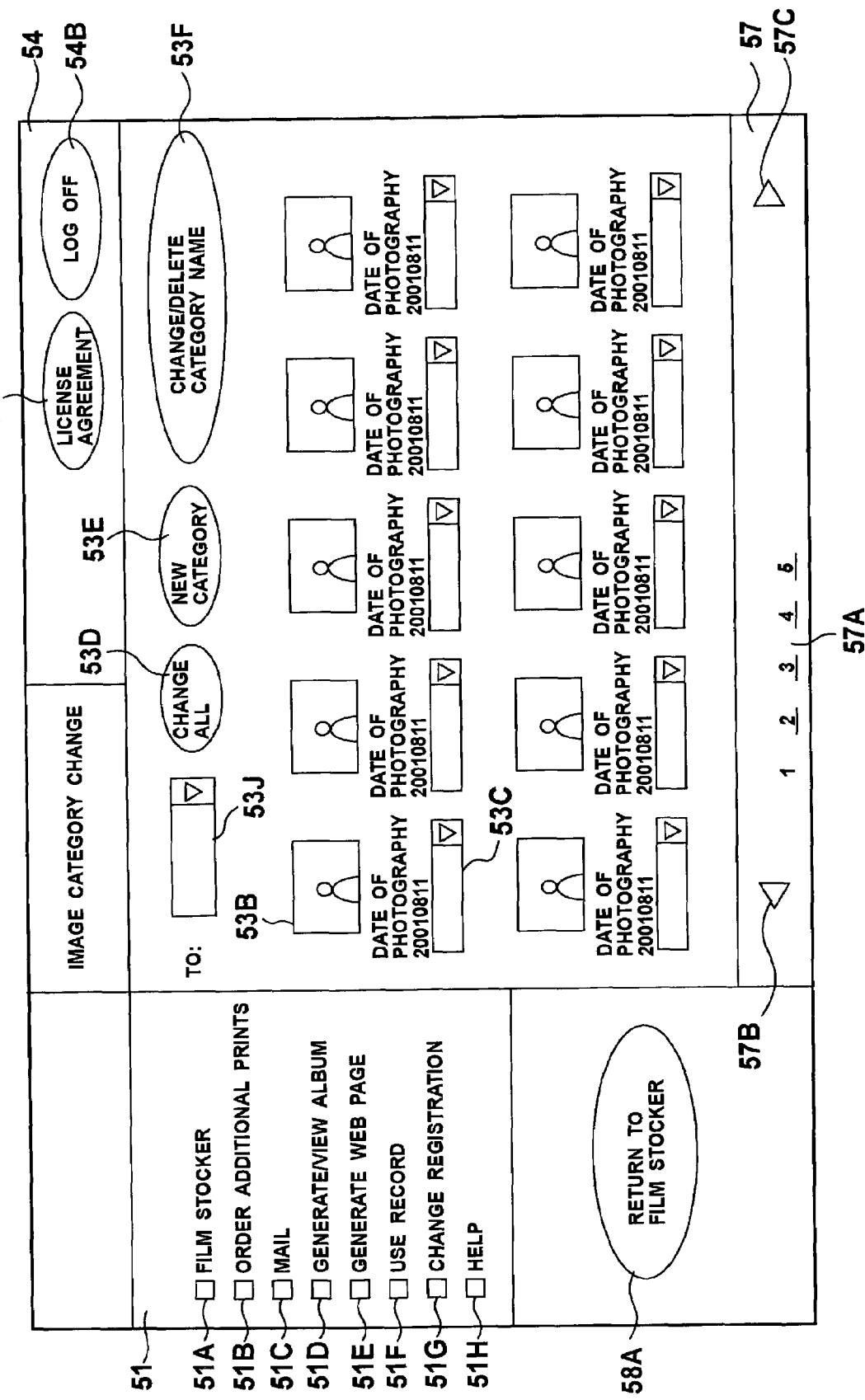
FIG. 18 shows an example of an image category change screen.

When the user clicks the Change Image Category button 56F after selecting any one of the thumbnail images 55A corresponding to the image data set that needs a category change, an image category change screen is displayed. FIG. 18 shows an example of the image category change screen. As shown in FIG. 18, the image category change screen comprises thumbnail images 53B selected in the film stocker display screen, category input lists 53C corresponding to the thumbnail images 53B, a Change All button 53D for carrying out the category change on all the images, a New Category button 53E for generating a new category, and a Change/Delete Category Name button 53F for changing or deleting the one of the categories. A category input list 53J is displayed on the left of the Change All button 53D, for inputting the category applied to all the images. The image category change screen also comprises the function display field 51, the title display field 54 and the page selection field 57. Instead of the display selection field 52 in the film stocker display screen, the button display field 58 is also shown. The title in the title display field 54 has been changed to "Image Category Change".

The categories are predefined, such as trip, athletic contest, coming-of-age ceremony, and celebration for children of 3, 5, and 7 years old, for example. A pull-down menu of the respective category input lists 53C and 53J includes those categories. By clicking the New Category button 53E, a new category generation dialog box is displayed. A new category becomes available by an input of the name of the new category in the new category generation dialog box, and the new category is added to the pull-down menu of the respective category input lists 53C and 53J.

By clicking the Change/Delete Category Name button 53F, a dialog box is displayed for category name change/deletion. The changed or deleted category name is reflected in the pull-down menu of the respective category input lists 53C and 53J.

From the thumbnail images 53B displayed in the image category change screen, the user selects any one of the thumbnail images 53B for the category change. The user then selects one of the categories from the corresponding category input list 53C. In this manner, the category of the image data set corresponding to the selected thumbnail image 53B can be changed. The selected thumbnail image has a frame that is colored differently from the other thumbnail images 53B.

In the case where no category has been set for one of the image data sets, the user selects the thumbnail image 55A corresponding to the image data set in the film stocker display screen. By adding the thumbnail image to the thumbnail images 53B in the image category change screen, the user can carry out category setting on the image data set.

If the user selects one of the categories from the category input list 53J and clicks the Change All button 53D, the category that was set for the image data sets corresponding to all the thumbnail images in the page can be changed collectively to the selected category.

By clicking the Return to Film Stocker button 58A after the category change, the film stocker display screen shown in FIG. 13 is displayed again.

The processing to be carried out on the images is not necessarily limited to the sorting, deletion, and rotation described above. For example, trimming or color density correction may also be carried out. Furthermore, a preference of the user for soft-tone or hard-tone images or an impression of a portrait scene, a landscape scene, and the like at the time of photography may also be reflected in the image data sets.

Moreover, whether or not the image data sets can be shared with a third person can also be set at the time of image filing. If the image data sets can be shared, the common ownership information in the image property information shown in FIG. 9 is set to allow sharing with a third person.

The user may browse through image data sets which were allowed to be browsed by a third person by another user at the time of image filing. The image data sets can therefore be copied to the folder of the user. In this case, in order not to increase the data size in the image storing server 40, it is preferable for the user to copy only the shortcut to the image data sets.

The category of the image data sets that can be shared with a third person may be judged so that the third person can browse through the image data sets according to the category.

After the images have been organized in the above manner, the user can use the images by using the functions corresponding to the buttons displayed in the function display field 51.

Figure 19:
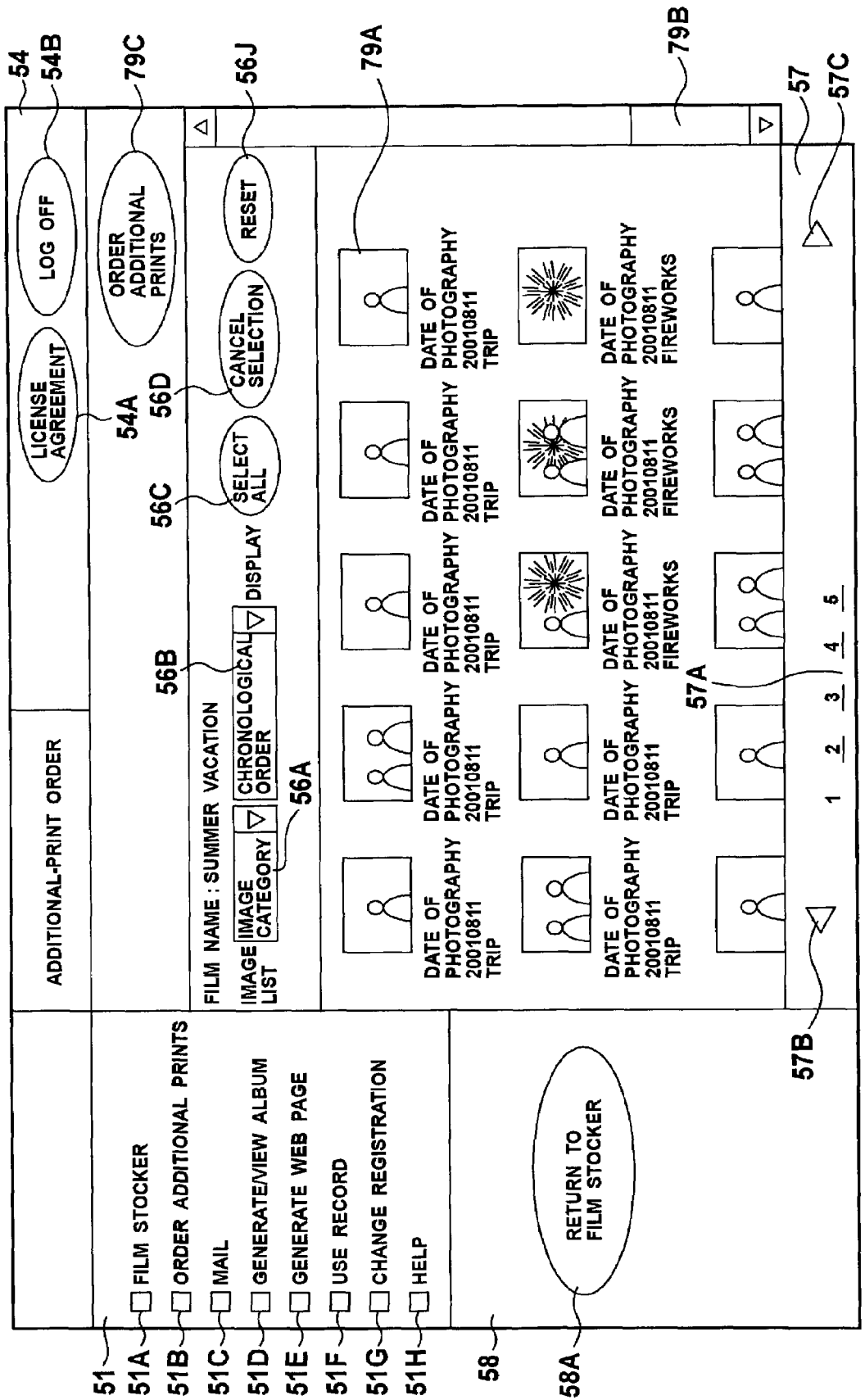
FIG. 19 shows an example of an additional-print order screen.

For example, by clicking the Order Additional Prints button 51B in the function display field 51, an additional-print order screen is displayed, and the user can place an order for an additional print or additional prints (hereinafter referred to as the additional prints). FIG. 19 shows an example of the additional-print order screen. As shown in FIG. 19, the screen comprises thumbnail images 79A which are the same as the thumbnail images 55A shown in the film stocker display screen, the category selection list 56A, the sorting order selection list 56B, the Select All button 56C, the Cancel Selection button 56D, the Reset button 56J, a scroll bar 79B for scrolling the screen, and an Order Additional Prints button 79C for placing the order for the additional prints regarding the images selected by the user. The function display field 51, the title display field 54, and the page selection field 57 are also shown in the additional print order screen. Instead of the display selection field 52 in the film stocker display screen, the button display field 58 is shown therein. The title in the title display field 54 has been changed to "Additional-Print Order".

The user selects the thumbnail images 79A corresponding to the image data sets used for the additional-print order. At this time, the user can display the thumbnail images 79A as desired, by using the buttons in the page selection field 57 or the like. For example, the user can display only the thumbnail images in a desired one of the categories by using the category selection list 56A, or can change the order of display of the thumbnail images 79A by using the sorting order selection list 56B. Furthermore, the user can easily carry out thumbnail image selection and cancellation thereof, by using the Select All button 56C, the Cancel Selection button 56D and the Reset button 56J. After selection of the thumbnail images 79A, the user clicks the Order Additional Prints button 79C. An order confirmation screen is then displayed.

FIG. 20 shows an example of the order confirmation screen. As shown in FIG. 20, the order confirmation screen comprises thumbnail images 79E which are the same as the thumbnail images selected in the additional-print order screen, print size lists 79F used respectively for inputting a print size, print type lists 79G used respectively for inputting a print type (such as with or without white margin), quantity input fields 79H used respectively for inputting a quantity, attribute display fields 79I for respectively displaying the file names and the dates of photography regarding the thumbnail images 79E, a scroll bar 79J for scrolling the screen, a Confirm Order button 79K for confirming the order, a Cancel button 79L for returning to the additional-print order screen, and a charge display field 79M for displaying printing charges. Each of the print size lists 79F and each of the print type lists 79G comprises a pull-down menu. The print size lists 79F, the print type lists 79G, the quantity input fields 79H, and the attribute display fields 79I are displayed in accordance with the thumbnail images 79E.

The user confirms the print charges displayed in the charge display field 79M, and selects one of the print sizes in each of the print size lists 79F as desired. The user also selects one of the print types from each of the print type lists 79G, and inputs the quantity in each of the quantity input fields 79H. The thumbnail images 79E may be enlarged if double-clicked.

When the user clicks the Confirm Order button 79K, order information is generated that describes the image ID, the print size, the print type, the quantity of each of the image data sets to be printed, in addition to the name of the user, for example. The order information is sent from the communication terminal 20 to the image storing server 40. The image storing server 40 sends the order information and the image data sets to be printed to the mini-laboratory from which the user requested film development and printing. The additional prints are then generated in the mini-laboratory. The user visits the mini-laboratory later, and receives the prints by paying the charge. An agency for receiving the prints may be specified at the time of placing the additional-print order. In this case, the user can specify another one of the mini-laboratories as the agency, which is different from the mini-laboratory that carried out film development.

If the user clicks the Confirm Order button 79K or the Cancel button 79L, the additional-print order screen shown in FIG. 19 is displayed again. By clicking the Return to Film Stocker button 58A therein, the film stocker display screen is shown again.

Figure 21:
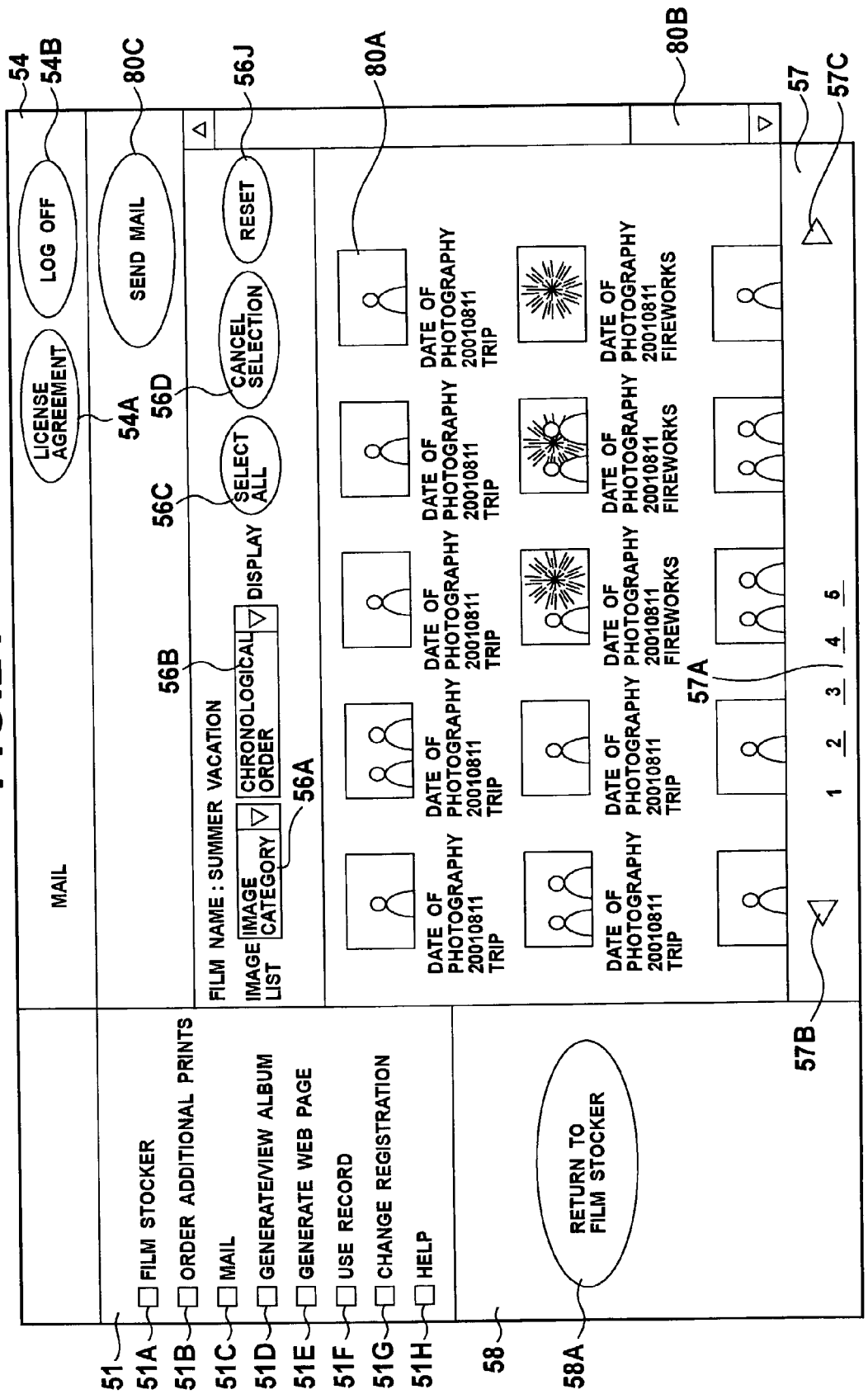
FIG. 21 shows an example of a mail screen.

Meanwhile, by clicking the Mail button 51C in the function display field 51, a mail screen is displayed and the user can send an E-mail massage attached with any number of the image data sets. FIG. 21 shows an example of the mail screen. In the mail screen are displayed thumbnail images 80A which are the same as the thumbnail images 55A in the film stocker display screen, the category selection list 56A, the sorting order selection list 56B, the Select All button 56C, the Cancel Selection button 56D, the Reset button 56J, a scroll bar 80B for scrolling the screen, and a Send Mail button 80C for sending the E-mail message attached with any number of the thumbnail images selected by the user. The mail screen also comprises the function display field 51, the title display field 54, and the page selection field 57, in addition to the button display field 58 that replaces the display selection field 52 in the film stocker display screen. The title in the title display field has been changed to "Mail".

The user selects any number of the thumbnail images (hereinafter referred to as the thumbnail images) corresponding to the image data sets to be attached to the E-mail message, from the thumbnail images 80A displayed in the mail screen. At this time, the user can display the thumbnail images as desired, by using the buttons in the page selection field 57 or the like. For example, the user can display only the thumbnail images in a desired one of the categories by using the category selection list 56A, or can change the order of display of the thumbnail images 80A by using the sorting order selection list 56B. Furthermore, the user can easily carry out selection of the thumbnail images 80A and cancellation thereof by using the Select All button 56C, the Cancel Selection button 56D and the Reset button 56J. After selection of the thumbnail images 80A, a mail sending screen is displayed if the user clicks the Send Mail button 80C.

Figure 22:
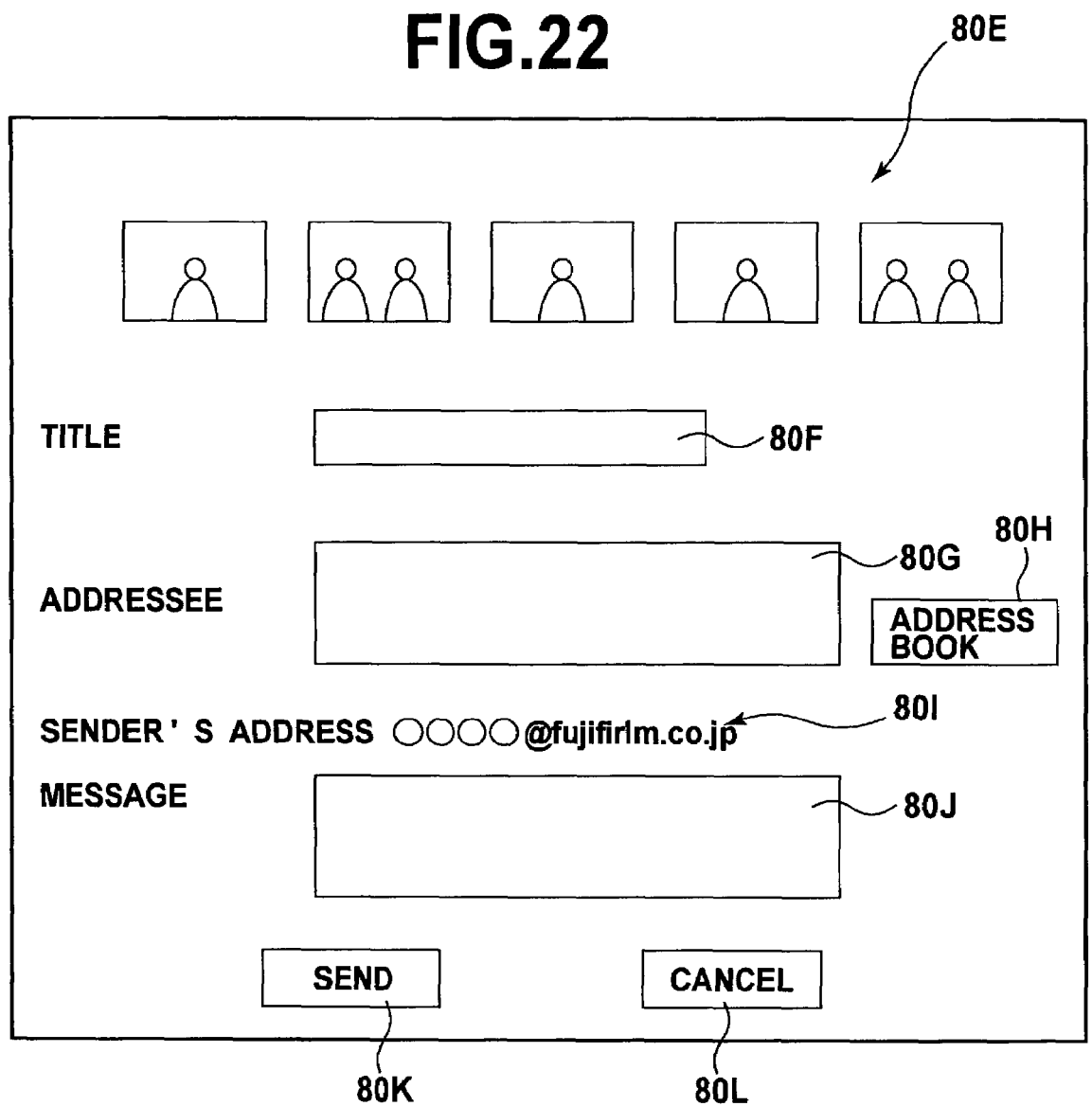
FIG. 22 shows an example of a mail sending screen.

FIG. 22 shows an example of the mail sending screen. In the mail sending screen are displayed thumbnail images 80E which are the thumbnail images selected in the mail screen, a title input field 80F for inputting a title of the E-mail message, an address input field 80G for inputting the E-mail address of an addressee, an Address Book button 80H for opening an address book in the case where the address book that stores E-mail addresses including the E-mail address of the addressee is available, a sender's address field 80I for describing the E-mail address of the sender, a message input field 80J for inputting a message, a Send button 80K for sending the E-mail message, and a Cancel button 80L for returning to the mail screen.

The user inputs the title of the E-mail message in the title input field 80F, and inputs the E-mail address of the addressee in the address input field 80G. The user then inputs the message in the message input field 80, and sends the E-mail message attached with the image data sets corresponding to the selected thumbnail images 80E by clicking the Send button 80K.

When the user clicks the Send button 80K or the Cancel button 80L, the mail screen shown in FIG. 21 is displayed again. By clicking the Return to Film Stocker button 58A therein, the film stocker display screen is shown again.

Figure 23:
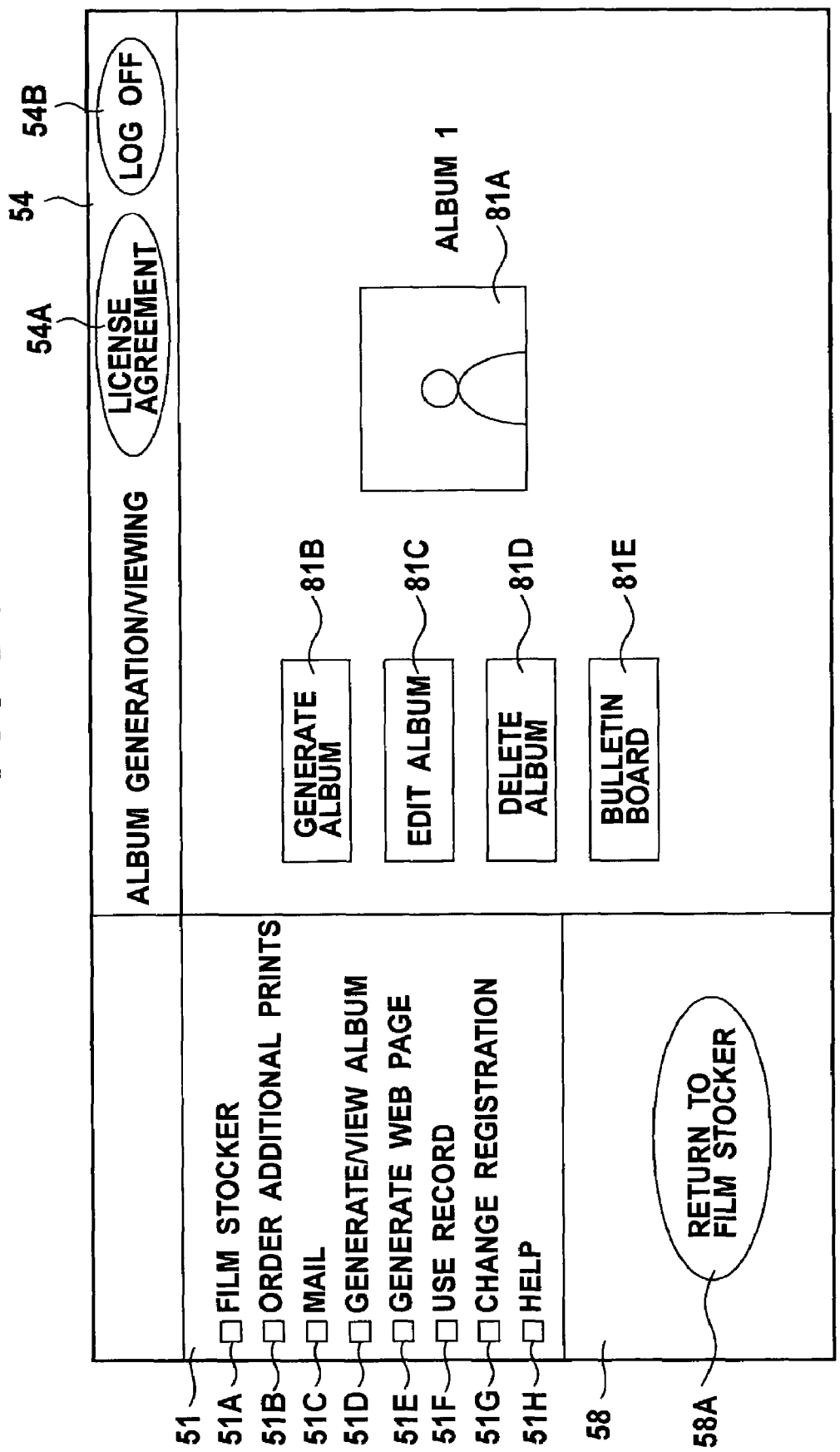
FIG. 23 shows an example of an album generation/viewing screen (part 1)

If the user clicks the Generate/View Album button 51D in the function display field 51, an album generation/viewing screen is displayed. FIG. 23 is an example of the album generation/viewing screen. As shown in FIG. 23, the album generation/viewing screen comprises a thumbnail image 81A which is a representative image in an album available for viewing if the album already exists, a Generate Album button 81B for generating a new album, an Edit Album button 81C used for an album editing operation, a Delete Album button 81D used for album deletion, and a Bulletin Board button 81E for displaying a bulletin board that will be explained later. The function display field 51 and the title display field 54 are also shown in the album generation/viewing screen. The button display field 58 is also displayed therein, instead of the display selection field 52 in the film stocker display screen. The title in the title display field 54 has been changed to "Album Generation/Viewing".

Figure 24:
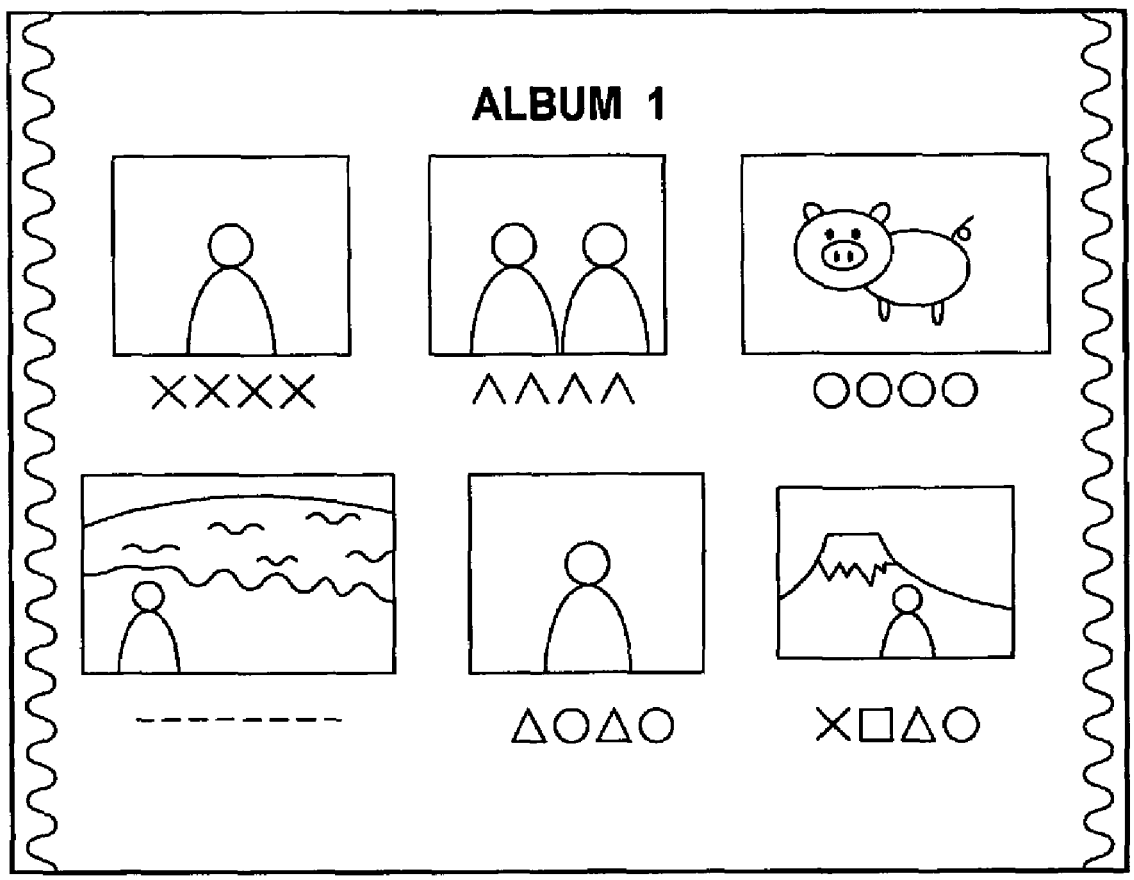
FIG. 24 shows an example of an album display screen.

The album generation/viewing screen shown in FIG. 23 shows a state wherein the one album already exists. By clicking the name of the album ("Album 1" in this example), the user can browse through the album, as shown in FIG. 24, for example.

Figure 25:
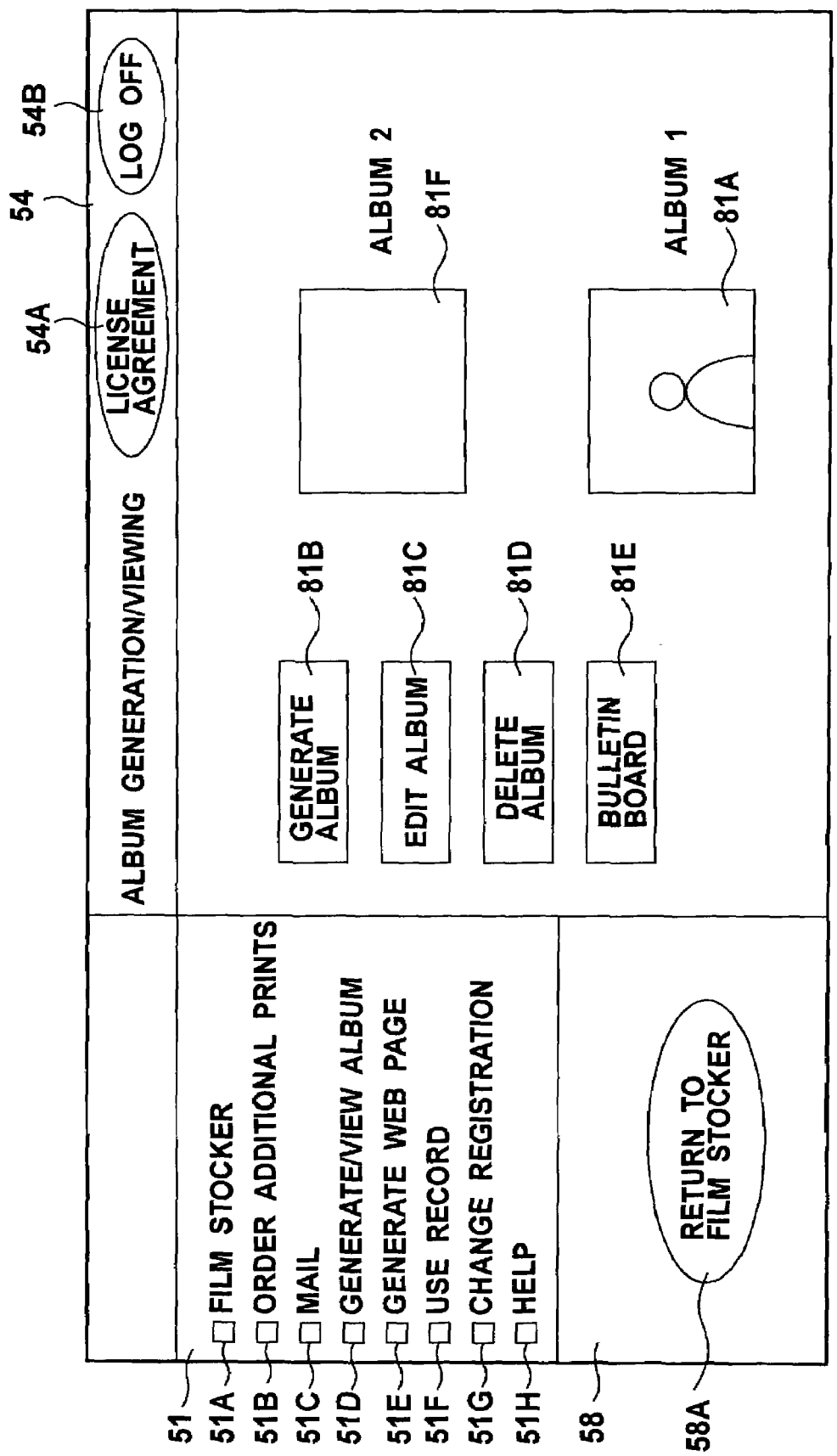
FIG. 25 shows an example of the album generation/browsing screen (part 2)

By clicking the Generate Album button 81B, the user can display a frame 81F for the new album, as shown in FIG. 25. By clicking the Edit Album button 81C after selecting the frame 81F, the user can edit the new album.

Figure 26:
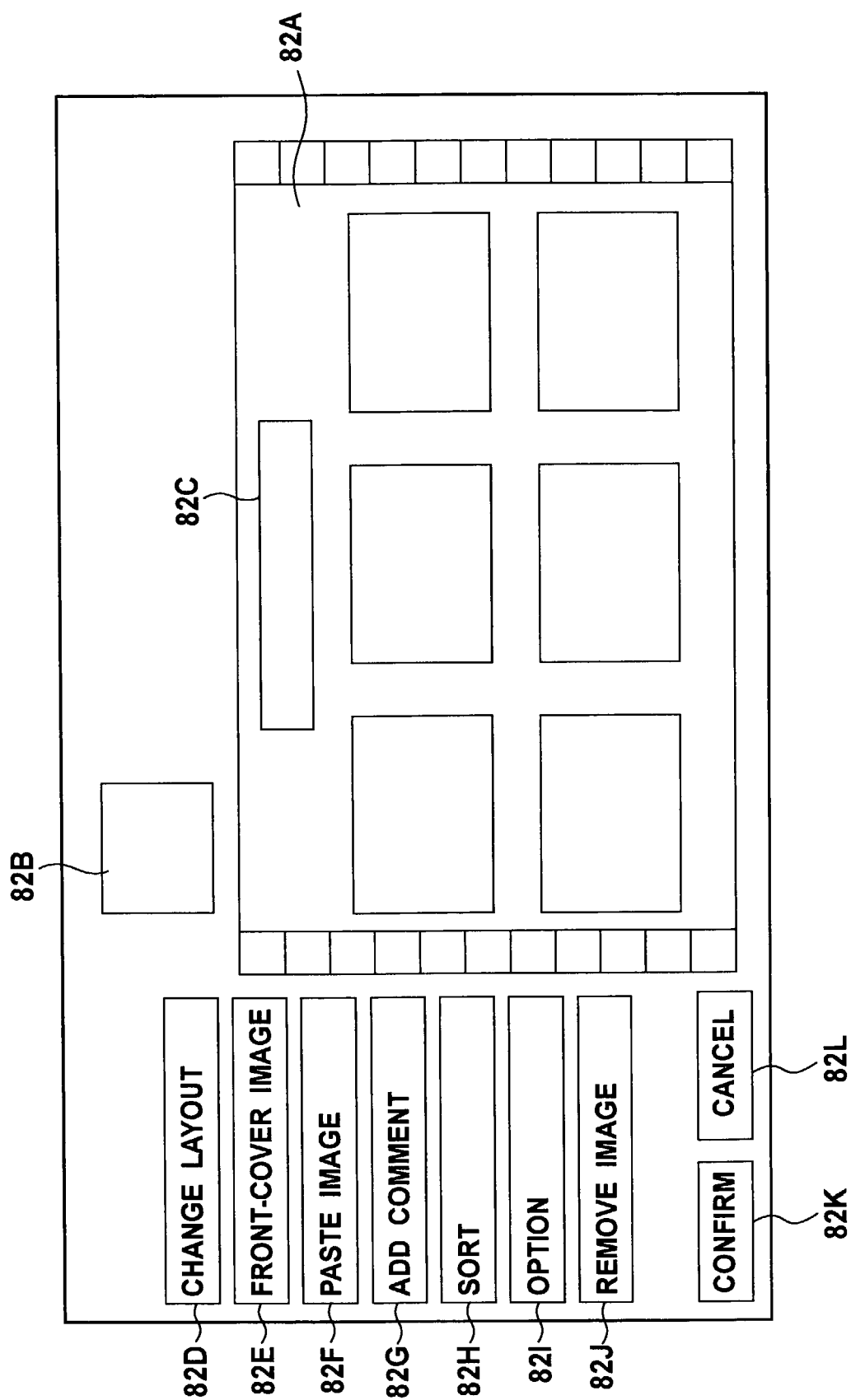
FIG. 26 shows an example of an album editing screen.

FIG. 26 shows an example of an album editing screen. In the album editing screen are displayed a layout field 82A for showing a layout of the album, a front-cover image field 82B for displaying the front cover image of the album, a title input field 82C for inputting the title of the album, a Change Layout button 82D for changing the layout, a Front-Cover Image button 82E for changing the front-cover image, a Paste Image button 82F for pasting the images in the layout field 82A, an Add Comment button 82G for adding a comment on the images, a Sort button 82H for sorting the images, an Option button 82I, a Remove Image button 82J for removing any one of the images, a Confirm button 82K for confirming the content of the album, and a Cancel button 82L for returning to the album generation/viewing screen.

Upon generation of the new album, a default layout is displayed in the layout field 82A. By clicking the Change Layout button 82D, a layout change dialog box is displayed for changing the layout. The dialog box includes a plurality of album layouts and the user can select a desired one of the layouts. In this manner, the user can change the layout of the album to be newly generated.

By clicking the title input field 82C, the user can display a cursor therein and can input the title in the title input field.

Figure 27:
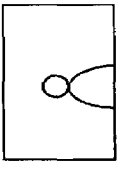
FIG. 27 shows an example of an image selection screen.

If the user clicks the Front-Cover Image button 82E, an image selection screen is displayed. FIG. 27 shows an example of the image selection screen. As shown in FIG. 27, thumbnail images 83A that are the same as the thumbnail images 55A in the film stocker display screen are displayed in the image selection screen. An OK button 83B for confirming selection, and a Cancel button 83C for returning to the album editing screen are also shown in the image selection screen. The user selects a desired one of the images to be used for the front cover, and clicks the OK button 83B in the image selection screen. The image selected in this screen is displayed in the front-cover image display field 82B in the album editing screen.

Frames for pasting the images are shown in the layout field 82A. If the user selects one of the frames and clicks the Paste Image button 82F, an image selection screen shown in FIG. 27 is displayed. The user selects one of the images and clicks the OK button 83B in the image selection screen. In this manner, the image selected in the image selection screen is displayed in the frame selected in the layout field 82A in the album editing screen. By repeating this procedure, the images to be included in the album are pasted in the frames in the layout field 82A.

If the user selects one of the images that has been pasted in the layout field 82A and clicks the Remove Image button 82J thereafter, the selected image is removed from the album.

Figure 28:
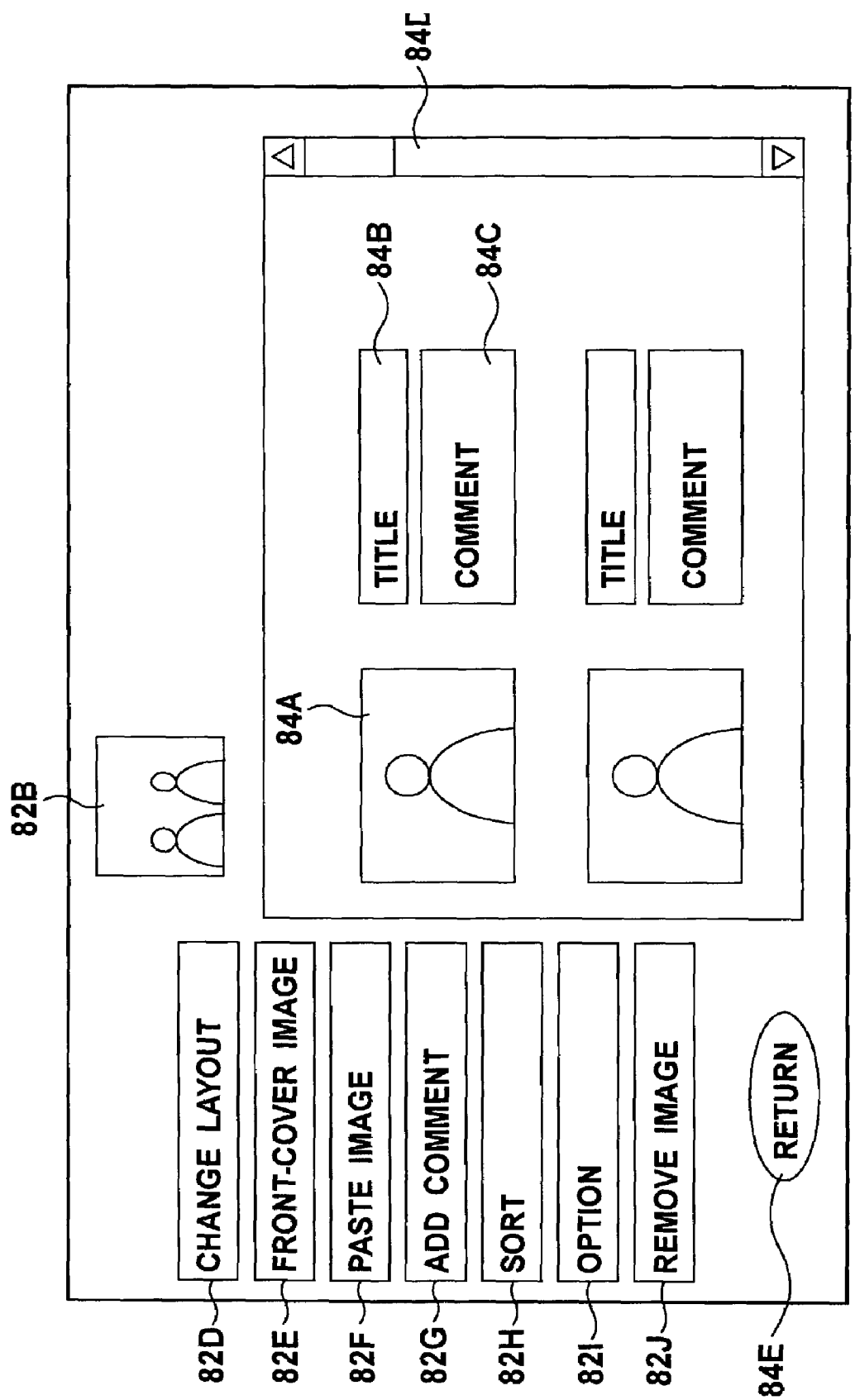
FIG. 28 shows an example of a comment input screen.

When the user clicks the Add Comment button 82G, a comment input screen is displayed. FIG. 28 shows an example of the comment input screen. The comment input screen comprises thumbnail images 84A representing the images pasted in the layout field 82A, title input fields 84B for inputting titles of the respective images, comment input fields 84C for inputting comments for the respective images, a scroll bar 84D for scrolling the screen, and a Return button 84E for returning to the album editing screen. The title input fields 84B and the comment input fields 84C are displayed in accordance with the respective thumbnail images 84A.

The user can input the titles and the comments of the respective images in the title input fields 84B and the comment input fields 84C. If the user clicks the Return button 84E after the input, the album editing screen is displayed again.

Figure 29:
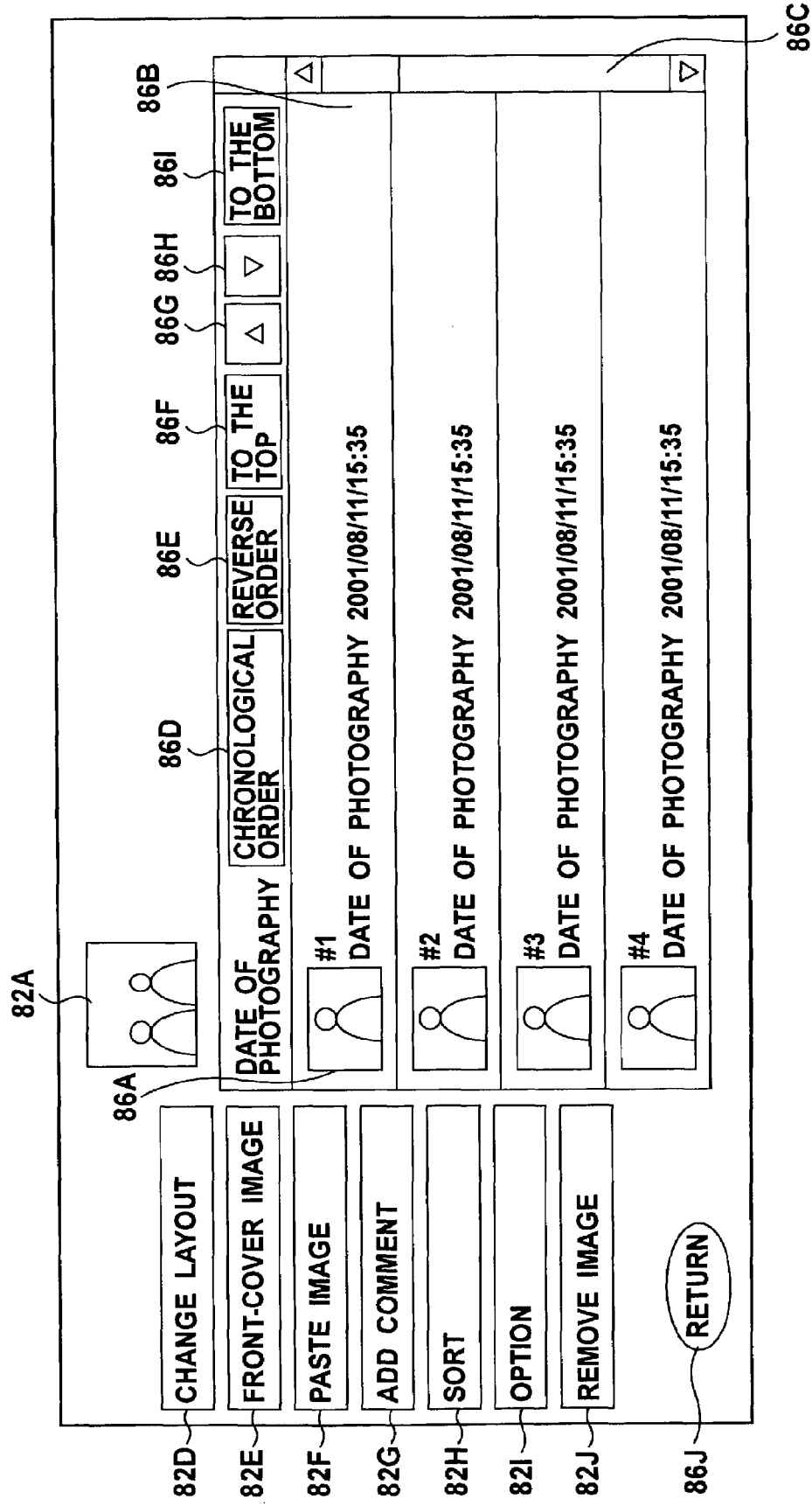
FIG. 29 shows an example of an image sorting screen.

If the user clicks the Sort button 84H, an image sorting screen is displayed. FIG. 29 shows an example of the image sorting screen. In the image sorting screen are displayed thumbnail images 86A representing the thumbnail images pasted in the layout field 82A, display fields 86B for displaying the dates of photography and the display order for the corresponding thumbnail images 86A, a scroll bar 86C for scrolling the display fields 86B, a Chronological Order button 86D and a Reverse Order button 86E for sorting the images pasted in the layout field 82A in the chronological order or in the reverse order according to the date of photography, buttons 86F~86I for moving a selected one of the display fields 86B to the top, upward by one position, downward by one position, and to the bottom, and a Return button 86J for returning to the album editing screen.

The user can rearrange the order of the images pasted in the layout field 82A as desired, by selecting one of the display fields 86B and by clicking any one of the buttons 86F~86I for moving. If the user clicks the Return button 86J thereafter, the album editing screen is displayed again.

By clicking the Option button 82I, the user can determine whether or not the album can be disclosed. In the case of disclosure of the album, the user can set a password and can send an E-mail message to his/her friend for notifying the password for viewing the album, for example. The URL enabling the friend to view the album may be sent via the E-mail message, instead of the password.

By clicking the Confirm button 82K, the user can confirm the content of the album, and a folder for the album is then generated. Since a free space in the image storing server 40 becomes small if the image data sets are copied in the folder for the album, it is preferable for the shortcut to the image data sets to be copied. By clicking the Cancel button 82L, the album generation is canceled and the album generation/viewing screen is displayed again. Furthermore, the user can display the film stocker display screen again by clicking the Return to Film Stocker button 58A.

When the user clicks the Edit Album button 81C in the album generation/viewing screen, the album editing screen shown in FIG. 26 is displayed. As in the case of new album generation, the user can edit the album. By selecting one of the existing albums and clicking the Delete Album button 81D in the screen, the user can delete the selected album.

If the user clicks the Bulletin Board button 81E in the album generation/viewing screen, a bulletin board screen is displayed. This screen is for exclusive use by the persons who are allowed to view the album, and used for writing an impression of the album therein, for an announcement of a new album, and for a communication among the persons.

Figure 30:
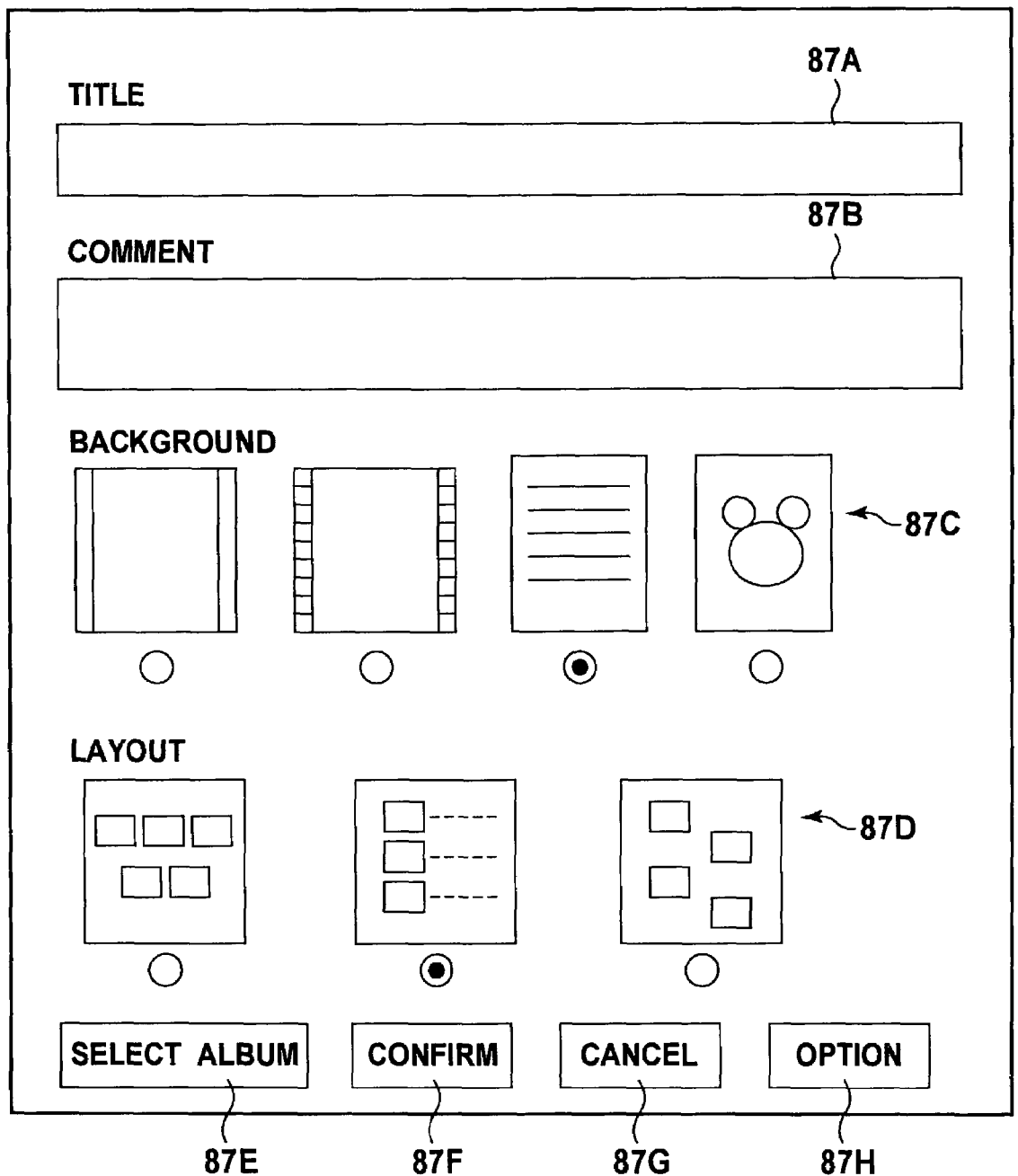
FIG. 30 shows an example of a web page generation screen.

If the user clicks the Generate Web Page button 51E in the function display field 51, a Web page generation screen is displayed. FIG. 30 is an example of the Web page generation screen. In the Web page generation screen are displayed a title input field 87A for inputting the title of a Web page, a comment input field 87B for inputting a comment to be displayed in the top page, a background selection field 87C for selecting a background of the Web page, a layout selection field 87D for selecting a layout of the Web page, a Select Album button 87E for selecting any one of the albums to be displayed in the Web page, a Confirm button 87F for confirming the content, a Cancel button 87G for canceling generation of the Web page and for returning to the film stocker display screen, and an Option button 87H.

Option buttons corresponding to background images and layouts are displayed in the background selection field 87C and the layout selection field 87D. By selecting one of the option buttons, the user can select the desired background image or the desired layout.

Figure 31:
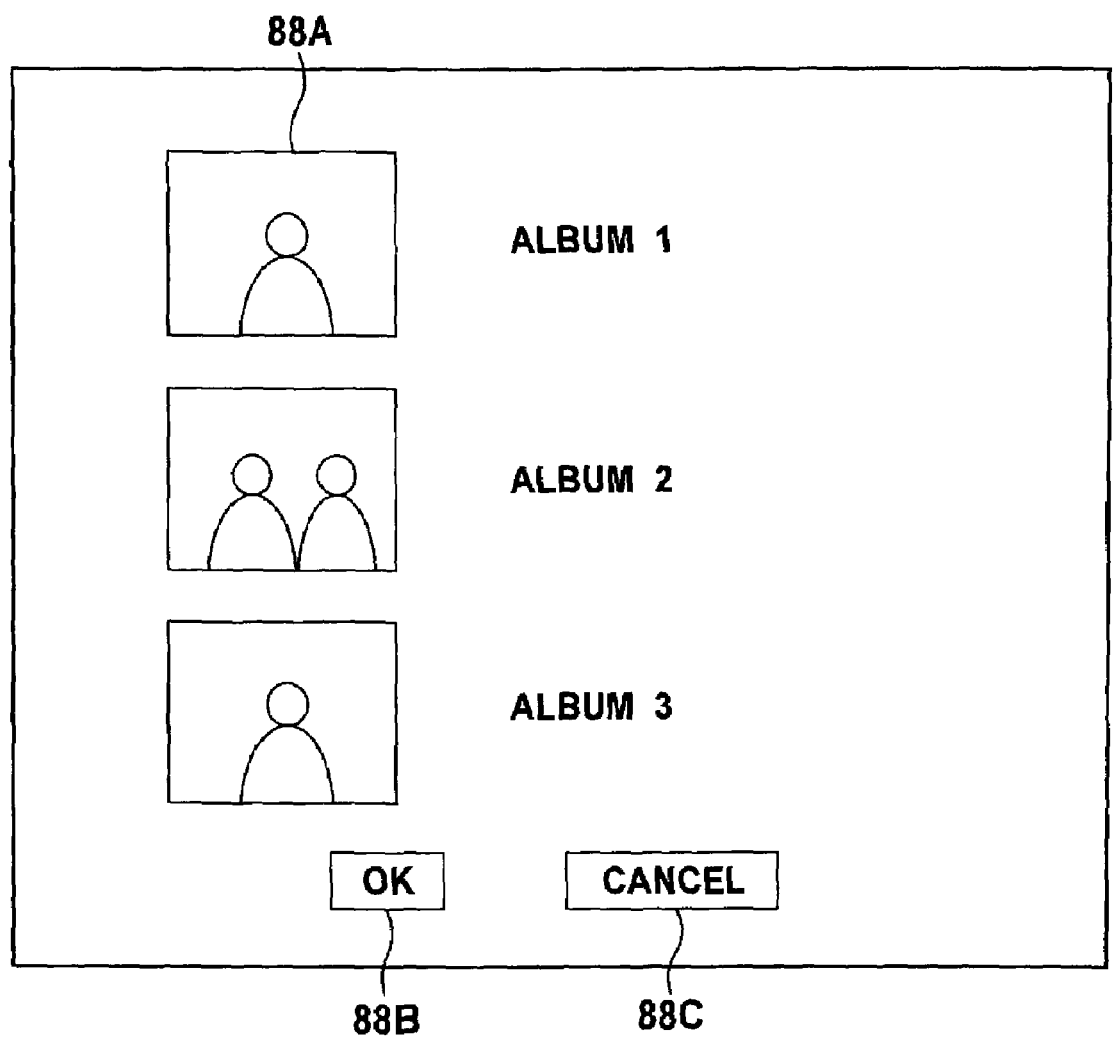
FIG. 31 shows an example of an album selection screen for insertion in a web page.

If the user clicks the Select Album button 87E, an album selection screen for selecting the album to be displayed in the Web page is shown. FIG. 31 shows an example of the album selection screen. The album selection screen comprises thumbnail images 88A representing the front-cover images of the respective albums, an OK button 88B for confirming the selection, and a Cancel button 88C for returning to the Web page generation screen. Each of the albums may be displayed in response to clicking the title thereof. The user selects one of the albums to be displayed in the Web page by using the mouse 22 in the album selection screen, and clicks the OK button 88B. In this manner, the album to be displayed in the Web page can be selected.

The user selects the album as has been described above, and inputs the title of the Web page in the title input field 87A. The user further inputs the comment in the comment input field 87B, and selects the background and the layout. By clicking the Confirm button 87F, the user can generate the Web page.

By clicking the Option button 82I, the user can set a password in the case of disclosure of the Web page, and can send an E-mail message to his/her friend for notifying the password for viewing the album, for example. The URL enabling the friend to view the Web page may be sent via the E-mail message, instead of the password.

The image storing server 40 may further have various functions other than the functions of additional-print order, E-mail, album generation/viewing, and Web page generation described above. For example, the image storing server 40 may have functions for ordering a bound album, a chronological display of the images in any one of the albums, an application to a mobile phone, editing of the images in the form of a chronological table, and manipulation such as character insertion and trimming on the images. In this case, buttons corresponding to these functions are displayed in the function display field 51 so that the user can cause the image storing server 40 to carry out the functions by using the buttons.

The user can also confirm the use record by referring to the image property information of the image data sets in the image storing server 40, by clicking the Use Record button 51F in the function display field 51. The use record is displayed in the form of a table for each of the image data sets. For example, items such as the file name, the date of photography, the storage period, an additional print order, attachment to an E-mail message, and album generation are displayed in the table. The use record includes information indicating to whom the E-mail message have been sent. The user can easily confirm how he/she has used which of the image data sets for what purpose, by viewing the use record.

Figure 32:
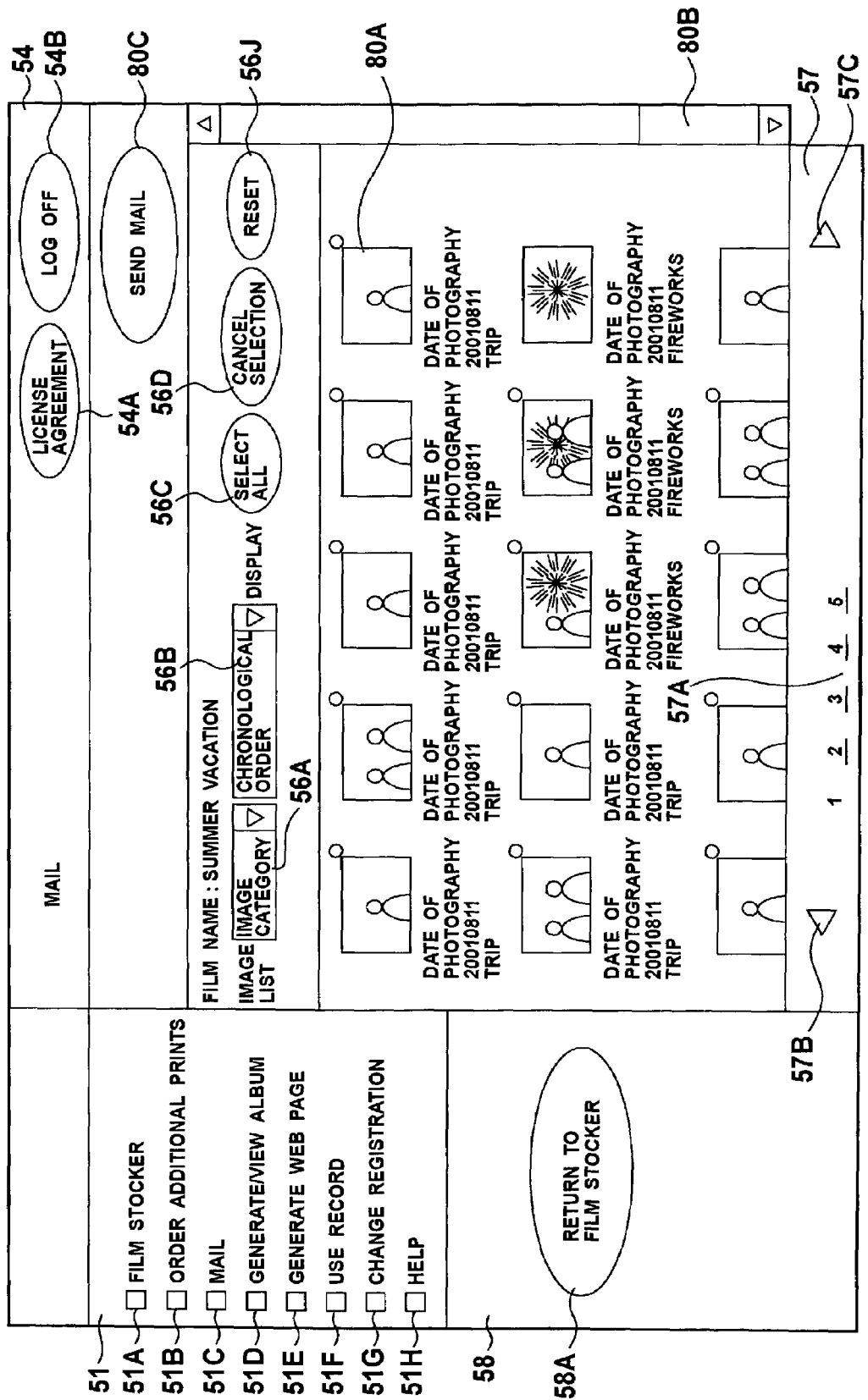
FIG. 32 shows another example of the mail screen.

The user may confirm whether or not the additional print order has been placed in the additional print order screen shown in FIG. 19 and whether or not the images have been sent with an E-mail message in the mail screen shown in FIG. 21, by using the use record in the image property information. For example, as shown in FIG. 32, a circle may be displayed to the upper right corner of each of the thumbnail images 80A that has been sent by being attached to an E-mail message in the mail screen. In this manner, the user can prevent an erroneous retransfer of the same image data set that has been sent to the same addressee.

By clicking the Change Registration button 51G in the function display field 51, a registration change screen is displayed for changing the information on the user, such as the name, the address, the phone number, the fax number, the E-mail address, the name used for logging on, and the password. The user can change the information in the registration change screen.

By clicking the Help button 51H in the function display field 51, the user can learn how to use the functions displayed in the function display field.

The procedure carried out by the user with use of the communication terminal 20 has been explained. The image storing server 40 can further carry out the following processing.

The image storing server 40 can carry out promotion by providing information to the user, by using the clocking function of the personal computer 46. The image storing server 40 searches the image information storing database 73 for the image property information and the user information, and extracts information on events regarding the user, such as the birthday, celebrations for children of 3, 5, and 7 years old, the coming-of-age ceremony, a wedding date, and a memorial service, for example. The image storing server 40 adds the extracted information and the dates of the events to the image information storing database 53. When one of the events comes in a predetermined number of days, the image storing server 40 sends a promotion E-mail message to the user for notifying the user of the coming event. A direct mail may be sent to the address of the user according to the user information, instead of the E-mail message.

As an example of such events, the image storing server 40 extracts all of the users who are 19 years old from the user information in the image information storing database 73 so that the image storing server 40 can carry out promotion of the coming-of-age ceremony by sending information regarding a service of taking photographs in the ceremony, a few months earlier than the actual date of the ceremony. The image storing server 40 can also extract information on a wedding date of any one of the users and the date thereof from the image property information in the image information storing database 73 so that the image storing server 40 can send information to the user regarding a service of taking photographs on a wedding anniversary, a few days earlier than the wedding anniversary.

In this case, index images of the images that have been registered by the user are preferably generated so that the index images can be sent to the user by being attached to an E-mail message or by being printed on a postcard used as a direct mail to the user.

By carrying out the promotion as has been described above, both the user and a service provider that manages the image storing server 40 can use the images attractively with minimum operation.

The service provider that manages the image storing server 40 needs to pay a royalty to the mini-laboratory from which the user requested film development and printing or the like, in accordance with the use record of the image data sets regarding the user. In the case of the additional-print order described above, the user may designate as the agency another one of the mini-laboratories different from the mini-laboratory that carried out film development and printing. In this case, the royalty is paid to the mini-laboratory that generates the additional prints. At the same time, a certain amount of royalty should also be paid to the mini-laboratory that carried out film development, since the mini-laboratory scanned the image data sets used for generating the additional prints.

Therefore, the service provider that manages the image storing server 40 can identify the mini-laboratory that carried out film development, and can pay the certain amount of royalty based on the information on the mini-laboratory included in the image property information stored in the image information storing database 53, even if the mini-laboratory that generated the additional prints is different from the mini-laboratory that carried out film development.

The image storing server 40 can also measure how many times and how long the respective image data sets were accessed by the user with use of the communication terminal 20. Therefore, the image storing server 40 can write the information thereon as use history in the image information storing database 73. Consequently, the image storing server 40 can display as index images a predetermined number of the images accessed frequently or accessed for a long time, when the user accesses the image storing server 40 from the communication terminal 20. In this manner, the image storing server 40 can automatically set an operation environment in accordance with the user whenever the user accesses.

An image evaluation method and an image evaluation apparatus will be explained next, as a second embodiment of the present invention. The image evaluation method is carried out in an image storing system in which image generation apparatuses, communication terminals, and an image storing server are connected via the Internet, as in the image storing system in the first embodiment. In the second embodiment, the image storing system, the image generation apparatuses, and the communication terminals and have the same configuration as the image storing system, the image generation apparatuses 10, and the communication terminals 20 in the first embodiment shown in FIGS. 1 to 3. Therefore, detailed explanations thereof are omitted.

Figure 33:
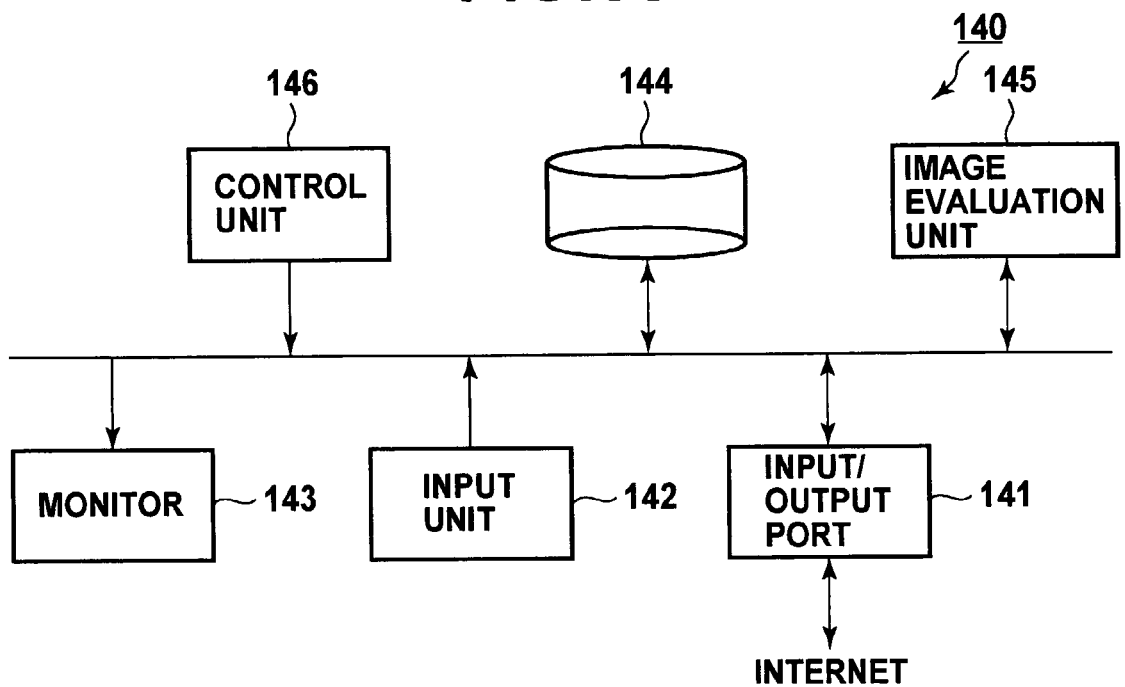
FIG. 33 is a block diagram showing a configuration of an image storing server.

FIG. 33 is a block diagram showing a configuration of the image storing server in the second embodiment. As shown in FIG. 33, an image storing server 140 in the second embodiment comprises an input/output port 141 for data input/output via the Internet 30, an input unit 142 comprising a mouse and a keyboard, a monitor 143 for carrying out various kinds of display such as an input result, a hard disc 144 for storing image data sets, various kinds of databases, and programs, an image evaluation unit 145 for carrying out image quality evaluation on photograph images represented by the image data sets, a control unit 146 for controlling the entire operation of the image storing server 140, and a bus 147 for interconnecting the elements described above.

The control unit 146 issues a user ID and a password upon reception of new user information, and relates the image data sets stored in the hard disc 144 with various kinds of information.

The hard disc 144 has large capacity in order to store a large amount of the image data sets sent from the image generation apparatuses 10 and the communication terminals 20. The hard disc also stores text data for advising a user in accordance with an image evaluation result that will be explained later.

According to an instruction from the communication terminal 20 of the user (hereinafter referred to as the communication terminal 20), the image evaluation unit 145 carries out image quality evaluation on the photograph images obtained by the user, based on the image data sets stored in the hard disc 144. The image quality is evaluated regarding predetermined evaluation items. In the second embodiment, the evaluation items are exposure, a position of a subject, balance, and a degree of blur caused by focus or camera shake. The position and the balance may be evaluated as a single item, "composition". A result of the evaluation is sent to the communication terminal 20 together with the text data for a piece of advice corresponding to the result, and displayed on a monitor 24. The text data comprising various contents are stored in the hard disc 144 and are used for various kinds of advice in accordance with the evaluation result.

Software for carrying out the same procedure as in the image evaluation unit 145 may be installed in the hard disc 144, instead of the image evaluation unit 145. In this case, the evaluation is carried out according to the software.

The exposure is the item for evaluating whether or not brightness of each of images is appropriate. The position of subject and the balance evaluate whether or not the size and balance of the subject in each of the images are appropriate. The degree of blur refers to whether or not the focus is appropriate and whether or not camera shake is present.

The evaluation of image quality carried out by the image evaluation unit 145 of the image storing server 140 in the second embodiment will be explained next. In this embodiment, the image data sets have been registered with the image storing server 140 from the image generation apparatuses 10, and the image evaluation unit 145 carries out the evaluation on the image data sets by the instruction input by the user from the communication terminal 20 to the image storing server 140.

Each of the image generation apparatuses 10 adds, to the image data sets, processing information representing how much the image data sets have been changed by image processing carried out by an image processing unit 12 (such as how much the brightness has been changed, or how much a color impression has been changed, for example). The image data sets added with the processing information are stored in the image storing server 140. The processing information is added to each of the image data sets as tag information thereof. Alternatively, a file for the processing information may be generated separately from the files of the image data sets so that the file of the processing information can be sent to and stored in the image storing server 140 by being related to the image data sets.

Figure 34:
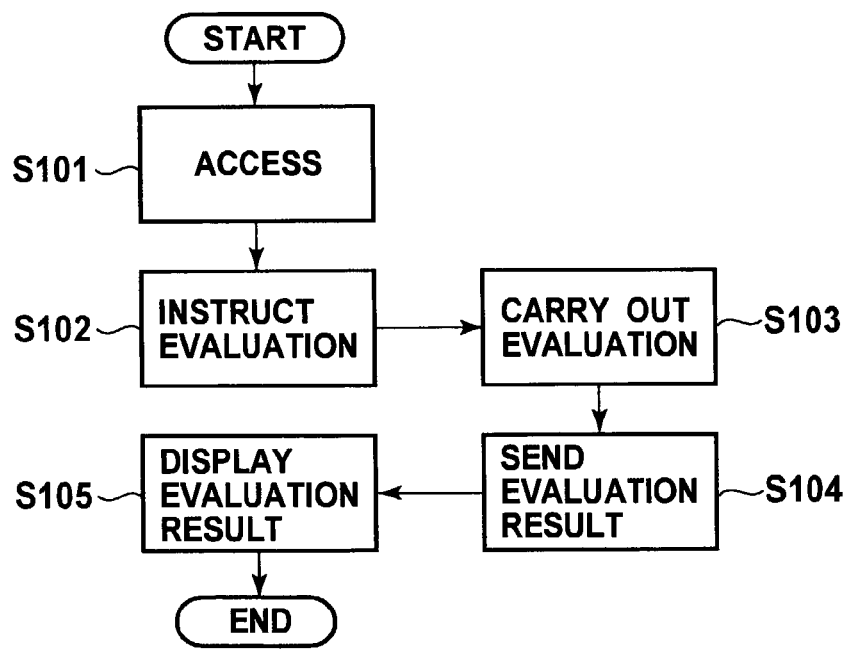
FIG. 34 is a flow chart showing the operation of a second embodiment of the present invention.

FIG. 34 is a flow chart showing the operation of the second embodiment. The user accesses a Web site of the image storing server 140 from the communication terminal 20 (Step S101), and instructs the image quality evaluation (Step S102). At this time, the user instructs which of the image data sets are used for the evaluation. In this example, the user instructs evaluation on all the image data sets in a directory of the user.

The image storing server 140 receives the instruction, and carries out the image quality evaluation on all the image data sets stored in the user directory (Step S103). For exposure, a score representing the evaluation result is determined by judging how much the brightness has been changed at the time of the image processing, based on the processing information. More specifically, the score becomes the highest if the brightness has not been changed at all, and decreases more in accordance with the change in brightness becoming greater. In this embodiment, the highest score is 5.

For the subject position, a subject in the image represented by each of the image data sets is extracted, and a distance between the position of the subject and the center of the image is then judged to determine a score therefor.

Various methods can be adopted as a method of extracting the subject. For example, the center of an area of a predetermined size is moved to a position of a predetermined subject, based on a movement in the image and an inclination of a contour and/or a color of the predetermined subject. The predetermined subject is then extracted in accordance with a size and/or a shape of the subject with reference to the center. Alternatively, a map of a potential field of an entire image is generated, and a predetermined subject is extracted with reference to a minimum of the potential in the map as has been described in Japanese Unexamined Patent Publication No. 5(1993)-210739. Furthermore, as has been described in Japanese Unexamined Patent Publication No. 5(1993)-282457, a neural network may learn characteristic patterns of characteristic parts such as a mouth and eyes of a predetermined subject such as a human face. In this case, whether or not characteristic parts of a candidate of a predetermined subject are included in the characteristic patterns is then judged. Whether or not positions of the characteristic parts of the candidate agree with positions of the characteristic parts in the predetermined subject is further judged. In this manner, whether or not the candidate is the predetermined subject can be judged.

In the case of a human face as the subject, the image is divided into areas, and shape patterns each representing a contour of a human head are extracted after removing the areas representing a non-human object. Face candidate areas are then detected based on the shape patterns. Furthermore, a shape pattern for a human-face contour, a shape pattern for components in the face, and a shape pattern for a human-body contour are detected. Based on the patterns that have been detected, the face area is extracted by judging which of the face candidate areas is most likely to be an area of human face, according to how each of the face candidate areas matches with other parts (Japanese Unexamined Patent Publication No. 8(1996)-122944). In another method (Japanese Unexamined Patent Publication No. 5(1993)-100328) of extracting a human face from an image, the image is divided into areas and each of the areas is subjected to photometry. Data obtained from the photometry are converted into hue and chroma to generate two-dimensional histograms thereof. The histograms are then decomposed into peaks, and which of the peaks each pixel in the image belongs to is judged. The pixels are decomposed into groups corresponding to the peaks, and the image is divided for each of the groups to extract face candidate areas. The image size of each of the extracted candidate areas is compared with an image size obtained from main image size information, and the area resulting in the best match is extracted as the face area.

For the balance, how the size of the subject extracted in the above manner or the like deviates from an optimal size in accordance with the size of the image itself is judged. A score representing the evaluation result on the balance is then determined.

For the degree of blur, a method described in Japanese Unexamined Patent Publication No. 57(1982)-192941 may be used to determine a score representing the evaluation result on blur. The degree of blur is detected in the following manner. Each of the image data sets is subjected to filtering processing using a small-size averaging filter (such as 1×1 or 3×3) and a large-size averaging filter (such as 5×5 or 7×7). A small-size averaged image data set and a large-size averaged image data set are therefore obtained. Although the filter of 1×1 size is not an averaging filter, the filter is included in the averaging filters for the sake of easier explanation. The degree of blur is detected based on a relationship between a frequency distribution of a difference between corresponding pixels of the two image data sets and a contrast value statistically obtained over the entire image from local contrast of the image represented by the original image data set.

After the image quality evaluation has been carried out in the above manner, the result is sent to the communication terminal 20 together with the advice corresponding to the result (Step S104). The communication terminal 20 displays the result on the monitor 24 (Step S105) to end the procedure.

Figure 35:
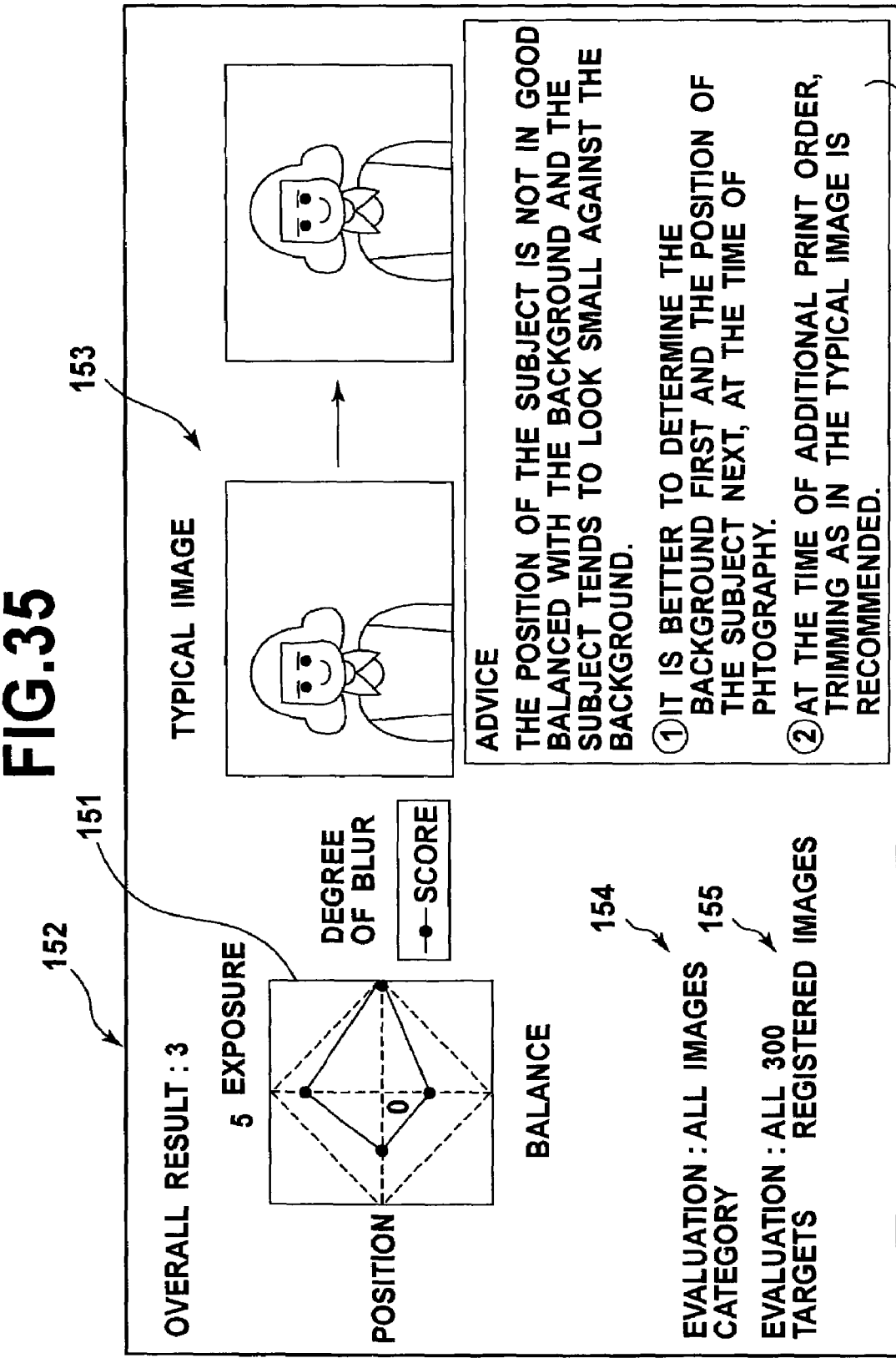
FIG. 35 shows an evaluation result display screen (part 1)

FIG. 35 show the evaluation result displayed on the monitor 24 of the communication terminal 20 in the second embodiment. As shown in FIG. 35, a chart 151 showing the evaluation result on the exposure, the subject position, the balance, and the degree of blur, an overall result 152, an exemplary typical image 153 based on the overall result, an evaluation category 154, a quantity 155 of evaluation targets, and advice 156 are displayed.

The user views the evaluation result and can recognize what he/she has to improve. Based on the advice, the user can carry out photography for a better evaluation next time by improving his/her photography technique.

Since the evaluation can be carried out for more of the image data sets if the image data sets are stored in the image storing server 140, accuracy of the evaluation can also be improved. Furthermore, since the image storing server 140 stores the image data sets for a long period, the evaluation result for the image data sets obtained recently may be compared with the evaluation result for the image data sets obtained in the past. In this manner, the user can be notified as to how his/her photography technique has changed.

In the second embodiment described above, the evaluation on exposure is carried out based on the processing information added to the image data sets. However, the evaluation on exposure may be carried out by obtaining the image data sets before the image processing from the image generation apparatus 10 that carried out the image processing and then by comparing the image data sets with the image data sets that have been subjected to the image processing in the image storing server 140.

In the second embodiment, all the image data sets stored in the user directory are evaluated. However, the evaluation may be carried out on only one of the image data sets that has been selected by the user.

The evaluation may be carried out regarding photographs of a specific type. For this purpose, the user can specify the type of photographs to be evaluated, when the user inputs the instruction for evaluation. Hereinafter, the evaluation according to the type of photographs will be explained as a third embodiment of the present invention.

As the type of photographs, the user can specify portraits, photographs of people (several persons), class photos, scenic photographs such as a mountain, the sea, and a town, flower photographs, pet photographs, astronomical photographs, and night view photographs.

According to an instruction from the user, the image evaluation unit 145 of the image storing server 140 selects the corresponding image data sets in accordance with the type specified by the user, from the image data sets stored in the user directory. The image data sets are selected by judgment of a subject included in the image of each of the image data sets. For example, the subject is extracted from each of the images according to the method described in Japanese Unexamined Patent Publication No. 5(1993)-210793 or 5(1993)-282457, and the extracted subject is compared with a template of a typical subject (such as a person, a flower or a star). The image that includes the subject approximately agreeing with the typical subject is judged to be the image including the subject, and the image data set thereof is selected.

In the case of a human face as the subject, the number of faces that have been extracted is detected, and portraits, photographs of people, and class photos are available for the type of photographs, depending on the number of faces. Furthermore, the brightness of each of the images is compared with a predetermined threshold value, and an image whose brightness is smaller than the predetermined threshold value is selected as a photograph of night view. Moreover, by detecting a color included conspicuously in each of the images may be detected to select an image of scenic photograph, such as a mountain, the sea, and a town, depending on the color. For example, if green is conspicuous, the image is judged to be an image of a mountain while an image is judged to be an image of the sea if the conspicuous color is blue. In the case where gray is conspicuous, the image is judged to be an image of a town.

In the case where portraits or photographs of people are selected, the image quality is dependent on a position, the balance, and a facial expression of the person or each of the people, which may thus be included as the evaluation items. In the case of class photos, the image quality is determined by the positions of people and whether or not the people are within a predetermined frame. Therefore, these items may also be included as the evaluation items. In the case of flower photographs, the image quality is dependent on a size of the subject and balance with the background. Therefore, these items may also be included as the evaluation items. In the case of night view photographs, the exposure is difficult to set and camera shake tends to occur. Therefore, the exposure and the camera shake may be included in the evaluation items.

The image quality evaluation is carried out as in the second embodiment, based on each of the image data sets that has been selected. The result is sent to the communication terminal 20 together with the advice, and displayed on the monitor 24.

Figure 36:
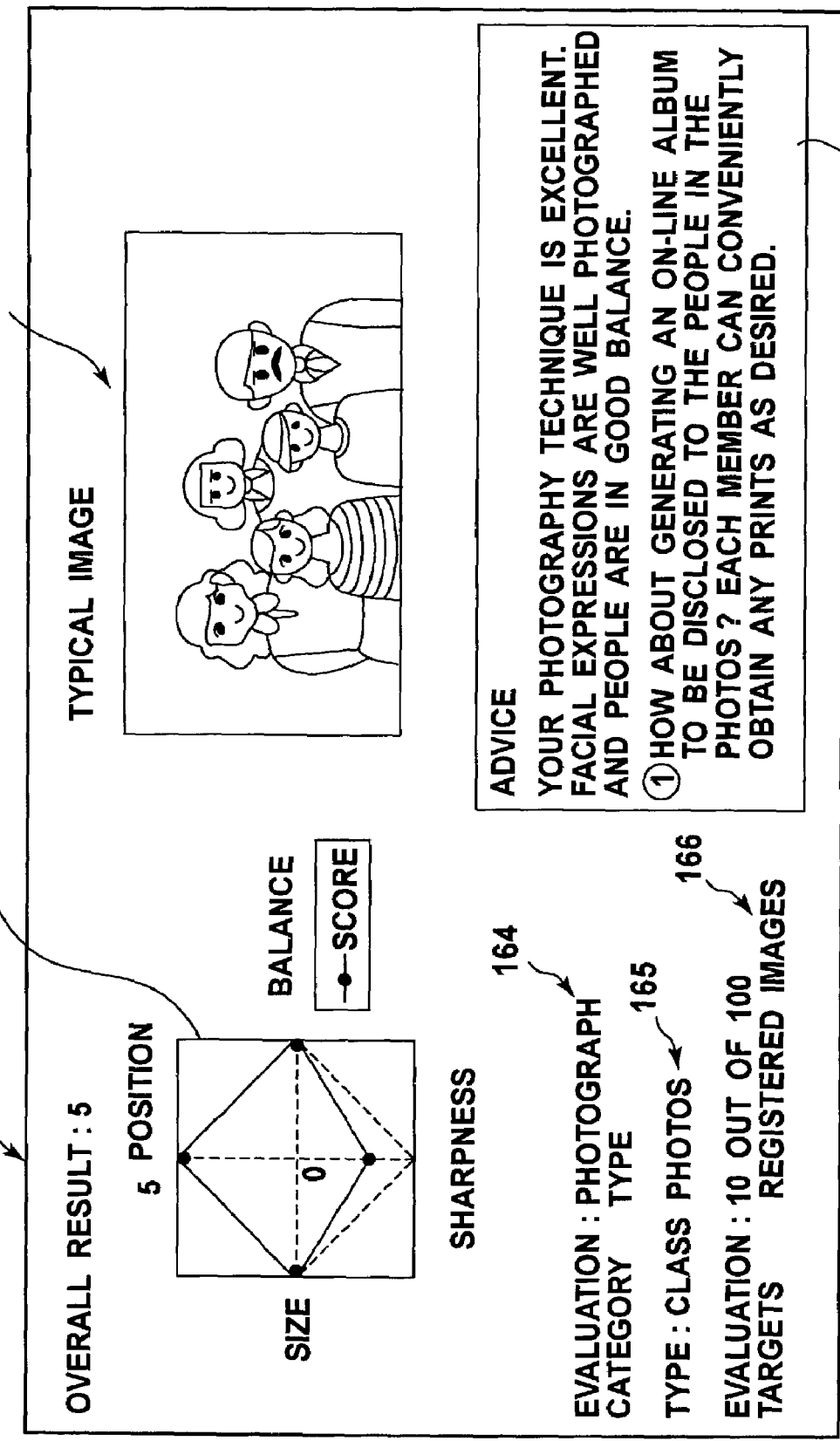
FIG. 36 shows the evaluation result display screen (part 2)

FIG. 36 shows how the evaluation result is displayed on the monitor 24, regarding a specific type of image. As shown in FIG. 36, class photos has been specified as the type, and the position, the size, sharpness, and the balance are included in the evaluation items. A chart 161 showing the result, an overall result 162, an exemplary image 163 regarding the specified type, an evaluation category 164, the specified photograph type 165, a quantity 166 of evaluation targets, and advice 167 are displayed in the evaluation result. The quantity 166 of evaluation targets shows the fact that the number of class photos is 10 out of the 100 images stored in the image storing server 140.

The user can recognize how his/her images of the specific type can be improved, by viewing the result. The user can carry out photography for a better result next time by improving his/her photography technique based on the advice.

In the third embodiment, the evaluation is carried out according to the type of photographs. However, in some cases, the image quality cannot be evaluated accurately because the number of the image data sets the user has obtained is small. Meanwhile, the image quality tends to be almost the same among users, regarding photographs of the same type. Therefore, in the case where the evaluation is not carried out appropriately in the third embodiment on the image data sets owned by only one user, the evaluation may be carried out by using image data sets owned by others at the same time.

In the second embodiment, the evaluation items are the exposure, the subject position, the balance, and the degree of blur. However, the evaluation items are not limited to these items, and a color impression and aperture may be added thereto. More specifically, the color impression may include hue, chroma, lightness, color balance, and contrast. The evaluation items may also be specified at the time of evaluation instruction. Moreover, not only the evaluation items but also the type of photographs may be specified. Since the evaluation items are items for evaluating photograph technique, "photograph technique" may be specified as the evaluation category at the time of evaluation instruction so that the evaluation items are specified thereafter. Hereinafter, this manner will be explained as a fourth embodiment of the present invention.

The image evaluation unit 145 of the image storing server 140 evaluates all the image data sets in the user directory regarding the evaluation items specified at the time the user instructs evaluation. A result is sent to the communication terminal 20 together with advice, and displayed on the monitor 24.

FIG. 37 shows how the evaluation result is displayed on the monitor 24, regarding the specified items. As shown in FIG. 37, the evaluation items in this case are the exposure, the balance, and the size. A chart 171 showing the result, an overall result 172, an exemplary image 173 regarding the items that have been specified, the evaluation category 174, the evaluation items 175, a quantity 176 of evaluation targets, and advice 177 are displayed.

The user can recognize the evaluation of his/her images regarding the specified items. The user can carry out photography for a better result next time by improving his/her photography technique based on the advice.

In the fourth embodiment, the image quality evaluation may be carried out regarding not only the items but also the type of image, as in the third embodiment. In this case, the image evaluation unit 145 of the image storing server 140 selects the image data sets representing the images of the specified type and carries out the evaluation on the selected image data sets, regarding the specified items. The result is sent to the communication terminal 20 together with the advice, and displayed on the monitor 24.

A portion of the image data sets may be selected from the image data sets stored in the image storing server 140, in order to represent images photographed by using a specific model of digital camera (not only a digital still camera but also a digital camcorder that can record a still image). In this case, the evaluation is carried out only on the selected image data sets obtained by the specific digital camera. In this case, "camera model" is used as the evaluation category at the time of evaluation instruction, and the model of the camera is specified for evaluation on the camera model. Hereinafter, this manner will be explained as a fifth embodiment of the present invention.

In the case where image data sets are obtained by a digital camera, tag information of each of the image data sets includes information on the camera model. Therefore, the image data sets obtained by the specific camera can be selected by referring to the tag information. In the case where the camera model is used as the evaluation category, hue, contrast, lightness, and chroma are included in the evaluation items.

FIG. 38 shows how an evaluation result on a specific camera is displayed on the monitor 24. As shown in FIG. 38, hue, contrast, lightness, and chroma are included in the evaluation items. A chart 181 showing the result, an overall result 182, an exemplary image 183 obtained by the camera of the specific model, the evaluation category 184, the camera model 185, a quantity 186 of evaluation targets, and a comment 187 are shown in the screen in FIG. 38. The quantity 186 of evaluation targets shows the fact that the number of the image data sets obtained by the camera is 30 out of the 100 image data sets stored in the image storing server 140.

The user can understand a tendency of the quality of the images obtained by the camera. Furthermore, the user can obtain images of higher quality by carrying out image processing on the image data sets in order to compensate for a drawback of the images obtained by the camera, based on the comment.

In the second to fifth embodiments described above, the image storing server 140 carries out the evaluation, and the evaluation result is displayed on the communication terminal 20. However, software for carrying out the same procedure as in the image evaluation unit 145 may be installed in the communication terminal 20 so that the communication terminal 20 can carry out the evaluation.

In this case, any number of the image data sets stored locally by the user, such as the image data sets stored in the hard disc 27, an MO disc, a CD-R, or a memory card, can be used for the image quality evaluation.

Meanwhile, the user can place a print order regarding the image data sets by accessing the image storing server 140 from the communication terminal 20. At the time of placing the order, the image data sets before and after the image processing and the kind of the image processing may be displayed.

FIG. 39 shows an example of an order screen in this case. In the order screen are displayed a thumbnail image 191 of one of the image data sets before the image processing, a thumbnail image 192 of the image data set after the image processing, a key point 193 in the image processing for showing what kind of image processing has been carried out, an order field 194 for inputting a print size and a quantity regarding the image data set after the image processing, an order field 195 for inputting a print size and a quantity regarding the image data set before the image processing, an Order button 196 for placing an order, and a Cancel button for canceling the order. The key point 193 in the image processing includes the evaluation result. Each of the order fields 194 and 195 for inputting the print size comprises a pull-down menu. A link 199 is also shown in the key point 193 of image processing, for displaying a main point regarding a subject included in the image to be printed. The user can view the main point displayed on the monitor for photographing the subject such as a flower, by clicking the link 199.

The user can compare with each other the thumbnail images 191 and 192 before and after the image processing, and can understand what kind of image processing has been carried out and how the image have been changed as a result of the image processing, by viewing the key point 193. Furthermore, the user can understand a drawback of his/her image, based in the evaluation result. Consequently, the user can carry out photography for higher-quality images next time by improving his/her photography technique based on the evaluation result.

The user inputs the print size and the quantity for either of the images before and after the image processing or for both of the images in the order field 194 and/or in the order display field 195, and clicks the Order button 196. In this manner, order information is generated and transferred to the image storing server 140. The image storing server 140 then sends the order information and the image data set to be printed to a predetermined one of the mini-laboratories and the mini-laboratory carries out printing. The order information includes the user information such as the name, the address, and the phone number of the user, the file names of the image data set or sets having been subjected to or not having been subjected to the image processing, the print size, and the quantity.

A skilled artisan would know that computer readable media are not limited to any specific type of storage device and include any kind of device, including but not limited to CDs, floppy discs, RAMs, ROMs, hard discs, magnetic tapes, and internet downloads, in which computer instructions can be stored and/or transmitted. Transmission of the computer code through a network or through wireless transmission means is also within the scope of this invention. Additionally, computer code/instructions include, but are not limited to, source, object, and executable code and can be in any language including higher level languages, assembly language and machine language.

What is claimed is:

1. A computer implemented method for storing images, comprising the steps of:
    importing a plurality of image data sets together with user information
    storing the image data sets in a classification according to a user, based on the user information;
    receiving an instruction for filing the image data sets stored in the classification by the user;
    filing the image data sets based on the instruction; and
    storing the image data sets that have been filed according to the instruction
    further comprising the step of relating the image data sets and the filed image data sets to image property information representing an image property before storing the image data sets and the filed image data sets, wherein the step of storing the image data sets according to the user and the step of storing the image data sets that have been filed are the steps of storing the image data sets and the filed image data sets in relation to image property information representing an image property.

2. The method as defined in claim 1, wherein
    the step of storing the image data sets in the classification according to the user is the step of storing the image data sets in a classification according to each roll of developed photographic films in addition to the classification by the user, in the case where the plurality of image data sets have been obtained by reading the developed photographic films; and
    the step of receiving the instruction is the step of receiving the instruction for filing the image data sets stored in the classification by each roll of the developed photographic films.

3. The method as defined in claim 1, wherein the image property information includes information on the date and time of photography regarding each of the image data sets and the image storing method further comprises the step of filing the image data sets according to the information representing the date and time of photography before store the image data sets.

4. The method as defined in claim 1, wherein the image property information includes information representing how each of the image data sets has been used.

5. The method as defined in claim 1, further comprising the steps of:
    receiving an instruction for using the filed image data sets; and
    carrying out predetermined processing according to the instruction.

6. The method as defined in claim 1, wherein the image data sets have been obtained by an image reading apparatus installed in a laboratory for reading images from a roil of developed photographic film.

7. The method as defined in claim 6, further comprising the step of storing laboratory information regarding the laboratory by relating the laboratory information to the image data sets.

8. The method as defined in claim 1, wherein the user information is obtained by reading a user ID from a user ID card recorded with the user ID.

9. The method comprising the steps of:
importing a plurality of image data sets together with user information;
storing the image data sets in a classification according to a user, based on the user information;
receiving an instruction for filing the image data sets stored in the classification by the user;
filing the image data sets based on the instruction; and
storing the image data sets that have been filed according to the instruction monitoring today's date;
analyzing an event regarding the user based on the user information; and
notifying the analyzed event to the user when today's date becomes a predetermined number of days earlier than the date of the event.

10. The method comprising the steps of:
importing a plurality of image data sets together with user information;
storing the image data sets in a classification according to a user, based on the user information;
receiving an instruction for filing the image data sets stored in the classification by the user;
filing the image data sets based on the instruction; and
storing the image data sets that have been filed according to the instruction storing use history information representing how each of the filed image data sets has been used.

11. An image storing apparatus comprising:
image import means for importing a plurality of image data sets together with user information;
image storing means for storing the image data sets in a classification by a user, based on the user information;
reception means for receiving an instruction for filing the image data sets stored in the classification by the user; and
filing means for filing the image data sets based on the instruction, wherein
the image storing means stores the image data sets that have been filed,
wherein the image storing means stores the image data sets and the filed image data sets in relation to image property information representing an image property, and
wherein, in the case where the image property information includes the date and time of photography regarding each of the image data sets, the filing means files the image data sets based on the information representing the date and time of photography.

12. An image storing apparatus as defined in claim 11, wherein,
in the case where the image data sets have been obtained by reading rolls of developed photographic films, the image storing means stores the image data sets in a classification by each roll of the photographic films in addition to the classification by the user and
the reception means receives the instruction for filing the image data sets stored in the classification by each roll of the photographic films.

13. An image storing apparatus as defined in claim 11, wherein the image property information includes information representing how each of the image data sets has been used.

14. An image storing apparatus as defined in claim 11, wherein the reception means receives an instruction for using the filed image data sets stored in the image storing means, and the image storing apparatus further comprises processing means for carrying out predetermined processing based on the instruction for using the filed image data sets.

15. An image storing apparatus as defined in claim 11, wherein the image data sets have been obtained by an image reading apparatus installed in a laboratory for reading images from a roll of developed photographic film.

16. An image storing apparatus as defined in claim 15, wherein the image storing means stores laboratory information regarding the laboratory by relating the laboratory information to the image data sets.

17. An image storing apparatus as defined in claim 11, wherein the user information is obtained by reading a user ID from a user ID card recorded with the user ID.

18. An image filing instruction apparatus comprising:
access means for accessing an image storing server comprising the image storing apparatus defined in claim 11 and
instruction means for instructing the image storing server to file the image data sets.

19. An image filing instruction apparatus as defined in claim 18, wherein the instruction means instructs the image storing server to use the filed image data sets.

20. An image storing apparatus as defined in claim 11, further comprising:
date monitoring means for monitoring today's date;
analysis means for analyzing an event regarding the user based on the user information; and
notification means for notifying the user of the analyzed event when today's date becomes a predetermined number of days earlier than the date of the event.

21. An image storing apparatus as defined in claim 11, further comprising use history storing means for storing use history information representing how each of the filed image data sets has been used.

22. An A computer implemented image filing instruction method comprising the steps of:
accessing an image storing server comprising an image storing apparatus; and
instructing the image storing server to file the image data sets, the image storing apparatus including:
means for importing a plurality of image data sets together with user information;
means for storing the image data sets in a classification by a user, based on the user information;
means for receiving an instruction for filing the image data sets stored in the classification by the user; and
means for filing the image data sets based on the instruction, wherein the image storing means stores the image data sets that have been filed,
wherein the image storing means stores the image data sets and the filed image data sets in relation to image property information representing an image property, and
wherein, in the case where the image property information includes the date and time of photography regarding each of the image data sets, the filing means files the image data sets based on the information representing the date and time of photography.

23. The computer implemented image filing instruction method as defined in claim 22, further comprising the step of instructing the image storing server to use the filed image data sets.

24. An image storing system comprising:
an image storing server comprising the image storing apparatus including image import means for importing a plurality of image data sets together with user information, image storing means for storing the image data sets in a classification by a user, based on the user information, reception means for receiving an instruction for filing the image data sets stored in the classification by the user, and filing means for filing the image data sets based on the instruction, wherein the image storing means stores the image data sets that have been filed; and a terminal having the image filing instruction apparatus including access means for accessing the image storing server, instruction means for instruction the image storing server to file the image data sets, and communicable with the image server via a network further comprising the step of relating the image data sets and the filed image data sets to image property information representing an image property before storing the image data sets and the filed image data sets, wherein the step of storing the image data sets according to the user and the step of storing the image data sets that have been filed are the steps of storing the image data sets and the filed image data sets in relation to image property information representing an image property.

25. A program that causes a computer to execute the procedures of:

importing a plurality of image data sets together with user information;

storing the image data sets in a classification according to a user, based on the user information;

receiving an instruction for filing the image data sets stored in the classification by the user;

filing the image data sets based on the instruction; and storing the image data sets that have been filed further comprising the step of relating the image data sets and the filed image data sets to image property information representing an image property before storing the image data sets and the filed image data sets, wherein the step of storing the image data sets according to the user and the step of storing the image data sets that have been filed are the steps of storing the image data sets and the filed image data sets in relation to image property information representing an image property.

26. A program that cause a computer to execute the procedures of:

accessing an image storing server comprising an image storing apparatus; and instruction the image storing server to file the image data set, the image storing apparatus including:

means for importing a plurality of image data sets together with user information;

means for storing the image data sets in a classification by a user, based on the user information;

means for receiving an instruction for filing the image data sets stored in the classification by the user; and means for filing the image data sets based on the instruction, wherein the image storing means stores the image data sets that have been filed, wherein the image storing means stores the image data sets and the filed image data sets in relation to image property information representing an image property, and wherein, in the case where the image property information includes the date and time of photography regarding each of the image data sets, the filing means files the image data sets based on the information representing the date and time of photography.

27. A computer implemented image evaluation method comprising the steps of:

carrying out image quality evaluation on a photograph image obtained by photography, based on an image data set representing the photograph image and stored in a classification according to a user based on user information; and outputting a result of the evaluation further comprising the step of relating the image data sets and the filed image data sets to image property information representing an image property before storing the image data sets and the filed image data sets, wherein the step of storing the image data sets according to the user and the step of storing the image data sets that have been filed are the steps of storing the image data sets and the filed image data sets in relation to image property information representing an image property.

28. The computer implemented image evaluation method as defined in claim 27, wherein the step of carrying out the image quality evaluation is the step of carrying out the image quality evaluation based on a plurality of image data sets each representing a photograph image obtained by photography.

29. The computer implemented image evaluation method as defined in claim 28, wherein the image data sets are stored in image storing means on a network.

30. The computer implemented image evaluation method as defined in claim 28 or 29, wherein the step of carrying out the image quality evaluation is the step of carrying out the image quality evaluation based on more than one of the image data sets selected from the image data sets, each of the selected image data sets representing the photograph image of a specific type.

31. The computer implemented image evaluation method as defined in claim 28 or 29, wherein the step of carrying out the image quality evaluation is the step of carrying out the image quality evaluation based on more than one of the image data sets selected from the image data sets, the selected image data sets obtained by a digital camera of a specific model.

32. An The computer implemented image evaluation method as defined in any one of claims 27 to 29, wherein the step of outputting is the step of outputting the image data set before image processing, the image data set after the image processing, and the content of the image processing, in the case where the image processing is carried out on the image data set.

33. The computer implemented image evaluation method as defined in claim 27, wherein the image quality is evaluated by exposure of the photograph image, a color impression, composition, a degree of blur caused by focus and camera shake, and how a night view looks in the case of a night view photograph.

34. An image evaluation apparatus comprising:

evaluation means for carrying out evaluation of an image quality on a photograph image obtained by photography, based on an image data set representing the photograph image and stored in a classification according to a user based on user information; and output means for outputting a result of the evaluation, further comprising the step of relating the image data sets and the filed image data sets to image property information representing an image property before storing the image data sets and the filed image data sets, wherein the step of storing the image data sets according to the user and the step of storing the image data sets that have been filed are the steps of storing the image data sets and the filed image data sets in relation to image property information representing an image property.

35. An image evaluation apparatus as defined in claim 34, wherein the evaluation means carries out the evaluation of the image quality, based on a plurality of image data sets each representing a photograph image obtained by photography.

36. An image evaluation apparatus as defined in claim 35, wherein the image data sets are stored in image storing means on a network.

37. An image evaluation apparatus as defined in claim 35 or 36, wherein the evaluation means carries out evaluation of the image quality, based on more than one of the image data sets selected from the image data sets, each of the selected image data sets representing the photograph image of a specific type.

38. An image evaluation apparatus as defined in claim 35 or 36, wherein the evaluation means carried out evaluation of the image quality, based on more than one of the image data sets selected from the image data sets, the selected image data sets obtained by a digital camera of a specific model.

39. An image evaluation apparatus as defined in any one of claims 34 to 36, wherein the output means outputs the image data set before image processing, the image data set after the image processing, and the content of the image processing, in the case where the image processing is earned out on the image data set.

40. A program that causes a computer to execute the procedures of:
carrying out image quality evaluation on a photograph image obtained by photography, based on an image data set representing the photograph image and stored in a classification according to a user based on user information; and
outputting a result of the evaluation,
further comprising the step of relating the image data sets and the filed image data sets to image property information representing an image property before storing the image data sets and the filed image data sets, wherein the step of storing the image data sets according to the user and the step of storing the image data sets that have been filed are the steps of storing the image data sets and the filed image data sets in relation to image property information representing an image property.

41. A program as defined in claim 40, wherein the procedure of carrying out the image quality evaluation is the procedure of carrying out the image quality evaluation based on a plurality of image data sets each representing a photograph image obtained by photography.

42. A program as defined in claim 41, wherein the image data sets are stored in image storing means on a network.

43. A program as defined in claim 41 or 42, wherein the procedure of carrying out the image quality evaluation is the procedure of carrying out the image quality evaluation based on more than one of the image data sets selected from the image data sets, each of the selected image data sets representing the photograph image of a specific type.

44. A program as defined in claim 41 or 42, wherein the procedure of carrying out the image quality evaluation is the procedure of carrying out the image quality evaluation based on more than one of the image data sets selected from the image data sets, the selected image data sets obtained by a digital camera of a specific model.

45. A program as defined in any one of claims 40 to 42, wherein:
the procedure of outputting is the procedure of outputting the image data set before image processing, the image data set after the image processing, and the content of the image processing, in the case where the image processing is carried out on the image data set.

46. A computer-readable recording medium storing a program that causes a computer to execute the procedures of:
importing a plurality of image data sets together with user information;
storing the image data sets in a classification according to a user, based on the user information;
receiving an instruction for filing the image data sets stored in the classification by the user;
filing the image data sets based on the instruction; and
storing the image data sets that have been filed,
further comprising the step of relating the image data sets and the filed image data sets to image property information representing an image property before storing the image data sets and the filed image data sets, wherein the step of storing the image data sets according to the user and the step of storing the image data sets that have been filed are the steps of storing the image data sets and the filed image data sets in relation to image property information representing an image property.

47. A computer-readable recording medium storing a program that causes a computer to execute the procedures of:
accessing an image storing server comprising an image storing apparatus; and
instructing the image storing server to file the image data sets, the image storing apparatus including:
means for importing a plurality of image data sets together with user information;
means for storing the image data sets in a classification by a user, based on the user information;
means for receiving an instruction for filing the image data sets stored in the classification by the user; and
means for filing the image data sets based on the instruction, wherein the image storing means stores the image data sets that have been filed,
wherein the image storing means stores the image data sets and the filed image data sets in relation to image property information representing an image property, and
wherein, in the case where the image property information includes the date and time of photography regarding each of the image data sets, the filing means files the image data sets based on the information representing the date and time of photography.

48. A computer-readable recording medium storing a program that causes a computer to execute the procedures of:
carrying out image quality evaluation on a photograph image obtained by photography, based on an image data set representing the photograph image and stored in a classification according to a user based on user information; and
outputting a result of the evaluation,
further comprising the step of relating the image data sets and the filed image data sets to image property information representing an image property before storing the image data sets and the filed image data sets, wherein the step of storing the image data sets according to the user and the step of storing the image data sets that have been filed are the steps of storing the image data sets and the filed image data sets in relation to image property information representing an image property.

49. A computer-readable recording medium as defined in claim 48, wherein the procedure of carrying out the image quality evaluation is the procedure of carrying out the image quality evaluation based on a plurality of image data sets each representing a photograph image obtained by photography.

50. A computer-readable recording medium as defined in claim 49, wherein the image data sets are stored in image storing means on a network.

51. A computer-readable recording medium as defined in claim 49 or 50, wherein the procedure of carrying out the image quality evaluation is the procedure of carrying out the image quality evaluation based on more than one of the image data sets selected from the image data sets, each of the selected image data sets representing the photograph image of a specific type.

52. A computer-readable recording medium as defined in claim 49 or 50, wherein the procedure of carrying out the image quality evaluation is the procedure of carrying out the image quality evaluation based on more than one of the image data sets selected from the image data sets, the selected image data sets obtained by a digital camera of a specific model.

53. A computer-readable recording medium as defined in any one of claims 48 to 50, wherein:

the procedure of outputting is the procedure of outputting the image data set before image processing, the image data set after the image processing, and the content of the image processing, in the case where the image processing is carried out on the image data set.

54. An image storing system comprising:

an image storing server comprising the image storing apparatus including image import means for importing a plurality of image data sets together with user information, image storing means for storing the image data sets in a classification by a user, based on the user information, reception means for receiving an instruction for filing the image data sets stored in the classification by the user, and filing means for filing the image data sets based on the instruction, wherein the image storing means stores the image data sets that have been filed; and;

a terminal having the image filing instruction apparatus including access means for accessing the image storing server, instruction means for instruction the image storing server to file the image data sets and to use the filed image data sets, and communicable with the image storing server via a network, further comprising the step of relating the image data sets and the filed image data sets to image property information representing an image property before storing the image data sets and the filed image data sets, wherein the step of storing the image data sets according to the user and the step of storing the image data sets that have been filed are the steps of storing the image data sets and the filed image data sets in relation to image property information representing an image property.

* * * * *